(12) United States Patent
Mitsunaga et al.

(10) Patent No.: US 8,787,697 B2
(45) Date of Patent: Jul. 22, 2014

(54) IMAGE PROCESSING APPARATUS AND METHOD, AND PROGRAM

(75) Inventors: Tomoo Mitsunaga, Kanagawa (JP); Hiroaki Takahashi, Tokyo (JP)

(73) Assignee: Sony Corporation, Tokyo (JP)

(*) Notice: Subject to any disclaimer, the term of this patent is extended or adjusted under 35 U.S.C. 154(b) by 193 days.

(21) Appl. No.: 13/442,575

(22) Filed: Apr. 9, 2012

(65) Prior Publication Data
US 2012/0269455 A1 Oct. 25, 2012

(30) Foreign Application Priority Data

Apr. 20, 2011 (JP) ................................. 2011-093703
Jun. 13, 2011 (JP) ................................. 2011-131245

(51) Int. Cl.
*G06K 9/40* (2006.01)
*G06T 3/40* (2006.01)
(52) U.S. Cl.
CPC ..... *G06T 3/4007* (2013.01); *G06T 2207/20192* (2013.01)
USPC ........................................................ 382/269
(58) Field of Classification Search
None
See application file for complete search history.

(56) References Cited

U.S. PATENT DOCUMENTS

| 7,548,659 | B2* | 6/2009 | Ofek et al. | 382/254 |
| 7,936,942 | B2* | 5/2011 | Aoyama et al. | 382/269 |
| 2008/0117467 | A1* | 5/2008 | Hosaka et al. | 358/3.06 |
| 2010/0309243 | A1* | 12/2010 | Nakano et al. | 347/15 |
| 2011/0116112 | A1* | 5/2011 | Muramatsu | 358/1.9 |

FOREIGN PATENT DOCUMENTS

| JP | 2008-166872 A | 7/2008 |
| JP | 2009-070123 A | 4/2009 |
| JP | 4343255 B1 | 7/2009 |
| JP | 2010-055410 A | 3/2010 |
| JP | 2010-067272 A | 3/2010 |

* cited by examiner

*Primary Examiner* — Yon Couso
(74) *Attorney, Agent, or Firm* — Wolf, Greenfield & Sacks, P.C.

(57) ABSTRACT

A normal-phase candidate position selection unit designates a pixel on a horizontal or vertical line in a position separated by two lines from a target position of an input image as a normal-phase candidate pixel, which is a candidate for a pixel at which jaggies are in the same phase as a pixel of the target position. A reverse-phase candidate position selection unit designates a pixel between the target position in the input image and the normal-phase candidate pixel as a reverse-phase candidate pixel. The weight value calculation unit calculates a weight value based on a degree of similarity between an image adjacent to the target position and an image adjacent to the normal-phase candidate pixel. The weighted expected value calculation unit performs weighted addition of reverse-phase candidate pixels using the weight value and generates a reverse-phase image by reversing only the phase of the jaggies in the input image.

20 Claims, 49 Drawing Sheets

IMAGE PROCESSING APPARATUS AND METHOD, AND PROGRAM

CROSS REFERENCE TO RELATED APPLICATIONS

This application claims the priority benefit of Japanese Patent Application JP 2011-093703 filed in the Japanese Patent Office on Apr. 20, 2011 and Japanese Patent Application JP 2011-131245 filed in the Japanese Patent Office on Jun. 13, 2011, the entire content of which is hereby incorporated by reference.

BACKGROUND

The present technology relates to an image processing apparatus and method, and a program, and more particularly, to an image processing apparatus and method, and a program that enable jaggies of an image to be more easily and reliably reduced.

As is well known in the related art, jaggies occur in an image if the image is enlarged or reduced by pixel thinning.

As a method of reducing jaggies, a method using a local operator such as a method of appropriately selecting an enlargement filter when an image is enlarged (for example, see Japanese Patent Application Laid-Open No. 2010-67272) or a method of reducing jaggies by direction selection and smoothing after an image is enlarged (for example, see Japanese Patent Application Laid-Open Nos. 2010-55410 and 2008-166872) has been proposed.

In addition, a method using a superposition-based super-resolution process (for example, see Japanese Patent Application Laid-Open No. 2009-70123) and a method of performing a block matching search in a horizontal direction when an image is enlarged and determining an interpolation pixel (for example, see Japanese Patent No. 4343255) have been proposed for reducing jaggies.

SUMMARY

However, in the above-described techniques, it is difficult to easily and reliably reduce the jaggies occurring in an image.

For example, it is not possible to reduce the jaggies of an edge at a shallow angle or a steep angle in the method using the local operator. In the super-resolution process, a plurality of phase-shifted frame images are necessary for the reduction of jaggies.

In addition, in the method using block matching, jaggies are not appropriately reduced when a correlation between images in positions symmetrical with respect to the center of a target pixel is low, nor are they reduced at steep angles. Further, although the method using the block matching is effective when the image is enlarged, it is not possible to reduce the jaggies of the image after the enlargement.

The present technology is made in view of the above-mentioned issue, and it is desirable to provide more easily and reliably reduce jaggies of an image.

According to the first embodiment of the present technology, there is provided an image processing apparatus including a normal-phase candidate position selection unit for selecting a position different from a target position on an input image as a normal-phase candidate position, which is a candidate for a position at which jaggies are in the same phase as the target position, a reverse-phase candidate position selection unit for selecting a position different from the target position on the input image as a reverse-phase candidate position, which is a candidate for a position at which jaggies are in a reverse phase to the target position, a weight value calculation unit for calculating a weight value based on a first degree of similarity between an image of the target position and an image of the normal-phase candidate position, and a weighted expected value calculation unit for calculating a weighted expected value based on the weight value and a pixel of the reverse-phase candidate position.

The reverse-phase candidate position selection unit may select a center position of a line segment connecting the target position and the normal-phase candidate position as the reverse-phase candidate position.

The normal-phase candidate position selection unit may select a position on a horizontal line separated by two lines from a horizontal line including the target position or a position on a vertical line separated by two lines from a vertical line including the target position as the normal-phase candidate position.

The image processing apparatus may further include an adjacent position selection unit for selecting positions adjacent to the top, bottom, left, and right of the target position as adjacent positions, and a lower limit calculation unit for calculating a lower limit of the first similarity degree based on second degrees of similarity between an image of the target position and images of the adjacent positions. The weight value calculation unit may calculate the weight value by performing threshold processing of the first similarity degree using the lower limit.

According to the first embodiment of the present technology, an image processing method or a program includes: selecting a position different from a target position on an input image as a normal-phase candidate position, which is a candidate for a position at which jaggies are in the same phase as the target position; selecting a position different from the target position on the input image as a reverse-phase candidate position, which is a candidate for a position at which jaggies are in a reverse phase to the target position; calculating a weight value based on a degree of similarity between an image of the target position and an image of the normal-phase candidate position; and calculating a weighted expected value based on the weight value and a pixel of the reverse-phase candidate position.

In the first embodiment of the present technology, a position different from a target position on an input image is selected as a normal-phase candidate position, which is a candidate for a position at which jaggies are in the same phase as the target position. A position different from the target position on the input image is selected as a reverse-phase candidate position, which is a candidate for a position at which jaggies are in a reverse phase to the target position. A weight value is calculated on the basis of a degree of similarity between an image of the target position and an image of the normal-phase candidate position. A weighted expected value is calculated on the basis of the weight value and a pixel of the reverse-phase candidate position.

In the second embodiment of the present technology, there is provided an image processing apparatus including a reverse-phase candidate position selection unit for selecting a position different from a target position on an input image as a reverse-phase candidate position, which is a candidate for a position at which jaggies are in a reverse phase to the target position, a smoothing unit for generating a smoothed image by smoothing the input image, a weight value calculation unit for calculating a weight value based on a first degree of similarity between an image of the target position on the smoothed image and an image of the reverse-phase candidate position on the smoothed image, and a weighted expected value calculation unit for calculating a weighted expected value based on a pixel of the reverse-phase candidate position on the input image and the weight value.

The reverse-phase candidate position selection unit may select a position on a horizontal line separated by one line from a horizontal line including the target position on the input image or a position on a vertical line separated by one line from a vertical line including the target position on the input image as the reverse-phase candidate position.

The image processing apparatus may further include an adjacent position selection unit for selecting positions adjacent to the top, bottom, left, and right of the target position on the smoothed image as adjacent positions, and a lower limit calculation unit for calculating a lower limit of the first similarity degree based on second degrees of similarity between an image of the target position on the smoothed image and images of the adjacent positions on the smoothed image. The weight value calculation unit may calculate the weight value by performing threshold processing of the first similarity degree using the lower limit.

In the second embodiment of the present technology, there is provided a program for causing a computer to execute a process including selecting a position different from a target position on an input image as a reverse-phase candidate position, which is a candidate for a position at which jaggies are in a reverse phase to the target position, generating a smoothed image by smoothing the input image, calculating a weight value based on a degree of similarity between an image of the target position on the smoothed image and an image of the reverse-phase candidate position on the smoothed image, and calculating a weighted expected value based on a pixel of the reverse-phase candidate position on the input image and the weight value.

In the second embodiment of the present technology, a position different from a target position on an input image is selected as a reverse-phase candidate position, which is a candidate for a position at which jaggies are in a reverse phase to the target position. A smoothed image is generated by smoothing the input image. A weight value is calculated on the basis of a degree of similarity between an image of the target position on the smoothed image and an image of the reverse-phase candidate position on the smoothed image. A weighted expected value is calculated on the basis of a pixel of the reverse-phase candidate position on the input image and the weight value.

In the second embodiment of the present technology, there is provided an image processing apparatus including a reverse-phase candidate position selection unit for selecting a position different from a target position on an input image as a reverse-phase candidate position, which is a candidate for a position at which jaggies are in a reverse phase to the target position, a weight value calculation unit for calculating a weight value based on a degree of angular similarity between an image of the target position and an image of the reverse-phase candidate position, and a weighted expected value calculation unit for calculating a weighted expected value based on a pixel of the reverse-phase candidate position and the weight value.

The reverse-phase candidate position selection unit may select a position on a horizontal line separated by one line from a horizontal line including the target position on the input image or a position on a vertical line separated by one line from a vertical line including the target position on the input image as the reverse-phase candidate position.

The image processing apparatus may further include a provisional jaggies reduction unit for performing a provisional process of generating a image in which jaggies are reduced using the image of the target position and the image of the reverse-phase candidate position, an edge direction estimation unit for estimating an edge direction of the image in which jaggies are reduced using the image in which jaggies are reduced generated by the provisional jaggies reduction unit, a parallelism determination unit for determining a degree of parallelism between the edge direction and relative coordinates of the reverse-phase candidate position based on the target position, and an angular similarity calculation unit for calculating a degree of angular similarity between the image of the target position and the image of the reverse-phase candidate position on the basis of the parallelism degree between the edge direction and the relative coordinates determined by the parallelism determination unit. The weight value calculation unit may calculate the weight value using the angular similarity degree calculated by the angular similarity calculation unit.

The image processing apparatus may further include an adjacent position selection unit for selecting positions adjacent to the top, bottom, left, and right of the target position as adjacent positions, and a lower limit calculation unit for calculating a lower limit of the angular similarity degree based on degrees of angular similarity between an image of the target position and images of the adjacent positions. The weight value calculation unit may perform threshold processing of the angular similarity degree according to the lower limit of the angular similarity degree calculated by the lower limit calculation unit.

In the third embodiment of the present technology, there is provided an image processing method for use in an image processing apparatus including a reverse-phase candidate position selection unit for selecting a position different from a target position on an input image as a reverse-phase candidate position, which is a candidate for a position at which jaggies are in a reverse phase to the target position, a weight value calculation unit for calculating a weight value based on a degree of angular similarity between an image of the target position and an image of the reverse-phase candidate position, and a weighted expected value calculation unit for calculating a weighted expected value based on a pixel of the reverse-phase candidate position and the weight value, the method including selecting, by the reverse-phase candidate position selection unit, the reverse-phase candidate position, calculating, by the weight value calculation unit, the weight value, and calculating, by the weighted expected value calculation unit, the weighted expected value.

In the third embodiment of the present technology, a position different from a target position on an input image is selected as a reverse-phase candidate position, which is a candidate for a position at which jaggies are in a reverse phase to the target position. A weight value is calculated on the basis of a degree of angular similarity between an image of the target position and an image of the reverse-phase candidate position. A weighted expected value is calculated on the basis of a pixel of the reverse-phase candidate position and the weight value.

In the fourth embodiment of the present technology, there is provided an image processing apparatus including a reverse-phase candidate position pair selection unit for selecting two points different from a target position on an input image as a pair of reverse-phase candidate positions, which are candidates for a position at which jaggies are in a reverse phase to the target position, point-symmetrically with respect to the target position, a weight value calculation unit for calculating a weight value based on a degree of similarity of images between the two points serving as the reverse-phase candidate positions, and a weighted expected value calculation unit for calculating a weighted expected value based on pixels of the reverse-phase candidate positions on the input image and the weight value.

The image processing apparatus may include an adjacent position pair selection unit for selecting a set of positions adjacent to the top and bottom of the target position or a set of positions adjacent to the left and right of the target position as a pair of adjacent positions, a lower similarity limit calculation unit for calculating lower similarity limits based on similarity of an image of the target position and each image of the adjacent position pair. The weight value calculation unit may perform threshold processing of the similarity degree of the images between the two points serving as the reverse-phase candidate position pair according to the lower similarity limits calculated by the lower similarity limit calculation unit.

In the fourth embodiment of the present technology, there is provided an image processing method for use in an image processing apparatus including a reverse-phase candidate position pair selection unit for selecting two points different from a target position on an input image as a pair of reverse-phase candidate positions, which are candidates for a position at which jaggies are in a reverse phase to the target position, point-symmetrically with respect to the target position, a weight value calculation unit for calculating a weight value based on a degree of similarity of images between the two points serving as the reverse-phase candidate positions, and a weighted expected value calculation unit for calculating a weighted expected value based on pixels of the reverse-phase candidate positions on the input image and the weight value, the method including selecting, by the reverse-phase candidate position pair selection unit, the reverse-phase candidate position pair. calculating, by the weight value calculation unit, the weight value, and calculating, by the weighted expected value calculation unit, the weighted expected value.

In the fourth embodiment of the present technology, two points different from a target position on an input image are selected as a pair of reverse-phase candidate positions, which are candidates for a position at which jaggies are in a reverse phase to the target position, point-symmetrically with respect to the target position. A weight value is calculated on the basis of a degree of similarity of images between the two points serving as the reverse-phase candidate positions. A weighted expected value is calculated on the basis of pixels of the reverse-phase candidate positions on the input image and the weight value.

According to the embodiments of the present technology described above, it is possible to more easily and reliably reduce jaggies of an image.

DETAILED DESCRIPTION OF THE EMBODIMENT(S)

Figure 1:
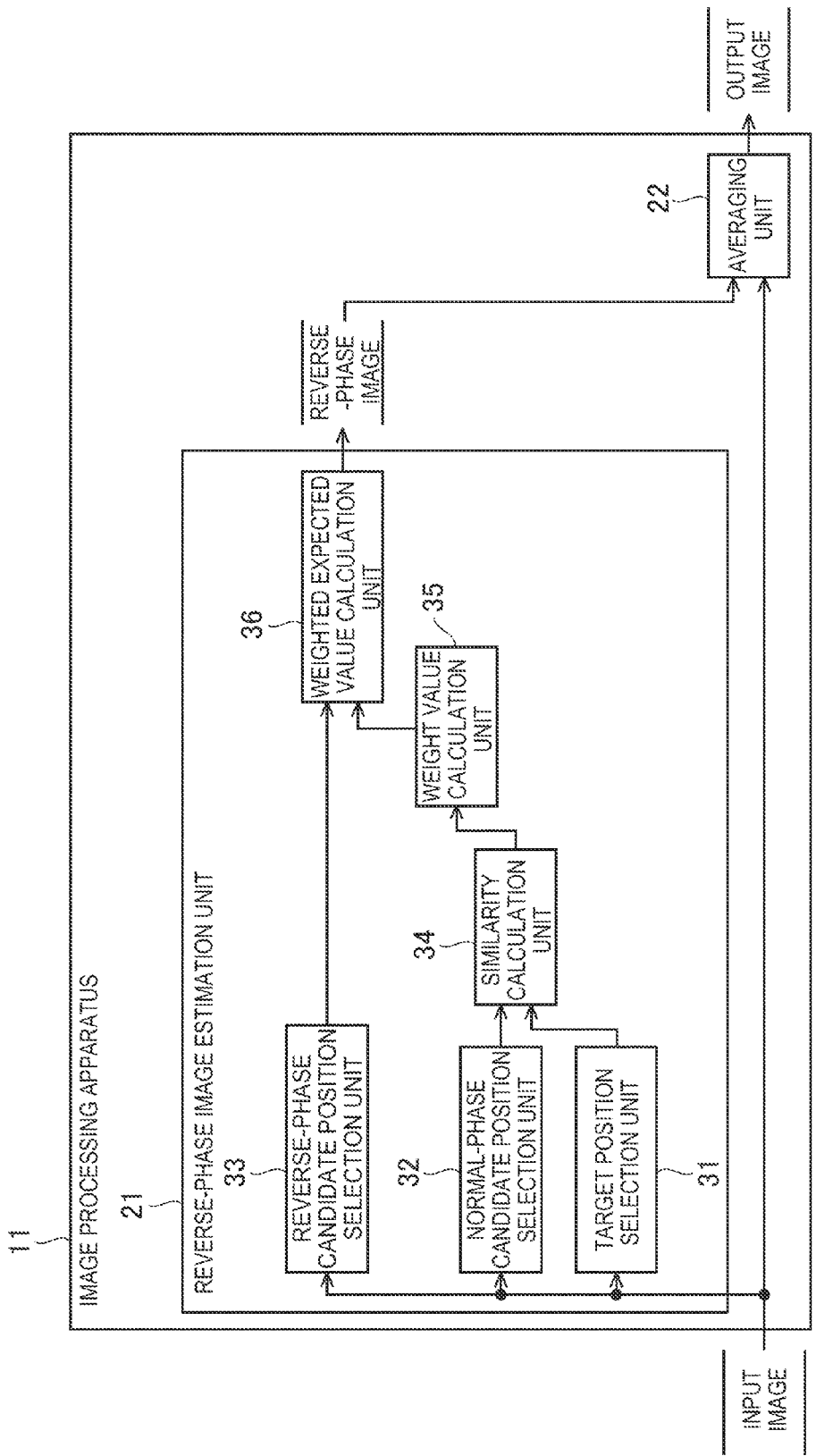
FIG. 1 is a diagram illustrating a configuration example of an embodiment of an image processing apparatus.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments to which the present technology is applied will be described with reference to the drawings.

<First Embodiment>

[Configuration Example of Image Processing Apparatus]

FIG. 1 is a diagram illustrating a configuration of an embodiment of the image processing apparatus to which the present technology is applied.

The image processing apparatus 11 reduces jaggies generated when an image is enlarged or reduced by pixel thinning or the like, for example such as when an image is printed or displayed. That is, the image processing apparatus 11 converts a supplied input image into an output image in which jaggies on the input image are reduced, and outputs the output image.

The image processing apparatus 11 includes a reverse-phase image estimation unit 21 and an averaging unit 22. The reverse-phase image estimation unit 21 generates a reverse-phase image by reversing only a phase of a component of jaggies in the input image on the basis of the supplied input image, and supplies the reverse-phase image to the averaging unit 22.

The reverse-phase image estimation unit 21 includes a target position selection unit 31, a normal-phase candidate position selection unit 32, a reverse-phase candidate position selection unit 33, a similarity calculation unit 34, a weight value calculation unit 35, and a weighted expected value calculation unit 36.

The target position selection unit 31 sequentially selects a pixel position of the supplied input image as a target position, and supplies the similarity calculation unit 34 with each pixel within a predetermined region of which the center is the pixel in the selected position (hereinafter referred to as a target pixel). Hereinafter, the predetermined region of which the center is the target pixel is referred to as a target block.

The normal-phase candidate position selection unit 32 selects several positions having a predetermined positional relationship with a target position on the supplied input image as normal-phase candidate positions. The normal-phase candidate position selection unit 32 supplies the similarity calculation unit 34 with each pixel within a predetermined region of which the center is a pixel in a normal-phase candidate position (hereinafter also referred to as a normal-phase candidate pixel) for every normal-phase candidate position.

Hereinafter, the predetermined region of which the center is the normal-phase candidate pixel is also referred to as a normal-phase candidate block. The normal-phase candidate block has the same size as the target block, and is a region serving as a candidate for a region (image) at which jaggies have the same phase as the target block.

The reverse-phase candidate position selection unit 33 selects a position between the target position and the normal-phase candidate position on the supplied input image as a reverse-phase candidate position, and supplies the weighted expected value calculation unit 36 with a pixel in the reverse-phase candidate position (hereinafter also referred to as a reverse-phase candidate pixel). The reverse-phase candidate pixel serves as a candidate for a pixel at which jaggies have a reverse phase to the target pixel.

The similarity calculation unit 34 calculates a degree of similarity between the target block supplied from the target position selection unit 31 and the normal-phase candidate block supplied from the normal-phase candidate position selection unit 32, and supplies the similarity degree to the weight value calculation unit 35. In the similarity calculation unit 34, degrees of similarity are calculated for every plurality of normal-phase candidate positions (normal-phase candidate blocks) selected for one target position. The weight value calculation unit 35 calculates a weight value based on the similarity degree supplied from the similarity calculation unit 34, and supplies the weight value to the weighted expected value calculation unit 36.

The weighted expected value calculation unit 36 generates a reverse-phase image by calculating a weighted expected value for the target position based on the reverse-phase candidate pixel from the reverse-phase candidate position selection unit 33 and the weight value from the weight value calculation unit 35, and supplies the weighted expected value to the averaging unit 22.

In addition, the averaging unit 22 generates an output image by obtaining an average image between the reverse-phase image supplied from the weighted expected value calculation unit 36 and the supplied input image, and outputs the output image.

[Description of Process of Reducing Jaggies]

Incidentally, if an input image is supplied to the image processing apparatus 11 and an instruction to reduce jaggies for the input image is generated, the image processing apparatus 11 generates an output image by performing the process of reducing jaggies. Hereinafter, the process of reducing jaggies by the image processing apparatus 11 will be described with reference to the flowchart of FIG. 2.

In step S11, the target position selection unit 31 selects one pixel position on the supplied input image as a target position. For example, each pixel position on the input image is sequentially selected in raster order. The target position selection unit 31 extracts a target block of which the center is the selected target position from the input image, and supplies the extracted target block to the similarity calculation unit 34.

In step S12, the normal-phase candidate position selection unit 32 selects a normal-phase candidate position for the target position in the input image, extracts the normal-phase candidate block of which the center is the normal-phase candidate position from the supplied input image, and supplies the normal-phase candidate block to the similarity calculation unit 34.

In step S13, the reverse-phase candidate position selection unit 33 selects a pixel position serving as the center of a line segment connecting the target position and the normal-phase candidate position in the input image as a reverse-phase candidate position, extracts a reverse-phase candidate pixel from the supplied input image, and supplies the extracted reverse-phase candidate pixel to the weighted expected value calculation unit 36.

Figure 3:
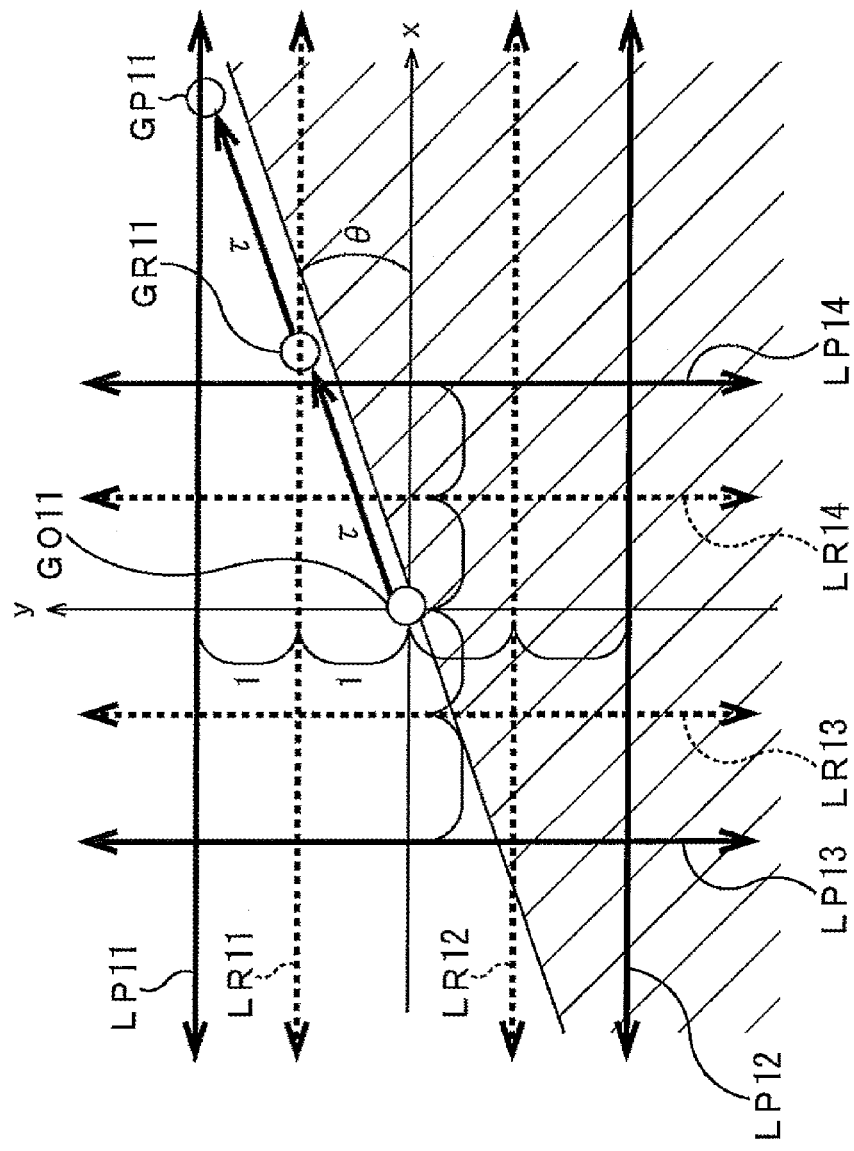
FIG. 3 is a diagram illustrating positions of a normal-phase candidate pixel and a reverse-phase candidate pixel.

For example, as illustrated in FIG. 3, a pixel GO11 in a predetermined position (hereinafter referred to as a target pixel GO11) on the input image is selected as the target pixel. In the example of FIG. 3, in the drawing on the input image, a region of a diagonal portion is a region of a predetermined subject, and the target pixel GO11 is positioned in an edge portion of the region of the diagonal portion.

At this time, if a lateral direction is an x direction (horizontal direction) and a longitudinal direction is a y direction (vertical direction) in the drawing in the input image, the normal-phase candidate position selection unit 32 designates lines separated by two lines (two pixels) on the top, bottom, left, and right from the target pixel GO11 in the drawing as normal-phase pixel search lines. That is, a horizontal line separated by two lines from a horizontal line including the target pixel GO11 and a vertical line separated by two lines from a vertical line including the target pixel GO11 serve as normal-phase pixel search lines.

In the example of FIG. 3, lines of the horizontal direction separated by two lines on upper and lower sides from the target pixel GO11 in the drawing serve as normal-phase pixel search lines LP11 and LP12. In addition, lines of the vertical direction separated by two lines on left and right sides from the target pixel GO11 in the drawing serve as normal-phase pixel search lines LP13 and LP14.

The normal-phase candidate position selection unit 32 sequentially selects pixels within a predetermined range on the normal-phase pixel search lines LP11 to LP14 as normal-phase candidate pixels. Therefore, normal-phase candidate pixels of which the number is predetermined are selected with respect to one target pixel GO11. In the example of FIG. 3, the pixel GP11 on the normal-phase pixel search line LP11 (hereinafter also referred to as a normal-phase candidate pixel GP11) is selected as a normal-phase candidate pixel.

In principle, a position serving as a normal-phase position is limited for one target pixel GO11. Thus, it is possible to narrow a search range and reduce a calculation amount by designating horizontal and vertical lines separated by two lines from the target pixel GO11 as normal-phase pixel search lines and designating a predetermined range on the normal-phase pixel search lines as a search range of a normal-phase candidate pixel.

If the normal-phase candidate pixel is selected as described above, the reverse-phase candidate position selection unit 33 selects the reverse-phase candidate pixel by designating a range defined from the target pixel GO11 and the normal-phase pixel search lines LP11 to LP14 as a search range. That is, the search range of the reverse-phase candidate pixel serves as reverse-phase pixel search lines LR11 to LR14, which are the horizontal or vertical lines positioned between the target pixel GO11 and the normal-phase pixel search lines LP11 to LP14.

Specifically, for example, the reverse-phase candidate position selection unit 33 selects a pixel GR11 (hereinafter referred to as a reverse-phase candidate pixel GR11) in a center position of a line segment connecting the selected normal-phase candidate pixel GP11 and the target pixel GO11 as a reverse-phase candidate pixel.

Figure 4:
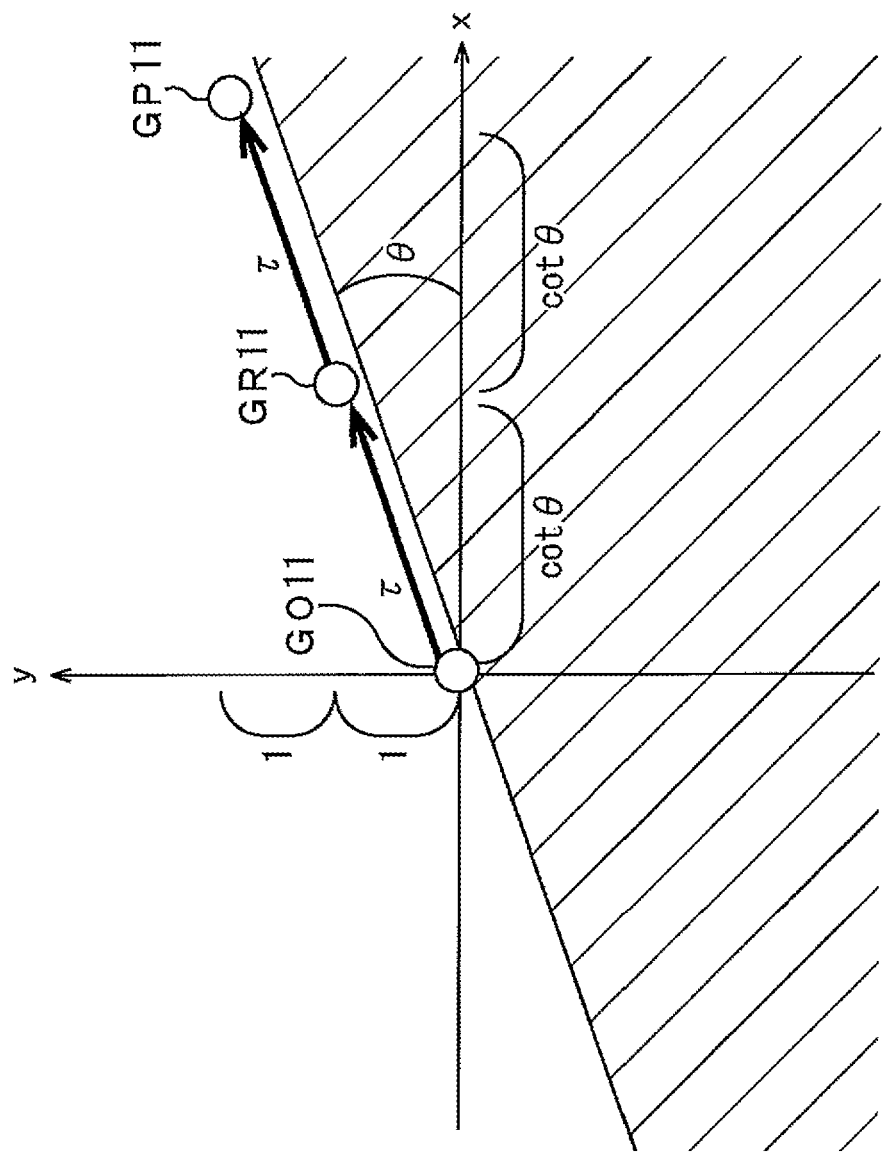
FIG. 4 is a diagram illustrating positions of a normal-phase candidate pixel and a reverse-phase candidate pixel.

Here, as illustrated in FIG. 4, if a straight line connecting the normal-phase candidate pixel GP11 and the target pixel GO11 forms an angle θ with an x direction and the origin of an xy coordinate system is in a position of the target pixel GO11, the straight line connecting the normal-phase candidate pixel GP11 and the target pixel GO11 is expressed by y=x×tan θ. In addition, a distance of the y direction (vertical direction) between the target pixel GO11 and the normal-phase candidate pixel GP11 is 2 (two pixels).

Therefore, τy, which is a y component of an arrow τ connecting the target pixel GO11 and the reverse-phase candidate pixel GR11, is τy=(1/sin θ)×sin θ=1, and τx, which is an x component of the arrow τ, is τx=(1/sin θ)×cos θ=cot θ. From these calculation results, a position of the reverse-phase candidate pixel GR11 can be specified to be in a position separated by 1 in the y direction at cot θ in the x direction from the target pixel GO11.

The normal-phase candidate pixel selected as described above is a candidate for a normal-phase pixel at which jaggies have the same phase as the target pixel (a normal phase in jaggies). Because an image of a region adjacent to the normal-phase pixel is exactly the same as an image of a region adjacent to the target pixel, the similarity degree becomes high.

On the other hand, the reverse-phase candidate pixel is a candidate for a reverse-phase pixel at which jaggies have a reverse phase to the target pixel (a reverse phase in jaggies). Although the image of the region adjacent to the reverse-phase pixel is similar to the image of the region adjacent to the target pixel, these images are different from each other, so that it is difficult to detect the reverse-phase pixel from the similarity degree between the target pixel and the reverse-phase candidate pixel.

Although the reverse-phase image estimation unit 21 generates a reverse-phase image having a phase reverse to that of the input image in terms of only a component of jaggies, a pixel value of the reverse-phase pixel for the target pixel is necessary. However, it is difficult to directly detect the reverse-phase pixel for the target pixel.

The reverse-phase candidate position selection unit 33 extracts an intermediate position between the normal-phase candidate pixel and the target pixel as a reverse-phase candidate pixel using a characteristic that a reverse-phase pixel is in an intermediate position between the target pixel and a normal-phase pixel. As described above, it is possible to easily obtain a candidate for a pixel at which jaggies have a reverse phase to the target pixel by specifying the reverse-phase candidate pixel based on the normal-phase candidate pixel.

Figure 2:
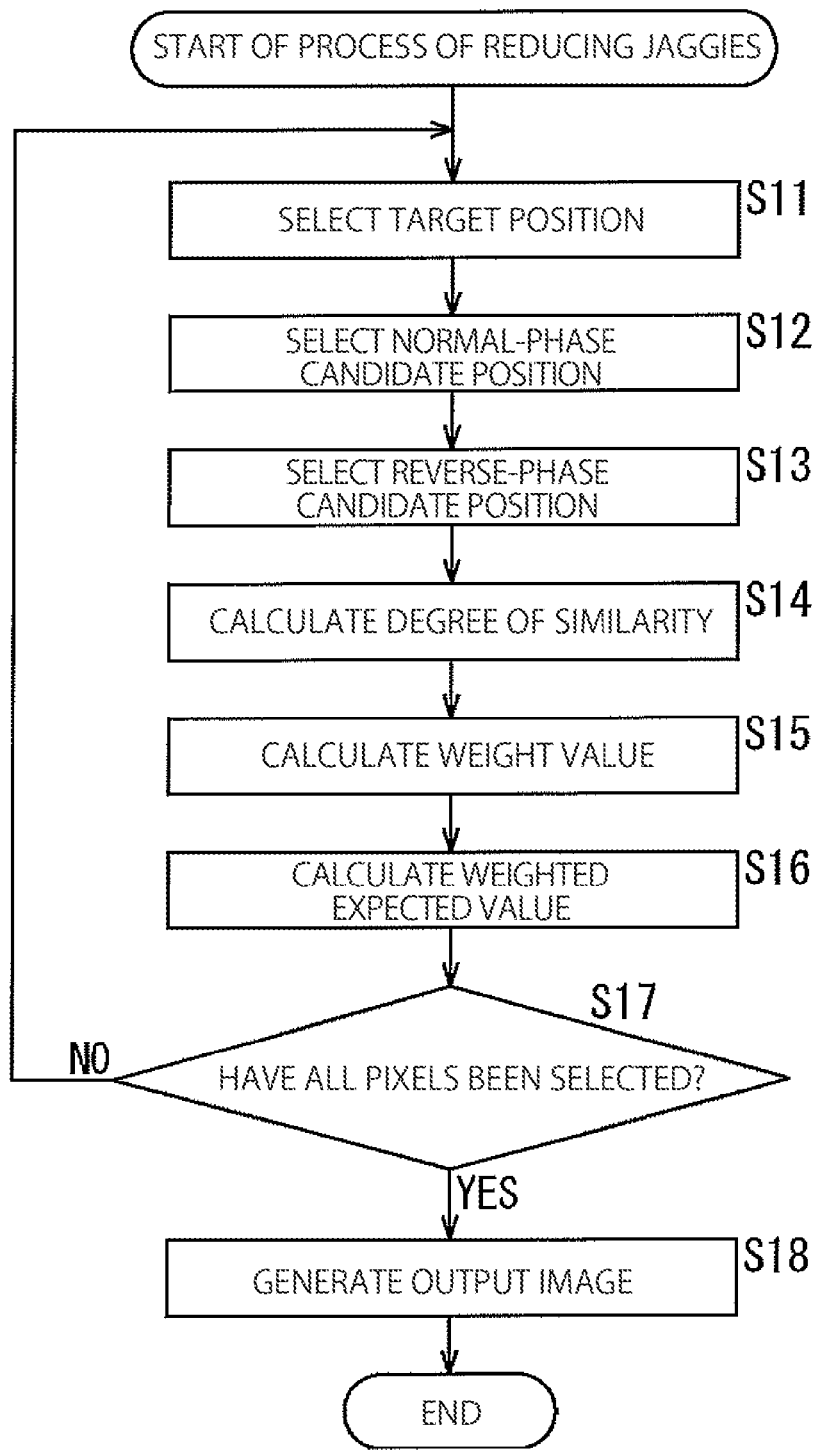
FIG. 2 is a flowchart illustrating a process of reducing jaggies.

Returning to the description of the flowchart of FIG. 2, in step S14, the similarity calculation unit 34 calculates a degree of similarity between a target block supplied from the target position selection unit 31 and a normal-phase candidate block supplied from the normal-phase candidate position selection unit 32, and supplies the calculated similarity degree to the weight value calculation unit 35.

For example, the similarity calculation unit 34 calculates the similarity degree by calculating the following Equation (1).

$$[\text{Degree of Similarity}] = k \cdot e^{-\frac{D^2}{2\sigma^2}} \quad (1)$$

In Equation (1), k and σ are predetermined constants and $D^2$ is a function indicated by Equation (2).

$$D^2 = \frac{1}{N_\Omega} \sum_{p \in \Omega} (I(p + \Delta p) - I(p))^2 \quad (2)$$

In Equation (2), p denotes a position of a pixel within the target block, and I(p) denotes a pixel value of the pixel. In addition, Δp denotes a distance from the target block to the normal-phase candidate block, and Ω denotes a pixel set belonging to the target block. Further, $N_\Omega$ denotes the number of pixels belonging to the target block.

$D^2$ indicated by Equation (2) is an average value of a square of a difference between a pixel within the target block and a pixel within the normal-phase candidate block having the same position as the pixel within the target block. Therefore, the higher the similarity degree between the target block and the normal-phase candidate block, the larger a value of the similarity degree obtained by the calculation of Equation (1). The similarity degree obtained as described above can indicate a likelihood of a reverse-phase pixel as the reverse-phase candidate pixel for the target pixel, that is, a degree of certainty of a reverse-phase position.

The similarity calculation unit 34 calculates degrees of similarity for every plurality of normal-phase candidate pixels (normal-phase candidate blocks), and supplies the similarity degrees to the weight value calculation unit 35.

In step S15, the weight value calculation unit 35 calculates a weight value based on a degree of similarity for every similarity degree supplied from the similarity calculation unit 34, and supplies the calculated weight value to the weighted expected value calculation unit 36.

For example, the weight value calculation unit 35 inputs the similarity degree to a monotonically increasing function within a predetermined range, and designates an obtained value as a weight value. The weight value may be defined so that the more the similarity degree increases, the more the weight value increases. For example, the similarity degree may directly become the weight value.

In step S16, the weighted expected value calculation unit 36 calculates a weighted expected value for the target position on the basis of the reverse-phase candidate pixel from the reverse-phase candidate position selection unit 33 and the weight value from the weight value calculation unit 35.

That is, the weighted expected value calculation unit 36 calculates a weighted expected value by multiplying weight values of normal-phase candidate pixels selected for one target pixel by pixel values of reverse-phase candidate pixels corresponding to the normal-phase candidate pixels and normalizing a sum of the pixel values multiplied by the weight values. The weighted expected value calculated as described above becomes a pixel value of a pixel of a reverse-phase image having the same position as the target pixel.

In step S17, the image processing apparatus 11 determines whether or not all pixels on the input image have been selected as target pixels.

If not all the pixels are determined to have been selected in step S17, the process returns to step S11 and the above-described process is iterated. That is, the next pixel on the input image is selected as a target pixel in a target position, and a pixel value of a pixel of a reverse-phase image having the same position as the target pixel is obtained.

On the other hand, if all the pixels are determined to have been selected in step S17, the weighted expected value calculation unit 36 supplies the averaging unit 22 with the reverse-phase image obtained in the process of steps S11 to S16, and the process proceeds to step S18.

In step S18, the averaging unit 22 generates and outputs an output image based on the reverse-phase image from the weighted expected value calculation unit 36 and the supplied input image.

For example, an average value of pixel values of pixels in the same position between the reverse-phase image and the input image becomes a pixel value of a pixel of an output image having the same position as the pixels. As described above, the output image in which a component of jaggies is removed from the input image by designating an average image between the reverse-phase image and the input image is obtained as the output image. If the output image is generated, the process of reducing jaggies is ended.

As described above, the image processing apparatus 11 designates horizontal or vertical lines separated by two lines in directions of the top, bottom, left, and right of the target pixel as a search range, and selects a normal-phase candidate pixel. The image processing apparatus 11 calculates a weight value from a degree of similarity between a region adjacent to the target pixel and a region adjacent to the normal-phase candidate pixel, and generates a reverse-phase image by adding a pixel value of a reverse-phase candidate pixel defined from a positional relationship between the target pixel and the reverse-phase candidate pixel to a weight value according to weighted addition and normalizing a result of the weighted addition.

As described above, it is possible to more easily and reliably reduce the jaggies occurring in an image by performing weighted addition of reverse-phase candidate pixels according to degrees of similarity between a target pixel and normal-phase candidate pixels.

A process of calculating the degree of similarity between the target pixel and the normal-phase candidate pixel is the same as a process of searching for a pixel at which jaggies have the same phase (normal phase) as the target pixel, that is, a normal-phase pixel, according to block matching. Therefore, a process by the image processing apparatus 11 can be referred to as a process of reducing the jaggies using the block matching.

In the related art in which pixel interpolation is performed using the block matching, there is a problem in that wrong interpolation is performed because a phase of jaggies the target pixel is not considered. On the other hand, the image processing apparatus 11 can easily and reliably obtain a reverse-phase image by reversing a phase of jaggies serving as a correction signal of the input image. That is, it is possible to search for an appropriate correction signal for the target pixel.

In addition, it is possible to reduce jaggies at an angle that is not handled by a local operator because the process by the image processing apparatus 11 is a process using the block matching, and images of a plurality of frames are not necessary for reduction of jaggies because the process is completed within a frame of an input image.

Further, the image processing apparatus 11 performs a search of a normal-phase pixel by the block matching by designating two horizontal lines positioned on the top and bottom of the target pixel and two vertical lines positioned on the left and right of the target pixel as a search range.

For example, if the input image is an image obtained by enlarging a predetermined image to twice its size, it is possible to handle jaggies at every angle by designating a predetermined range of horizontal and vertical lines separated by two lines on the top, bottom, left, and right from the target pixel as a normal-phase pixel search range in principle.

On the other hand, a normal-phase pixel is not reliably searched for because only two horizontal lines are designated as a search range in the related art in which the pixel interpolation is performed using the block matching. Further, it is not possible to appropriately reduce jaggies in a portion such as an edge end because the two horizontal lines are not independent from each other.

<Second Embodiment>

[Configuration Example of Image Processing Apparatus]

Although a weight value has been described above as being calculated from a degree of similarity, a normal-phase candidate pixel completely different from the target pixel may be excluded from the calculation of a weighted expected value by obtaining a lower limit of the similarity degree and performing threshold processing according to the lower limit when the weight value is calculated.

Figure 5:
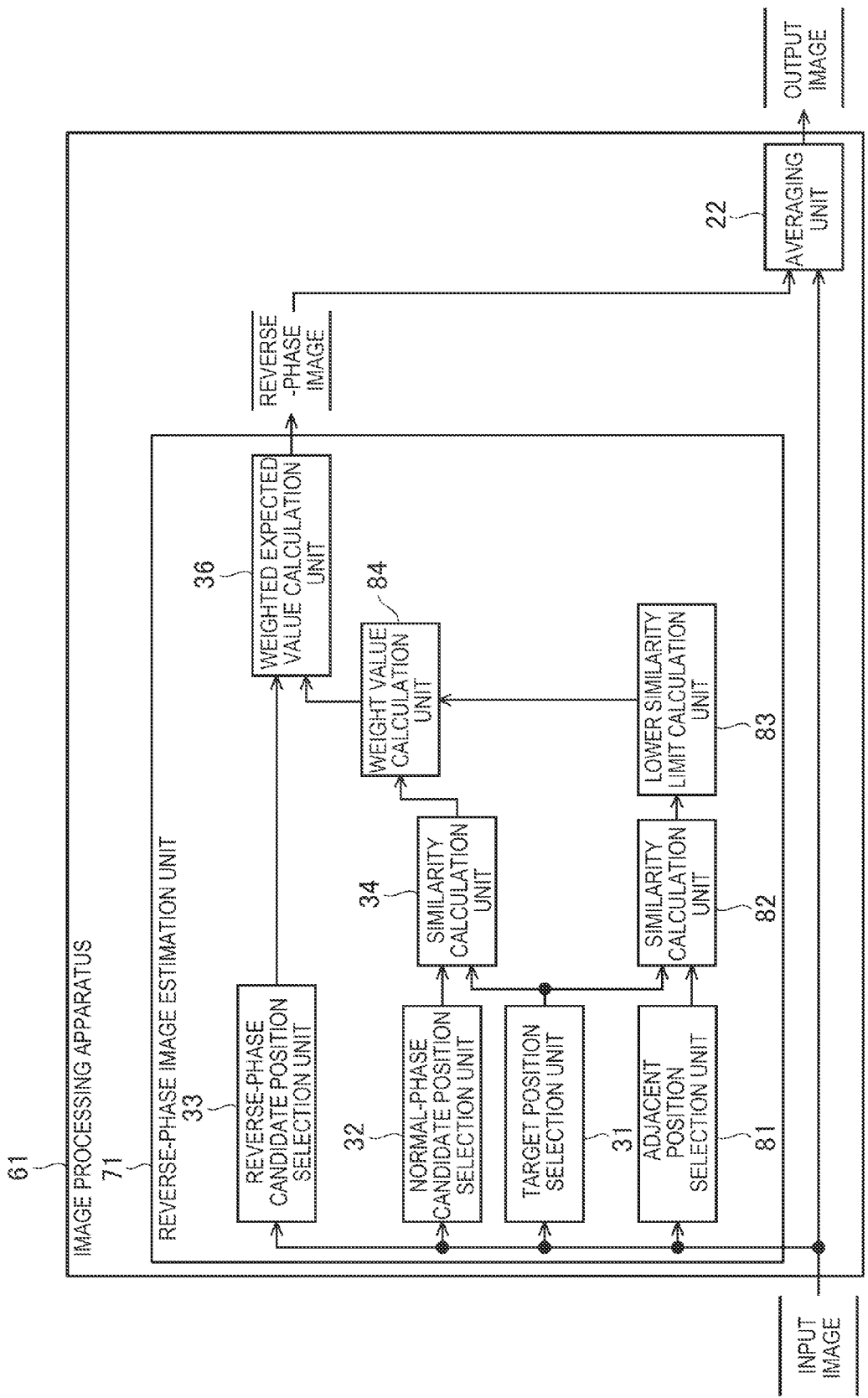
FIG. 5 is a diagram illustrating another configuration example of the image processing apparatus.

In this case, the image processing apparatus is constituted, for example, as illustrated in FIG. 5. The same parts corresponding to those of FIG. 1 are denoted by the same reference numerals in FIG. 5, and description thereof is omitted.

The image processing apparatus 61 of FIG. 5 includes a reverse-phase image estimation unit 71 and an averaging unit 22.

The reverse-phase image estimation unit 71 generates a reverse-phase image from a supplied input image, and supplies the reverse-phase image to the averaging unit 22. The reverse-phase image estimation unit 71 includes a target position selection unit 31, a normal-phase candidate position selection unit 32, a reverse-phase candidate position selection unit 33, a similarity calculation unit 34, a weighted expected value calculation unit 36, an adjacent position selection unit 81, a similarity calculation unit 82, a lower similarity limit calculation unit 83, and a weight value calculation unit 84.

The adjacent position selection unit 81 selects four pixel positions adjacent to the top, bottom, left, and right of a target position serving as an object to be processed as adjacent positions on the input image, and supplies the similarity calculation unit 82 with a region having the same size as a target block of which the center is a pixel in each adjacent position as an adjacent block. Hereinafter, the pixel in the adjacent position on the input image is also referred to as an adjacent pixel.

The similarity calculation unit 82 calculates a degree of similarity between a target block supplied from the target position selection unit 31 and the adjacent block supplied from the adjacent position selection unit 81, and supplies the similarity degree to the lower similarity limit calculation unit 83. In the similarity calculation unit 82, degrees of similarity are calculated for every four adjacent positions selected for one target position.

The lower similarity limit calculation unit 83 calculates one lower limit of the similarity degree based on four similarity degrees supplied from the similarity calculation unit 82, and supplies the one lower limit to the weight value calculation unit 84. The weight value calculation unit 84 calculates a weight value based on the similarity from the similarity calculation unit 34 and the lower limit from the lower similarity limit calculation unit 83, and supplies the calculated weight value to the weighted expected value calculation unit 36.

[Description of Process of Reducing Jaggies]

Next, the process of reducing jaggies by the image processing apparatus 61 will be described with reference to the flowchart of FIG. 6. Because the process of steps S41 and S42 is the same as the process of steps S11 and S12 of FIG. 2, description thereof is omitted. However, in step S41, the target position selection unit 31 supplies a target block of which the center is a selected target position to the similarity calculation units 34 and 82.

In step S43, the adjacent position selection unit 81 selects positions of four adjacent pixels adjacent to the top, bottom, left, and right of the target position on the input image as adjacent positions, and supplies an adjacent block of which the center is each adjacent pixel to the similarity calculation unit 82.

Figure 7:
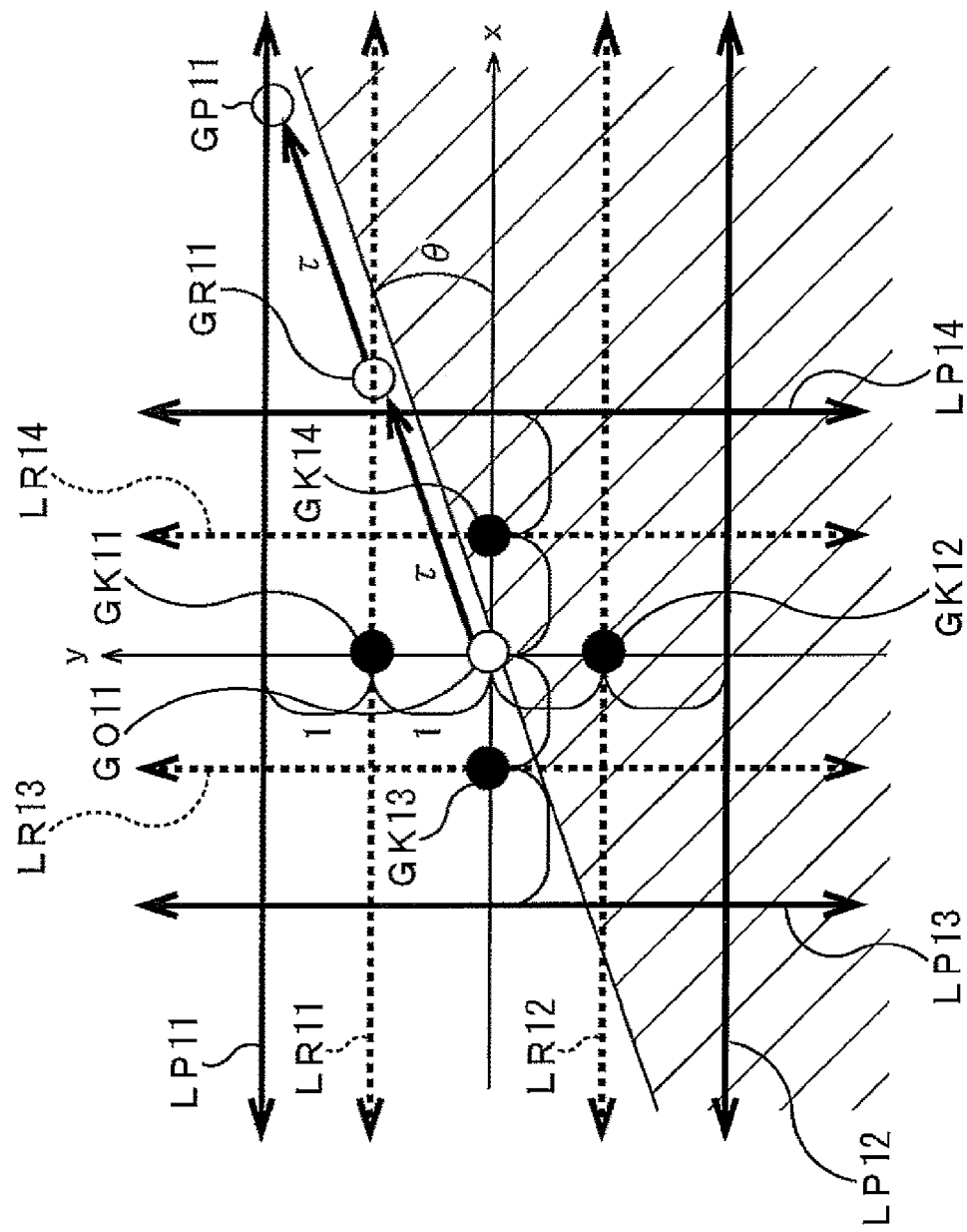
FIG. 7 is a diagram illustrating a position of an adjacent pixel.

For example, as illustrated in FIG. 7, adjacent pixels GK11 to GK14, which are pixels each adjacent to the top, bottom, left, and right of the target pixel GO11, are selected in the drawing. Adjacent blocks of which the centers are the adjacent pixels GK11 to GK14 are supplied to the similarity calculation unit 82.

The same parts corresponding to those of FIG. 3 are denoted by the same reference numerals in FIG. 7, and description thereof is omitted.

Although each adjacent block selected as described above is similar to an image of a region of a target block, the adjacent block is an image different from the target block and is an inappropriate region for selection as a normal-phase candidate block for the target position. Thus, if this inappropriate region is designated as a normal-phase candidate block and a weighted expected value is calculated using a reverse-phase candidate pixel corresponding to the normal-phase candidate block, the reverse-phase image is not accurately obtained and the quality of an output image is rather degraded.

The image processing apparatus 61 obtains a lower limit of a degree of similarity by calculating the degree of similarity of the adjacent block as described above. The image processing apparatus 61 designates a normal-phase candidate block of which a degree of similarity is less than or equal to the obtained lower limit as an inappropriate block, and a reverse-phase candidate pixel corresponding to the normal-phase candidate block is substantially excluded from the calculation of a weighted expected value.

Figure 6:
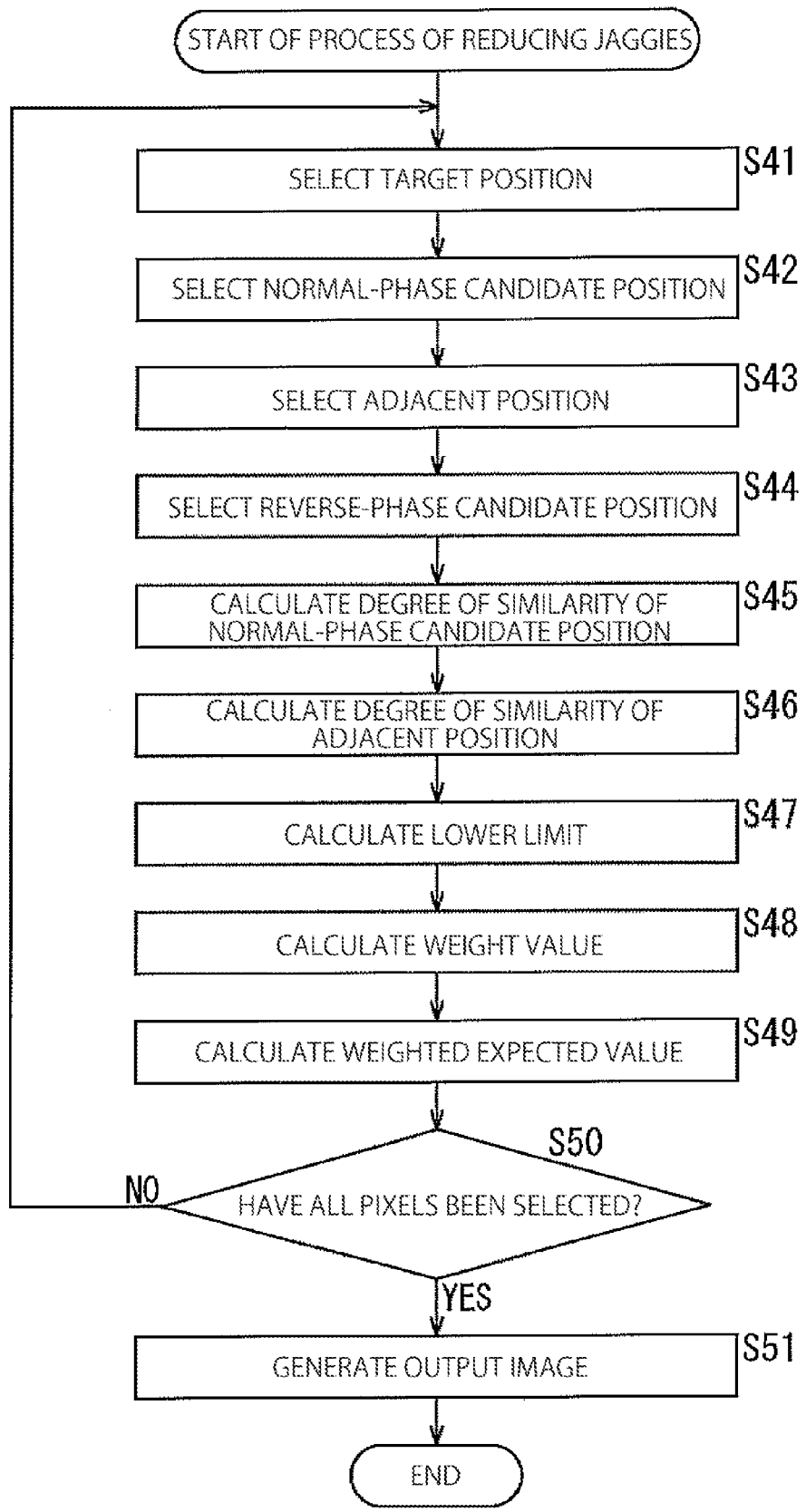
FIG. 6 is a flowchart illustrating a process of reducing jaggies.

Returning to the description of the flowchart of FIG. 6, the process proceeds from step S43 to step S44 if the adjacent block is extracted and supplied to the similarity calculation unit 82. Thereafter, the process of steps S44 and S45 is performed.

That is, in step S44, a reverse-phase candidate position for each normal-phase candidate position is selected, and a reverse-phase candidate pixel is supplied from the reverse-phase candidate position selection unit 33 to the weighted expected value calculation unit 36. In step S45, a degree of similarity between each normal-phase candidate block and the target block is calculated, and the similarity degree of each normal-phase candidate position is supplied from the similarity calculation unit 34 to the weight value calculation unit 84.

Because the process of steps S44 and S45 is the same as the process of steps S13 and S14 of FIG. 2, description thereof is omitted.

In step S46, the similarity calculation unit 82 calculates a degree of similarity between the target block supplied from the target position selection unit 31 and the adjacent block supplied from the adjacent position selection unit 81, and supplies the similarity degree to the lower similarity limit calculation unit 83. For example, the similarity degree of each adjacent block is calculated by carrying out the same calculation as in the above-described Equation (1).

In step S47, the lower similarity limit calculation unit 83 calculates a lower similarity limit based on the similarity degree of each adjacent block supplied from the similarity calculation unit 82, and supplies the lower limit to the weight value calculation unit 84. For example, the lower limit is a largest value, a smallest value, or an expected value of four similarity degrees, or the like. As long as the calculation of the lower limit is basically intended to reflect the similarity degrees of four adjacent blocks and is a calculation capable of obtaining a representative value from the similarity degrees, the lower limit may be calculated in any method.

In step S48, the weight value calculation unit 84 calculates a weight value for every similarity degree on the basis of the similarity degree of each normal-phase candidate block from the similarity calculation unit 34 and the lower limit from the lower similarity limit calculation unit 83, and supplies the calculated weight value to the weighted expected value calculation unit 36.

For example, the weight value calculation unit 84 calculates a weight value by carrying out the calculation of the following Equation (3).

$$[\text{Weight Value}] = \begin{cases} [\text{Similarity Degree}] - [\text{Lower Similarity Limit}] \\ \quad \text{if } [\text{Similarity Degree}] > [\text{Lower Similarity Limit}] \\ 0 \qquad\qquad\qquad\qquad\qquad\quad \text{otherwise} \end{cases} \quad (3)$$

That is, if the similarity degree is greater than the lower limit, a difference between the similarity degree and the lower limit becomes a weight value. If the similarity degree is less than or equal to the lower limit, a weight value becomes 0. In other words, the similarity degree is subjected to threshold processing according to the lower limit and the weight value is calculated.

If the weight value is calculated, then the process of steps S49 to S51 is performed and the process of reducing jaggies is ended. Because the above-described process is the same as the process of steps S16 to S18 of FIG. 2, description thereof is omitted.

As described above, the image processing apparatus 61 obtains similarity degrees of adjacent blocks of which the centers are adjacent pixels adjacent to the top, bottom, left, and right (horizontal and vertical directions) of the target position when a reverse-phase image is generated, and calculates a lower limit from the similarity degrees. The image processing apparatus 61 designates a weight value of an inappropriate reverse-phase candidate pixel as 0 on the basis of the obtained lower limit, and does not substantially use the weight value of 0 in the calculation of a weighted expected value.

It is possible to avoid a primarily completely different image from being selected as a correction signal by determining the lower limit of the similarity degree as described above. Thereby, it is possible to prevent a negative effect such as the collapse of a fine-amplitude pattern of an input image in a process of reducing jaggies for the input image and obtain a higher-quality output image.

<Third Embodiment>
[Configuration Example of Image Processing Apparatus]

Although an example in which a weight value of a reverse-phase candidate pixel is calculated on the basis of a degree of similarity between a target position and a normal-phase candidate position has been described above, the weight value may be calculated on the basis of a block of which the center is a reverse-phase candidate pixel.

Figure 8:
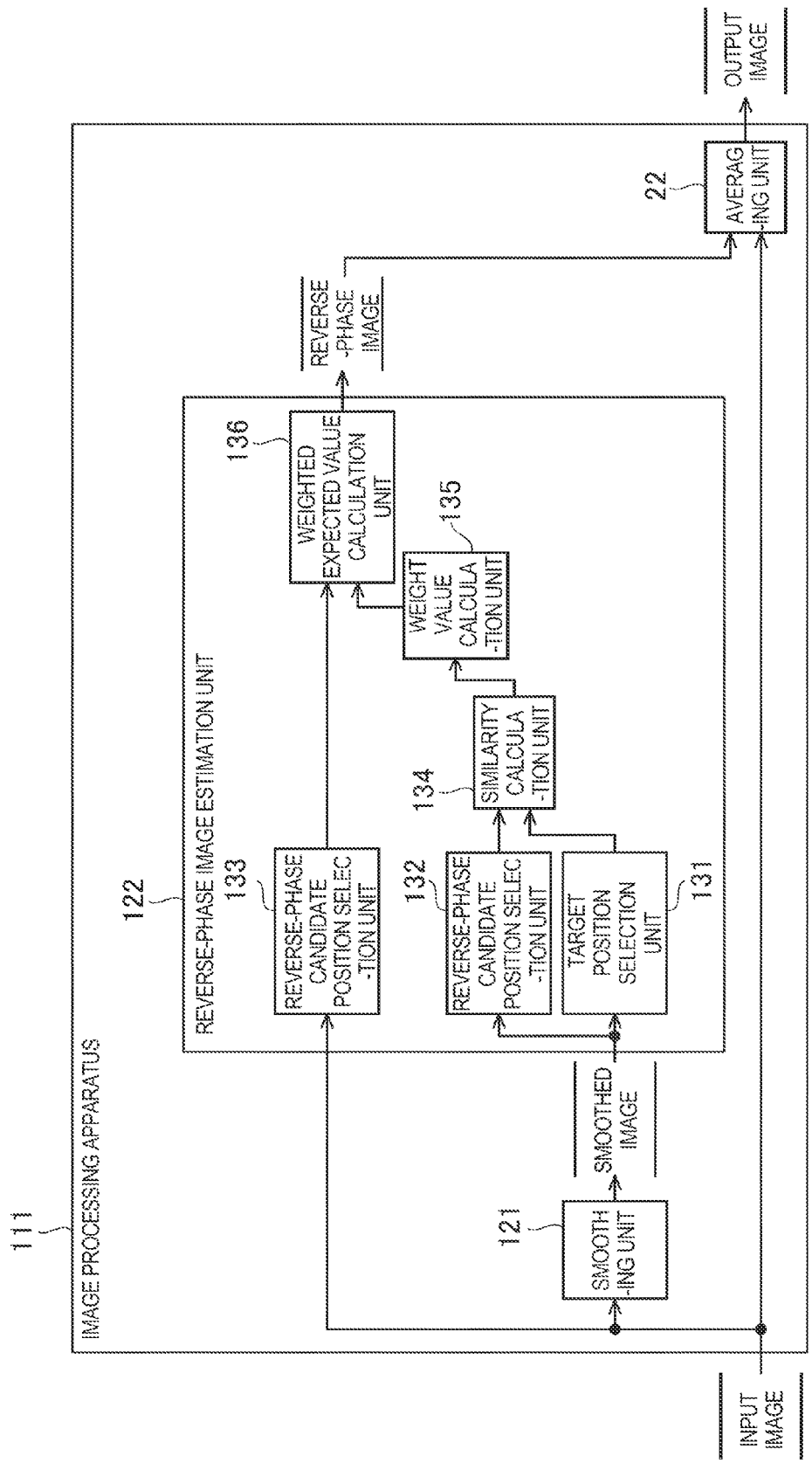
FIG. 8 is a diagram illustrating another configuration example of the image processing apparatus.

In this case, the image processing apparatus is constituted, for example, as illustrated in FIG. 8.

The image processing apparatus 111 of FIG. 8 includes a smoothing unit 121, a reverse-phase image estimation unit 122, and an averaging unit 22. The same parts corresponding to those of FIG. 1 are denoted by the same reference numerals in FIG. 8, and description thereof is appropriately omitted.

The smoothing unit 121 smooths a supplied input image and supplies the smoothed image obtained as its result to the reverse-phase image estimation unit 122.

The reverse-phase image estimation unit 122 generates a reverse-phase image based on the smoothed image from the smoothing unit 121 and the supplied input image, and supplies the reverse-phase image to the averaging unit 22. The reverse-phase image estimation unit 122 includes a target position selection unit 131, a reverse-phase candidate position selection unit 132, a reverse-phase candidate position selection unit 133, a similarity calculation unit 134, a weight value calculation unit 135, and a weighted expected value calculation unit 136.

The target position selection unit 131 sequentially selects a pixel position on the smoothed image from the smoothing unit 121 as a target position, and supplies a target block of which the center is a pixel in the target position to the similarity calculation unit 134. The reverse-phase candidate position selection unit 132 selects several positions having a predetermined positional relationship with the target position on the smoothed image from the smoothing unit 121 as reverse-phase candidate positions and supplies the reverse-phase candidate positions to the similarity calculation unit 134. Here, the reverse-phase candidate block is a block having the same size as the target block.

The reverse-phase candidate position selection unit 133 supplies the weighted expected value calculation unit 136 with a pixel in the reverse-phase candidate position selected by the reverse-phase candidate position selection unit 132 in the supplied input image as a reverse-phase candidate pixel. Hereinafter, the reverse-phase candidate pixel on the smoothed image selected by the reverse-phase candidate position selection unit 132 is also appropriately referred to as a smoothed reverse-phase candidate pixel, and the reverse-phase candidate pixel on the input image selected by the reverse-phase candidate position selection unit 133 is also appropriately referred to as an input reverse-phase candidate pixel.

The similarity calculation unit 134 calculates a degree of similarity between the target block from the target position selection unit 131 and the reverse-phase candidate block from the reverse-phase candidate position selection unit 132, and supplies the calculated similarity degree to the weight value calculation unit 135. The weight value calculation unit 135 calculates a weight value based on the similarity degree supplied from the similarity calculation unit 134, and supplies the calculated weight value to the weighted expected value calculation unit 136. The weighted expected value calculation unit 136 generates a reverse-phase image by calculating a weighted expected value of the target position based on the reverse-phase candidate pixel from the reverse-phase candidate position selection unit 133 and the weight value from the weight value calculation unit 135.

[Description of Process of Reducing Jaggies]

Next, the process of reducing jaggies by an image processing apparatus 111 will be described with reference to the flowchart of FIG. 9.

In step S81, the smoothing unit 121 smooths an input image by performing a filtering operation or the like using a low-frequency filter for a supplied input image, and supplies the smoothed image obtained as its result to the target position selection unit 131 and the reverse-phase candidate position selection unit 132.

Because smoothing the input image involves extracting a low-frequency component from the input image, the smoothed image can be an image of the low-frequency component of the input image.

In step S82, the target position selection unit 131 selects one pixel position on the smoothed image from the smoothing unit 121 as the target position, and supplies a target block to the similarity calculation unit 134. For example, pixel positions on the smoothed image are sequentially selected in raster order.

In step S83, the reverse-phase candidate position selection unit 132 selects a reverse-phase candidate position for the target position in the smoothed image from the smoothing unit 121, extracts a reverse-phase candidate block of which the center is the reverse-phase candidate position from the supplied smoothed image, and supplies the extracted reverse-phase candidate block to the similarity calculation unit 134. Here, the reverse-phase candidate block is a block having the same size as the target block.

In addition, the reverse-phase candidate position selection unit 133 selects a pixel having the same position as a smoothed reverse-phase candidate pixel on the input image as an input reverse-phase candidate pixel, and supplies the input reverse-phase candidate pixel to the weighted expected value calculation unit 136. That is, the same position between the input image and the smoothed image is selected as a reverse-phase candidate position.

Figure 10:
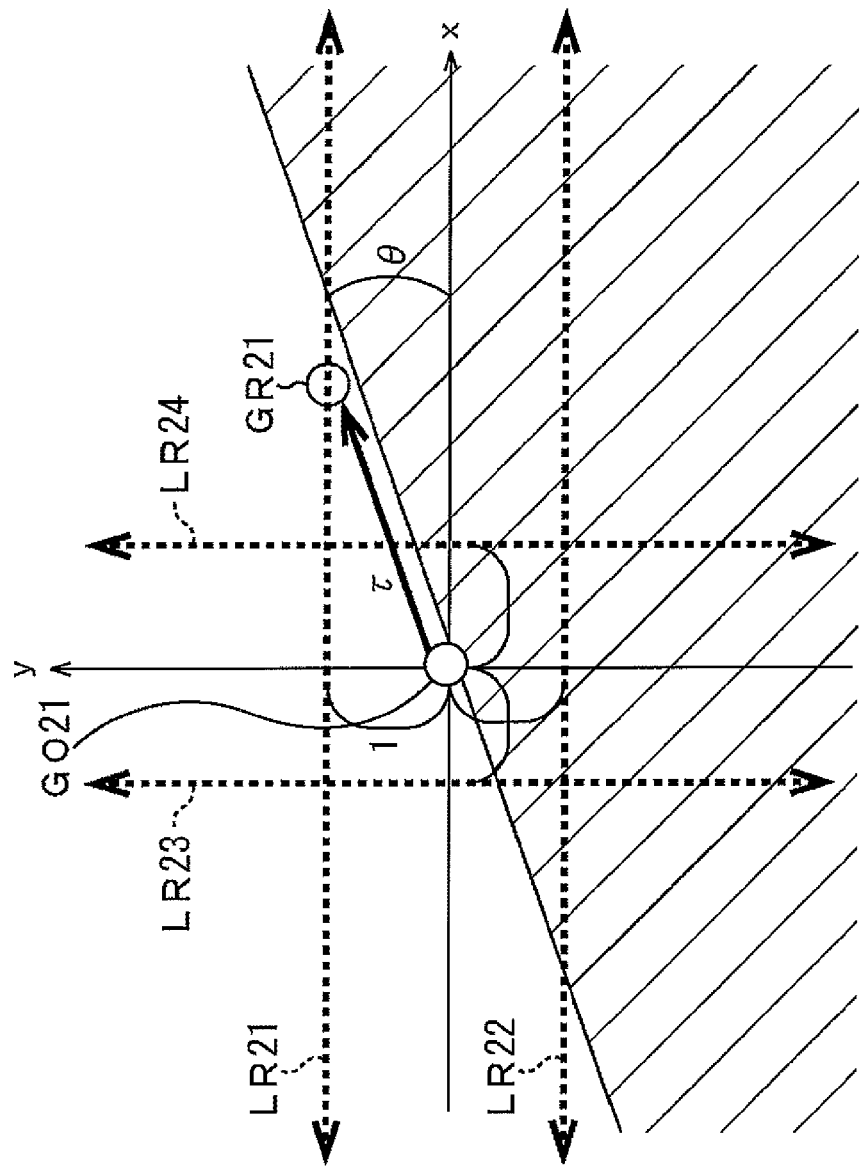
FIG. 10 is a diagram illustrating a position of a reverse-phase candidate pixel.

For example, as illustrated in FIG. 10, a pixel GO21 (hereinafter referred to as a target pixel GO21) in a predetermined position on the smoothed image is selected as a target pixel. In FIG. 10, lateral and longitudinal directions are x and y directions.

The reverse-phase candidate position selection unit 132 designates lines separated by one line (one pixel) on the top, bottom, left, and right from the target pixel GO21 in the drawing as reverse-phase pixel search lines. That is, a horizontal line separated by one line from a horizontal line including the target pixel GO21 and a vertical line separated by one line from a vertical line including the target pixel GO21 become the reverse-phase pixel search lines.

In the example of FIG. 10, lines of the horizontal direction separated by one line on upper and lower sides from the target pixel GO21 in the drawing serve as reverse-phase pixel search lines LR21 and LR22. In addition, vertical lines separated by one line on left and right sides from the target pixel GO21 in the drawing serve as reverse-phase pixel search lines LR23 and LR24.

The reverse-phase candidate position selection unit 132 sequentially selects pixels within a predetermined range on the reverse-phase pixel search lines LR21 and LR24 as reverse-phase candidate pixels. Therefore, reverse-phase candidate pixels of which the number is predetermined are selected with respect to one target pixel GO21. In the example of FIG. 10, a pixel GR21 on the reverse-phase pixel search line LR21 is selected as a reverse-phase candidate pixel.

Figure 9:
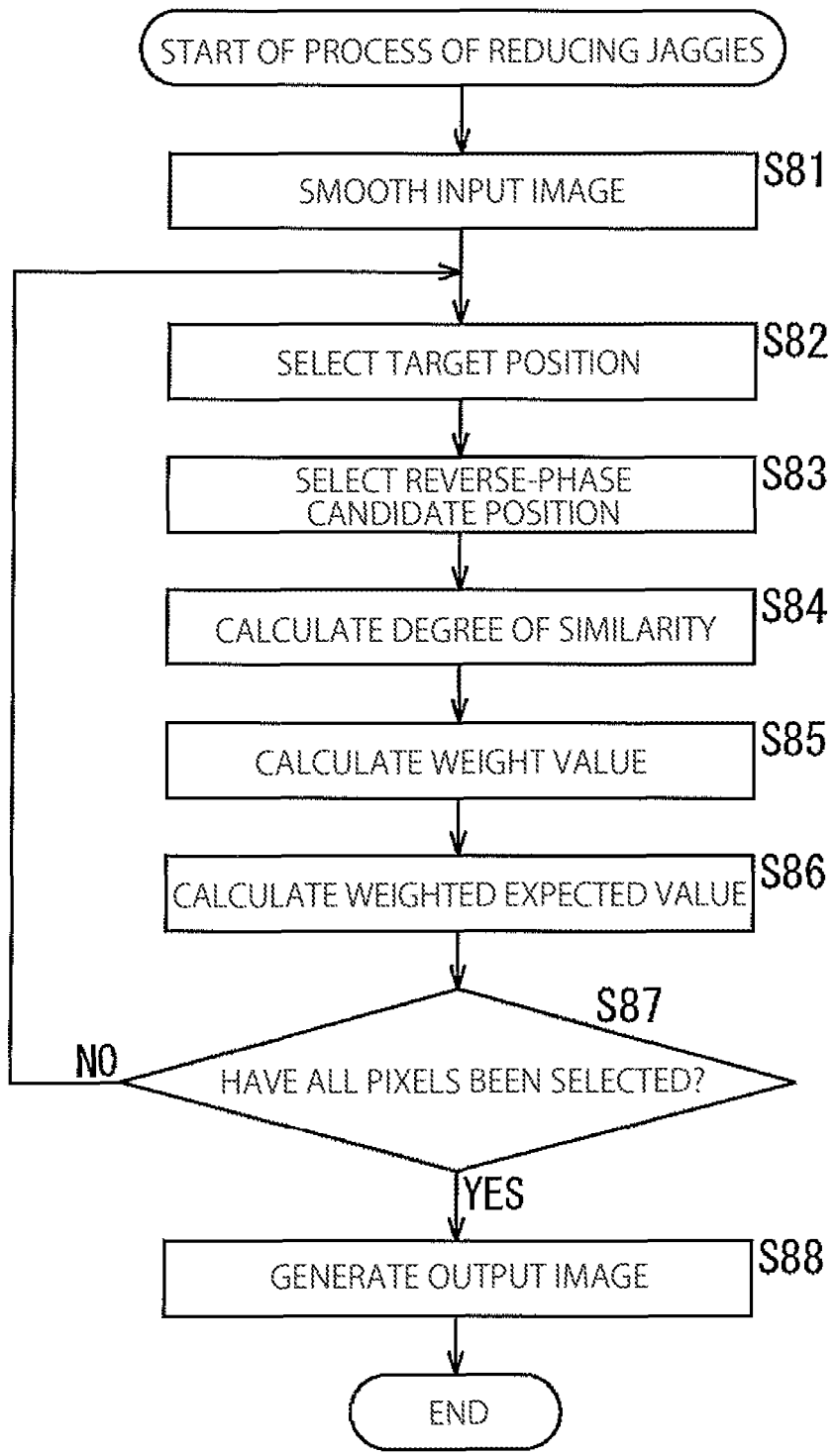
FIG. 9 is a flowchart illustrating a process of reducing jaggies.

Returning to the description of the flowchart of FIG. 9, the process proceeds from step S83 to step S84 if the reverse-phase candidate position is selected. Thereafter, although the process of reducing jaggies is ended by performing steps S84 to S88, their process is the same as that of steps S14 to S18 of FIG. 2 and therefore description thereof is omitted.

However, in step S84, the same calculations as in the above-described Equations (1) and (2) are carried out and a degree of similarity between the reverse-phase candidate block and the target block is calculated.

As described above, the image processing apparatus 111 obtains the similarity degree between the target block and the reverse-phase candidate block on the smoothed image, and calculates a weighted expected value using a weight value obtained from the similarity degree.

If the smoothed image is used as described above, it is possible to determine whether images have the same pattern from a degree of similarity between an image adjacent to the target position and an image adjacent to a reverse-phase candidate position and obtain an appropriate reverse-phase image. That is, because a phase of jaggies is originally reversed in the image adjacent to the reverse-phase candidate position on the input image with respect to the target position, the similarity degree is not accurately obtained. However, if the low-frequency component of the input image is extracted and the similarity degree is calculated in the reverse-phase candidate position in a state in which the jaggies are reduced, it is possible to more reliably specify whether the image adjacent to the reverse-phase candidate position on the input image is an image in which jaggies have a reverse phase to an image adjacent to the target position of the input image from the calculated similarity degree.

<Fourth Embodiment>
[Configuration Example of Image Processing Apparatus]

In addition, as illustrated in FIG. 8, a weight value may be calculated using a lower limit of a degree of similarity even when a weight value of each reverse-phase candidate pixel is calculated from the similarity degree between a reverse-phase candidate block and a target block.

Figure 11:
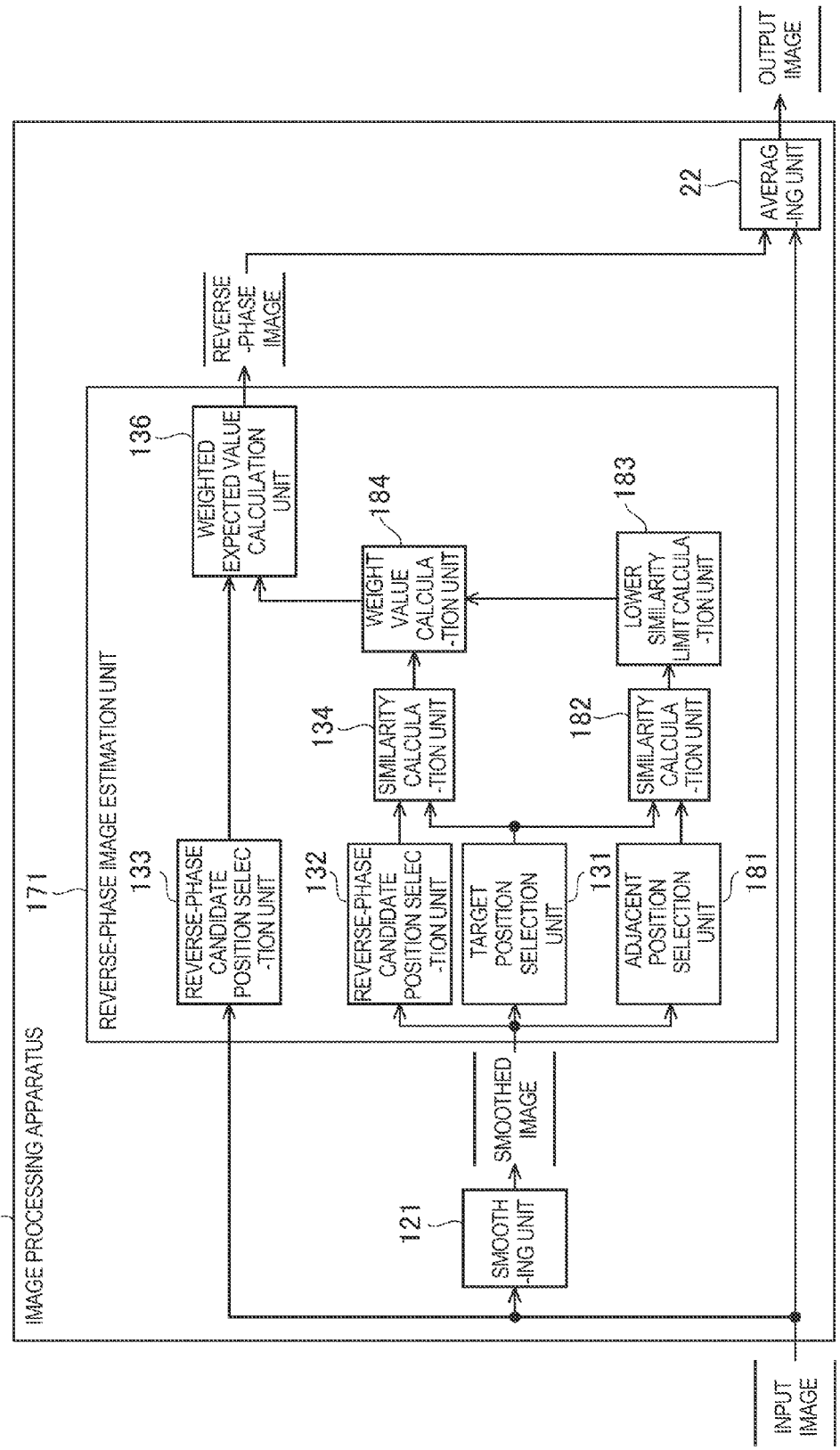
FIG. 11 is a diagram illustrating another configuration example of the image processing apparatus.

In this case, the image processing apparatus is constituted, for example, as illustrated in FIG. 11.

That is, the image processing apparatus 161 of FIG. 11 includes a smoothing unit 121, a reverse-phase image estimation unit 171, and an averaging unit 22. The same parts corresponding to those of FIG. 8 are denoted by the same reference numerals in FIG. 11, and description thereof is appropriately omitted.

The reverse-phase image estimation unit 171 generates a reverse-phase image based on a smoothed image from the smoothing unit 121 and a supplied input image, and supplies the generated reverse-phase image to the averaging unit 22. The reverse-phase image estimation unit 171 includes a target position selection unit 131, a reverse-phase candidate position selection unit 132, a reverse-phase candidate position selection unit 133, a similarity calculation unit 134, a weighted expected value calculation unit 136, an adjacent position selection unit 181, a similarity calculation unit 182, a lower similarity limit calculation unit 183, and a weight value calculation unit 184.

Here, the adjacent position selection unit 181 through the weight value calculation unit 184 perform the same processes as the adjacent position selection unit 81 through the weight value calculation unit 84 of FIG. 5. However, in the adjacent position selection unit 181 through the weight value calculation unit 184, an adjacent block of an adjacent position adjacent to the target position on the smoothed image is extracted and a degree of similarity between the adjacent block and the target block is calculated.

[Description of Process of Reducing Jaggies]

Next, the process of reducing jaggies by the image processing apparatus 161 will be described with reference to the flowchart of FIG. 12. Because the process of steps S111 and S113 is the same as the process of steps S81 to S83 of FIG. 9, description thereof is omitted.

However, in step S111, the smoothing unit 121 supplies a smoothed image to the target position selection unit 131, the reverse-phase candidate position selection unit 132, and the adjacent position selection unit 181. In addition, in step S112, the target position selection unit 131 supplies a target block to the similarity calculation units 134 and 182.

In step S114, the adjacent position selection unit 181 selects positions of four adjacent pixels adjacent to the top, bottom, left, and right of a target position on the smoothed image supplied from the smoothing unit 121 as adjacent positions, and supplies an adjacent block of which the center is each adjacent pixel to the similarity calculation unit 182.

Figure 13:
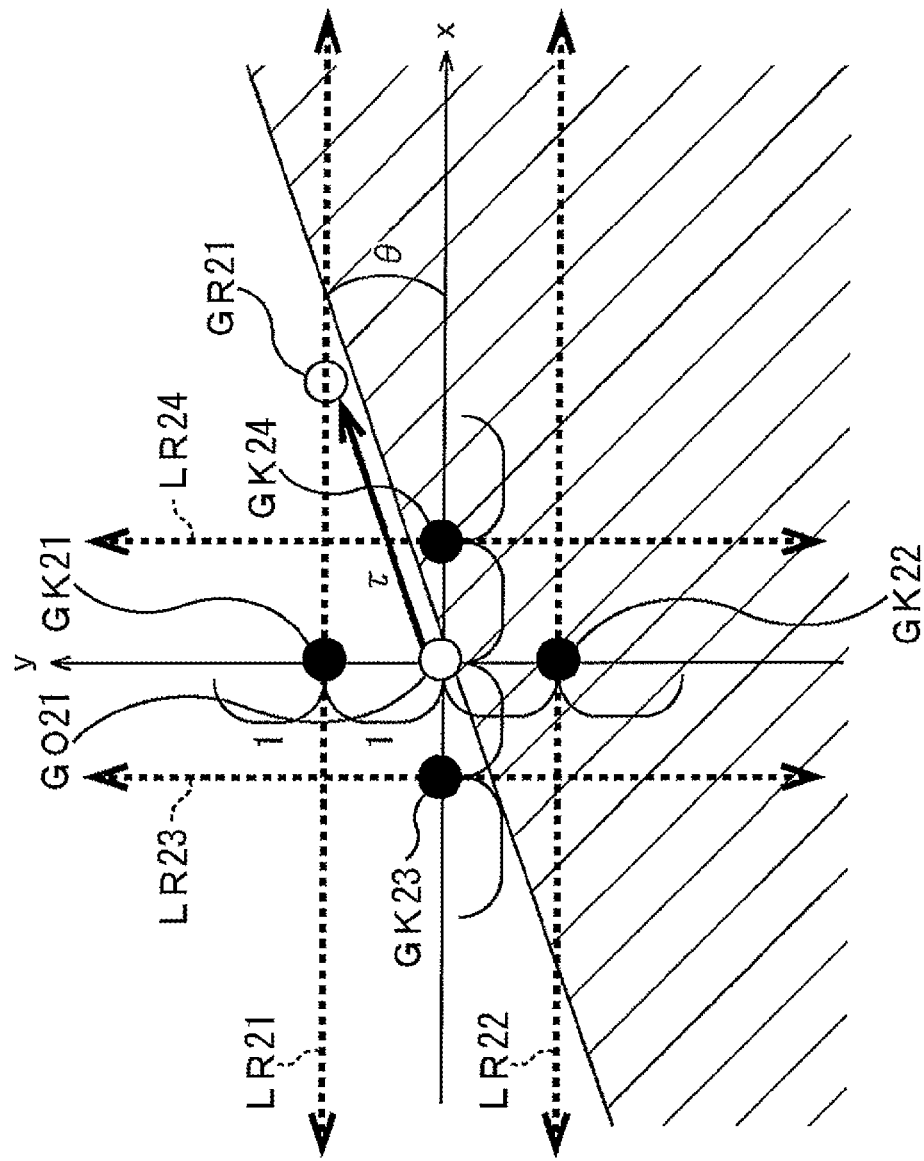
FIG. 13 is a diagram illustrating a position of an adjacent pixel.

For example, as illustrated in FIG. 13, adjacent pixels GK21 to GK24, which are pixels each adjacent to the top, bottom, left, and right of the target pixel GO21 in the smoothed image, are selected in the drawing. Adjacent blocks of which the centers are the adjacent pixels GK21 to GK24 are supplied to the similarity calculation unit 182.

The same parts corresponding to those of FIG. 10 are denoted by the same reference numerals in FIG. 13, and description thereof is appropriately omitted.

Figure 12:
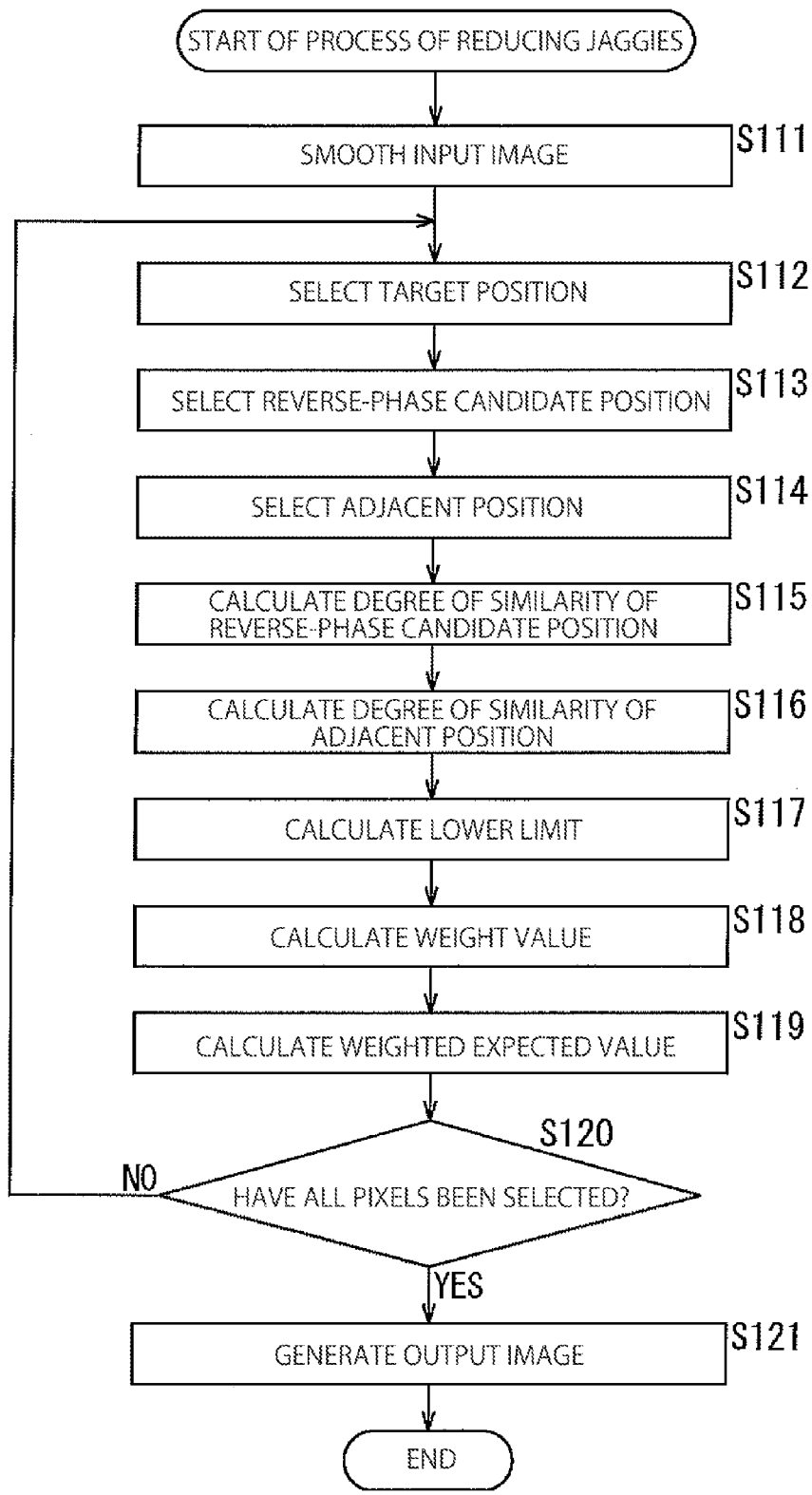
FIG. 12 is a flowchart illustrating a process of reducing jaggies.

Returning to description of the flowchart of FIG. 12, the process proceeds from step S114 to step S115 if the adjacent block is extracted and supplied to the similarity calculation unit 182. In step S115, a degree of similarity between each reverse-phase candidate block and the target block is calculated, and the calculated similarity degree is supplied from the similarity calculation unit 134 to the weight value calculation unit 184. Because the process of step S115 is the same as the process of step S84 of FIG. 9, description thereof is omitted.

In step S116, the similarity calculation unit 182 calculates a degree of similarity between the target block supplied from the target position selection unit 131 and the adjacent block supplied from the adjacent position selection unit 181, and supplies the calculated similarity degree to the lower similarity limit calculation unit 183. For example, the similarity degree of each adjacent block is calculated by carrying out the same calculations as in the above-described Equations (1) and (2).

In step S117, the lower similarity limit calculation unit 183 calculates a lower similarity limit based on the similarity degree of each adjacent block supplied from the similarity calculation unit 182, and supplies the calculated lower limit to the weight value calculation unit 184. In step S117, the same process as step S47 of FIG. 6 is performed.

In step S118, the weight value calculation unit 184 calculates a weight value for every similarity degree on the basis of the similarity degree of each reverse-phase candidate block from the similarity calculation unit 134 and the lower limit from the lower similarity limit calculation unit 183, and supplies the calculated weight value to the weighted expected value calculation unit 136. For example, the weight value calculation unit 184 calculates the weight value by carrying out the calculation of the above-described Equation (3).

If the weight value is calculated, then the process of steps S119 to S121 is performed and the process of reducing jaggies is ended. Because the above-described process is the same as that of steps S86 to S88 of FIG. 9, description thereof is omitted.

As described above, the image processing apparatus 161 obtains similarity degrees of adjacent blocks of which the centers are adjacent pixels adjacent to the top, bottom, left, and right (horizontal and vertical directions) of the target position, and calculates a lower limit from the similarity degrees. The image processing apparatus 161 designates a weight value of an inappropriate reverse-phase candidate pixel as 0 on the basis of the obtained lower limit. As described above, it is possible to obtain a higher-quality output image by determining the lower limit of the similarity degree as described above.

<Fifth Embodiment>
[Configuration Example of Image Processing Apparatus]
Further, in the image processing apparatus, a final weight value of a reverse-phase candidate pixel may be calculated from a weight value obtained from a normal-phase candidate block and a weight value obtained from a reverse-phase candidate block. In this case, the image processing apparatus is constituted, for example, as illustrated in FIG. 14.

Figure 14:
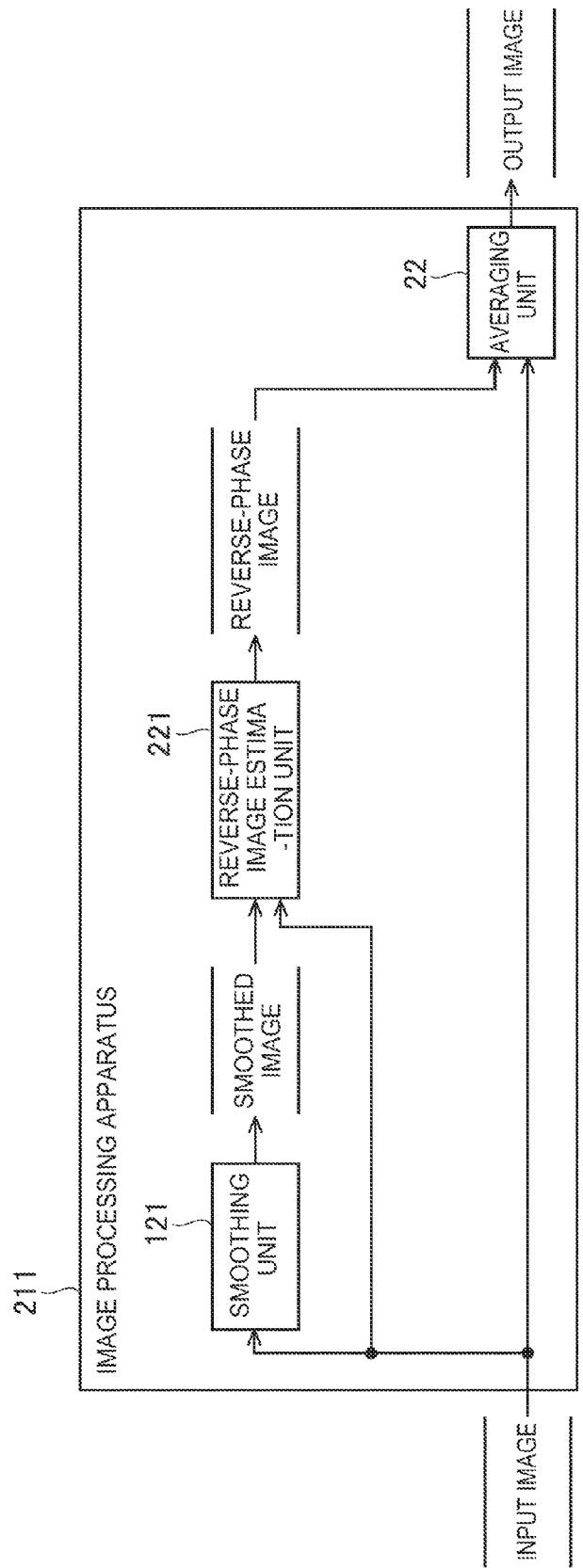
FIG. 14 is a diagram illustrating another configuration example of the image processing apparatus.

The image processing apparatus 211 of FIG. 14 includes a smoothing unit 121, a reverse-phase image estimation unit 221, and an averaging unit 22. The same parts corresponding to those of FIG. 11 are denoted by the same reference numerals in FIG. 14, and description thereof is appropriately omitted.

The reverse-phase image estimation unit 221 calculates a weight value of each reverse-phase candidate pixel based on the smoothed image from the smoothing unit 121 and the supplied input image, generates a reverse-phase image by calculating a weighted expected value from the weight value and the reverse-phase candidate pixel, and supplies the generated reverse-phase image to the averaging unit 22.

Figure 15:
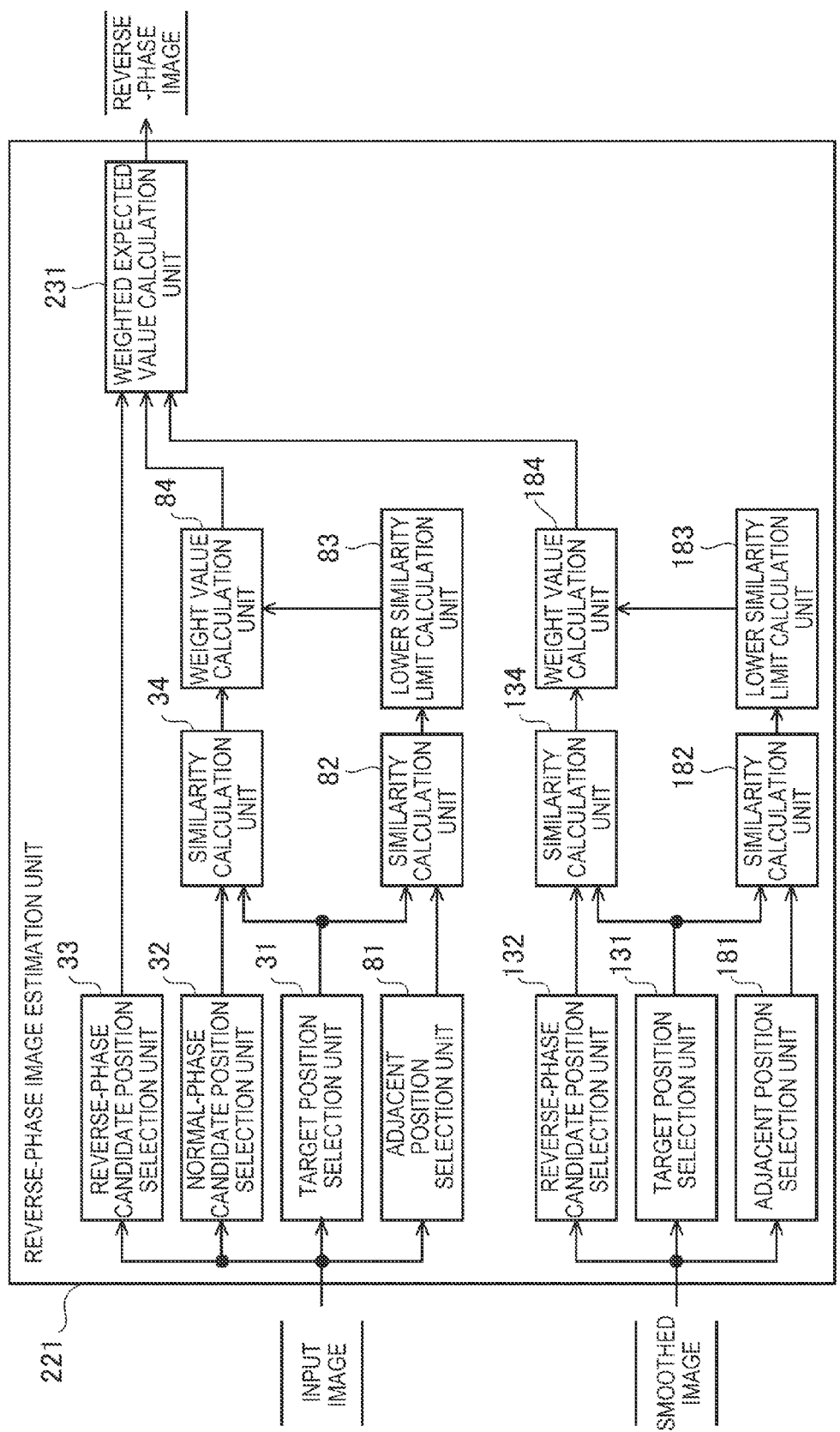
FIG. 15 is a diagram illustrating a configuration example of a reverse-phase image estimation unit.

[Configuration Example of Reverse-Phase Image Estimation Unit]
In addition, more specifically, the reverse-phase image estimation unit 221 of FIG. 14 is constituted, for example, as illustrated in FIG. 15. The same parts corresponding to those of FIG. 5 or 11 are denoted by the same reference numerals in FIG. 15, and description thereof is appropriately omitted.

The reverse-phase image estimation unit 221 includes a target position selection unit 31, a normal-phase candidate position selection unit 32, a reverse-phase candidate position selection unit 33, a similarity calculation unit 34, an adjacent position selection unit 81, a similarity calculation unit 82, a lower similarity limit calculation unit 83, a weight value calculation unit 84, a target position selection unit 131, a reverse-phase candidate position selection unit 132, a similarity calculation unit 134, an adjacent position selection unit 181, a similarity calculation unit 182, a lower similarity limit calculation unit 183, a weight value calculation unit 184, and a weighted expected value calculation unit 231.

The target position selection unit 31, the normal-phase candidate position selection unit 32, the similarity calculation unit 34, the adjacent position selection unit 81, the similarity calculation unit 82, the lower similarity limit calculation unit 83, and the weight value calculation unit 84 perform the same processes as the blocks in the image processing apparatus 61 of FIG. 5. That is, a normal-phase candidate block is used and a weight value of each reverse-phase candidate pixel is calculated. The weight value calculation unit 84 supplies the calculated weight value to the weighted expected value calculation unit 231.

In addition, the target position selection unit 131, the reverse-phase candidate position selection unit 132, the similarity calculation unit 134, the adjacent position selection unit 181, the similarity calculation unit 182, the lower similarity limit calculation unit 183, and the weight value calculation unit 184 perform the same processes as the blocks in the image processing apparatus 161 of FIG. 11. That is, a reverse-phase candidate block is used and a weight value of each reverse-phase candidate pixel is calculated. The weight value calculation unit 184 supplies the calculated weight value to the weighted expected value calculation unit 231.

The weighted expected value calculation unit 231 calculates a final weight value based on the weight value from the weight value calculation unit 84 and the weight value from the weight value calculation unit 184, and calculates a weighted expected value based on the final weight value and the reverse-phase candidate pixel from the reverse-phase candidate position selection unit 33. The weighted expected value calculation unit 231 supplies the reverse-phase image obtained by the calculation of the weighted expected value to the averaging unit 22.

[Description of Process of Reducing Jaggies]

Next, the process of reducing jaggies by an image processing apparatus 211 will be described with reference to the flowchart of FIG. 16.

In step S151, the smoothing unit 121 smooths a supplied input image, and supplies the obtained smoothed image to the target position selection unit 131, the reverse-phase candidate position selection unit 132, and the adjacent position selection unit 181.

In step S152, the reverse-phase image estimation unit 221 performs a weight value calculation process using the input image, and supplies an obtained weight value to the weighted expected value calculation unit 231. In step S153, the reverse-phase image estimation unit 221 performs a weight value calculation process using the smoothed image, and supplies an obtained weight value to the weighted expected value calculation unit 231.

Details of the weight value calculation process using the input image and the weight value calculation process using the smoothed image will be described later.

In step S154, the reverse-phase candidate position selection unit 33 selects a reverse-phase candidate position from the supplied input image, and supplies a reverse-phase candidate pixel in the reverse-phase candidate position on the input image to the weighted expected value calculation unit 231. For example, a pixel on the input image in a center position of a line segment connecting a target pixel selected by the target position selection unit 31 and a normal-phase candidate pixel selected by the normal-phase candidate position selection unit 32 is selected as a reverse-phase candidate pixel.

In step S155, the weighted expected value calculation unit 231 calculates a weighted expected value based on the weight value from the weight value calculation unit 84, the weight value from the weight value calculation unit 184, and the reverse-phase candidate pixel from the reverse-phase candidate position selection unit 33.

For example, the weighted expected value calculation unit 231 obtains a product of the weight value from the weight value calculation unit 84 and the weight value from the weight value calculation unit 184, and designates the obtained value as the final weight value. The weighted expected value calculation unit 231 calculates the weighted expected value of the target position by performing the same process as that of step S16 of FIG. 2 from the final weight value and the reverse-phase candidate pixel. The weighted expected value calculated as described above becomes a pixel value of a pixel of a reverse-phase image having the same position as the target pixel.

If the weighted expected value is calculated, then the process of steps S156 and S157 is performed and the process of reducing jaggies is ended. Because the above-described process is the same as the process of steps S17 and S18 of FIG. 2, description thereof is omitted.

As described above, the image processing apparatus 211 calculates a final weight value from the weight value obtained using the normal-phase candidate block and the weight value obtained using the reverse-phase candidate block, and generates a reverse-phase image using the final weight value. As described above, it is possible to obtain a more appropriate weight value by calculating the final weight value from two weight values and more reliably reduce the jaggies of an image.

[Description of Weight Value Calculation Process Using Input Image]

Subsequently, the weight value calculation process using the input image corresponding to the process of step S152 of FIG. 16 will be described with reference to the flowchart of FIG. 17.

Because the process of steps S181 to S183 is the same as the process of steps S41 to S43 of FIG. 6, description thereof is omitted.

In step S184, the similarity calculation unit 34 calculates a degree of similarity between the target block from the target position selection unit 31 and the normal-phase candidate block from the normal-phase candidate position selection unit 32, and supplies the calculated similarity degree to the weight value calculation unit 84. For example, the similarity degree is calculated by carrying out the calculation of the above-described Equation (1).

In step S185, the similarity calculation unit 82 calculates a degree of similarity between a target block supplied from the target position selection unit 31 and an adjacent block supplied from the adjacent position selection unit 81, and supplies the calculated similarity degree to the lower similarity limit calculation unit 83. For example, the similarity degree of each adjacent block is calculated by carrying out the same calculation as in the above-described Equation (1).

If the similarity degree of the adjacent block is calculated, then the process of steps S186 and S187 is performed and the weight value calculation process using the input image is ended. Because the above-described process is the same as the process of steps S47 and S48 of FIG. 6, description thereof is omitted.

Figure 16:
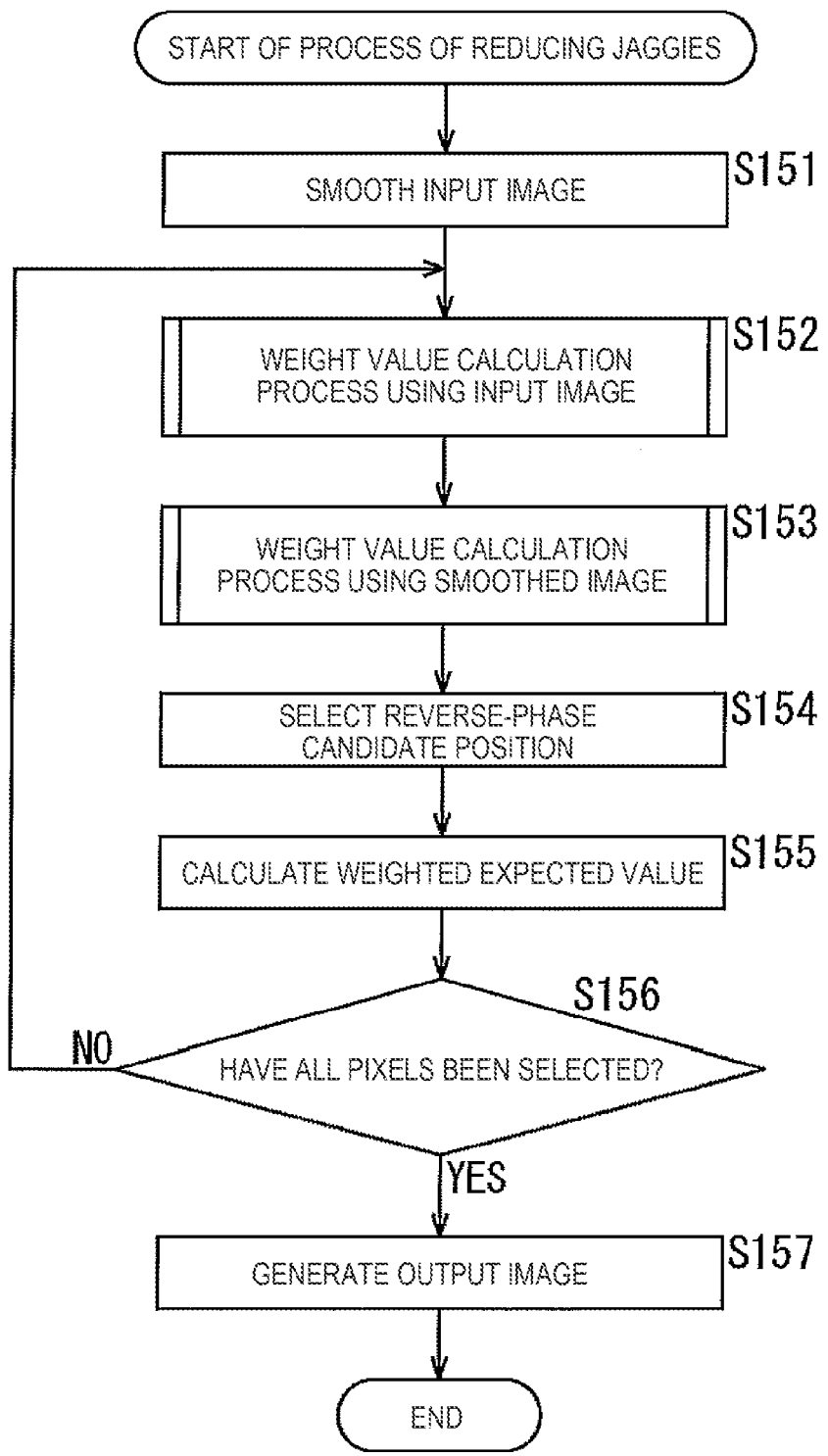
FIG. 16 is a flowchart illustrating a process of reducing jaggies.
Figure 17:
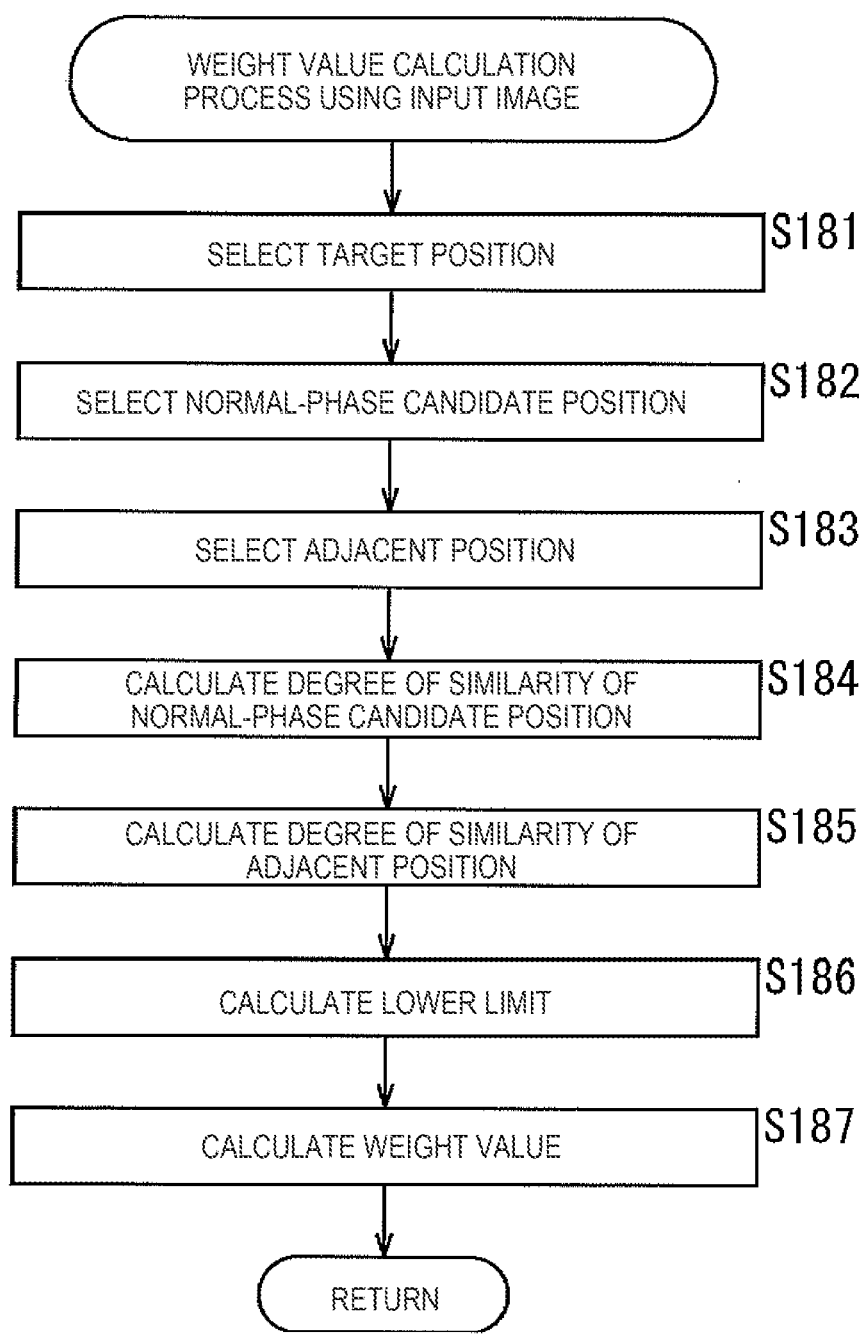
FIG. 17 is a flowchart illustrating a weight value calculation process using an input image.

If the weight value calculated by the weight value calculation unit 84 is supplied to the weighted expected value calculation unit 231, the weight value calculation process using the input image is ended and then the process proceeds to step S153 of FIG. 16.

[Description of Weight Value Calculation Process Using Smoothed Image]

Figure 18:
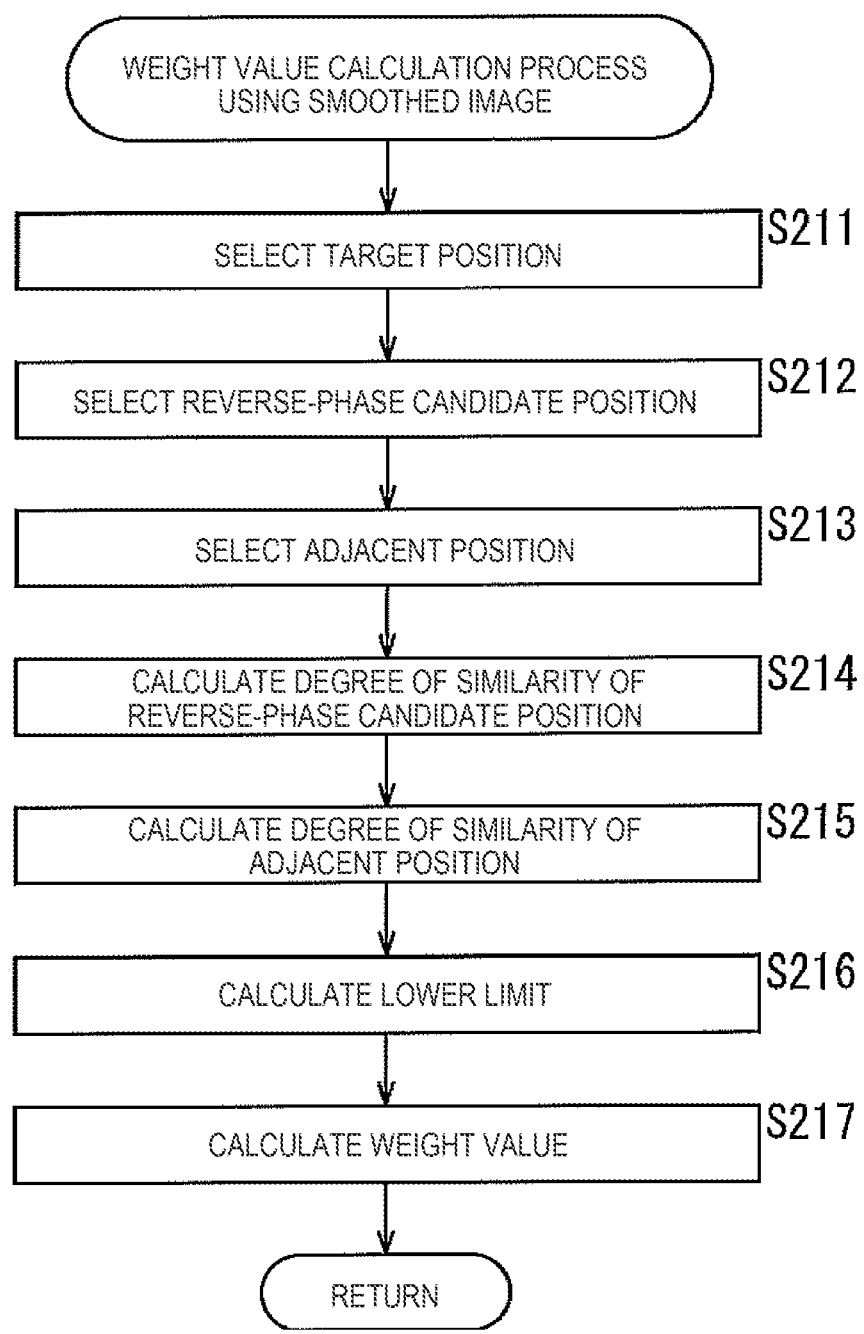
FIG. 18 is a flowchart illustrating a weight value calculation process using a smoothed image.

Further, the weight value calculation process using the smoothed image corresponding to the process of step S153 of FIG. 16 will be described with reference to the flowchart of FIG. 18.

Because the process of steps S211 to S213 is the same as the process of steps S112 to S114 of FIG. 12, description thereof is omitted.

However, in step S211, the target position selection unit 131 selects a position on the smoothed image in the same position as a target position selected by the target position selection unit 31 as the target position. In addition, in step S212, the reverse-phase candidate position selection unit 132 selects a position on the smoothed image in the same position as a reverse-phase candidate position selected by the reverse-phase candidate position selection unit 33 as the reverse-phase candidate position.

In step S214, the similarity calculation unit 134 calculates a degree of similarity between a reverse-phase candidate block and a target block on the basis of the target block from the target position selection unit 131 and the reverse-phase candidate block from the reverse-phase candidate position selection unit 132, and supplies the calculated similarity degree to the weight value calculation unit 184. For example, the similarity degree is calculated by carrying out the same calculation as in the above-described Equation (1).

In step S215, the similarity calculation unit 182 calculates a degree of similarity between the target block supplied from the target position selection unit 131 and an adjacent block supplied from the adjacent position selection unit 181, and supplies the calculated similarity degree to the lower similarity limit calculation unit 183. For example, the similarity degree of each adjacent block is calculated by carrying out the same calculation as in the above-described Equation (1).

If the similarity degree of the adjacent block is calculated, then the process of steps S216 and S217 is performed and the weight value calculation process using the smoothed image is ended. Because the above-described process is the same as the process of steps S117 and S118 of FIG. 12, description thereof is omitted.

If the weight value calculated by the weight value calculation unit 184 is supplied to the weighted expected value calculation unit 231, the weight value calculation process using the smoothed image is ended and then the process proceeds to step S154 of FIG. 16.

As described above, the weight value is calculated using the normal-phase candidate block or the reverse-phase candidate block, the adjacent block, or the like.

<Sixth Embodiment>

[Configuration Example of Image Processing Apparatus]

Further, when input images include images of colors of R, G, and B, a high-frequency component of luminance image in which jaggies are reduced may be reflected in the images of the colors of R, G, and B after jaggies are reduced for the luminance image.

Figure 19:
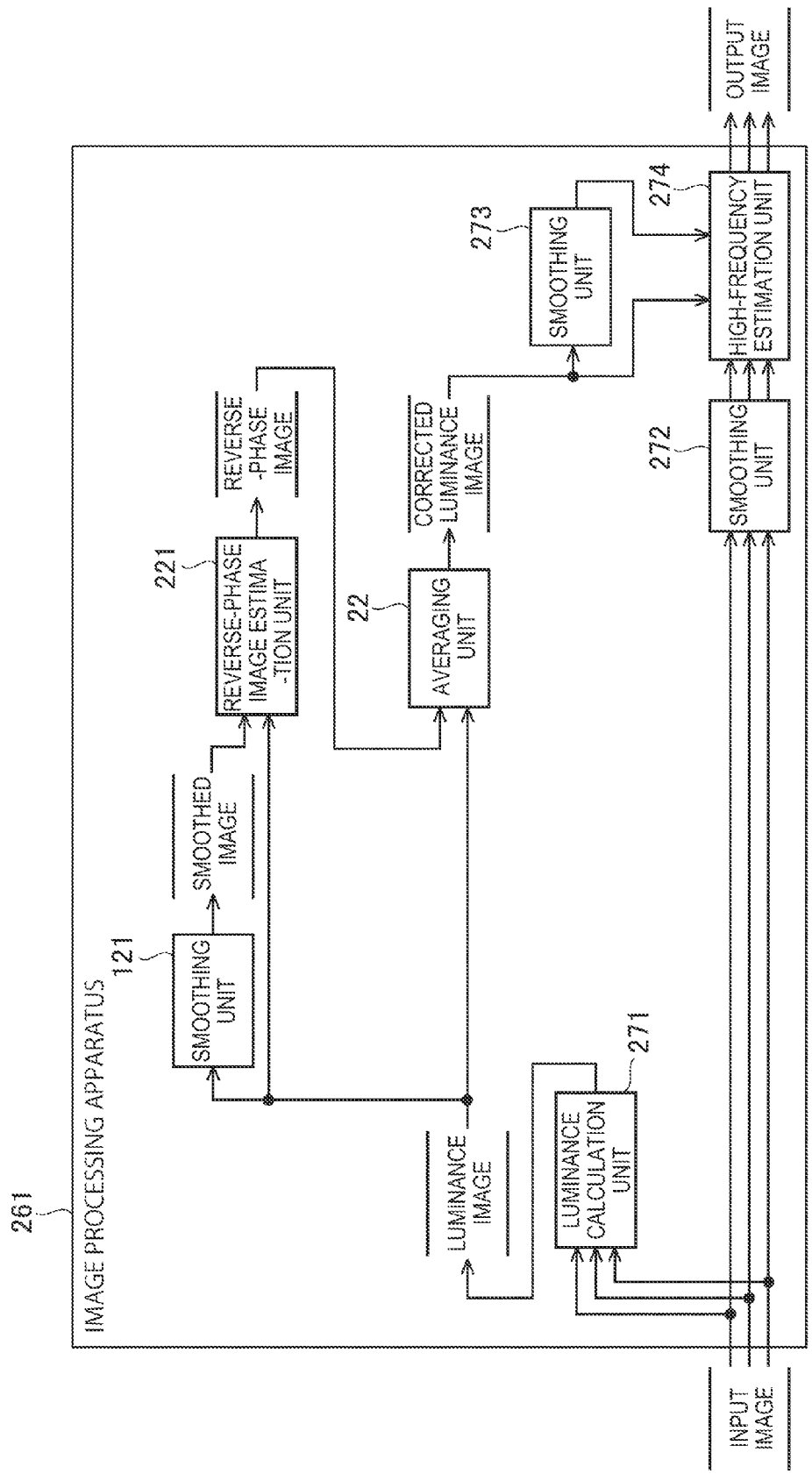
FIG. 19 is a diagram illustrating another configuration example of the image processing apparatus.

In this case, the image processing apparatus is constituted, for example, as illustrated in FIG. 19.

The image processing apparatus 261 of FIG. 19 includes a smoothing unit 121, a reverse-phase image estimation unit 221, an averaging unit 22, a luminance calculation unit 271, smoothing units 272 and 273, and a high-frequency estimation unit 274. The same parts corresponding to those of FIG. 14 are denoted by the same reference numerals in FIG. 19, and description thereof is appropriately omitted.

In the image processing apparatus 261, images of colors of R, G, and B (hereinafter also referred to as R, G, and B images) are supplied to the luminance calculation unit 271 and the smoothing unit 272.

The luminance calculation unit 271 generates a luminance image indicating luminance values of pixels of the input images based on the R, G, and B images as the supplied input images, and supplies the generated luminance image to the smoothing unit 121, the reverse-phase image estimation unit 221, and the averaging unit 22.

The smoothing unit 272 smooths the supplied R, G, and B images, and supplies the smoothed images to the high-frequency estimation unit 274. The averaging unit 22 obtains an average image between the luminance image from the luminance calculation unit 271 and the reverse-phase image from the reverse-phase image estimation unit 221, designates the obtained average image as a corrected luminance image, and supplies the corrected luminance image to the smoothing unit 273 and the high-frequency estimation unit 274.

The smoothing unit 273 smooths the corrected luminance image from the averaging unit 22, and supplies the smoothed corrected luminance image to the high-frequency estimation unit 274. The high-frequency estimation unit 274 generates and outputs an output image including images of the color components of R, G, and B based on the corrected luminance image from the averaging unit 22, the smoothed corrected luminance image from the smoothing unit 273, and the input images from the smoothing unit 272.

[Description of Process of Reducing Jaggies]

Figure 20:
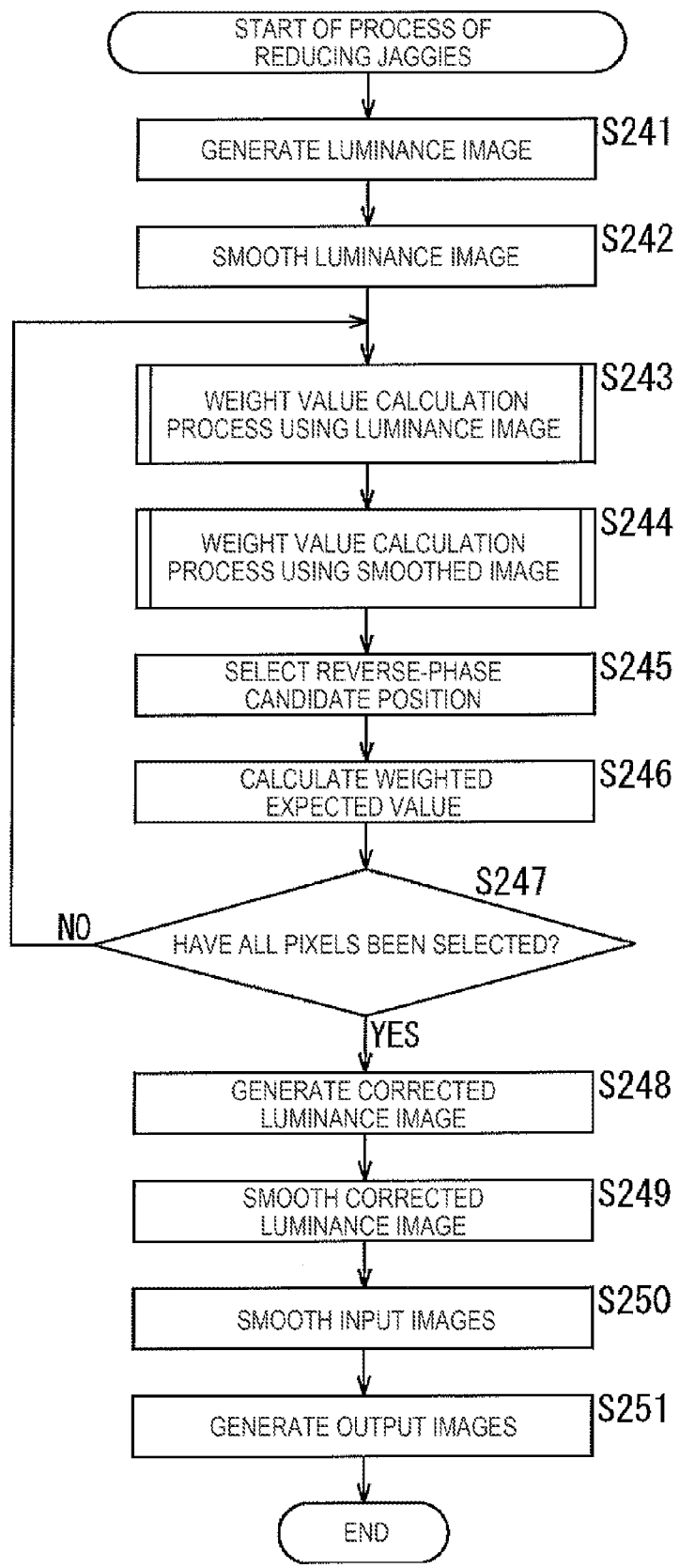
FIG. 20 is a flowchart illustrating a process of reducing jaggies.

Next, the process of reducing jaggies by the image processing apparatus 261 will be described with reference to the flowchart of FIG. 20.

In step S241, the luminance calculation unit 271 generates a luminance image based on R, G, and B images as supplied input images, and supplies the luminance image to the smoothing unit 121, the reverse-phase image estimation unit 221, and the averaging unit 22.

In step S242, the smoothing unit 121 smooths the luminance image supplied from the luminance calculation unit 271, and supplies the smoothed image obtained as its result to the reverse-phase image estimation unit 221.

If the smoothed image is generated, then the process of steps S243 to S247 is performed. Because the above-described process is the same as the process of steps S152 to S156 of FIG. 16, description thereof is omitted. However, in this process, the luminance image is used in place of the input image.

If all pixels are determined to have been selected in step S247, the reverse-phase image is supplied from the reverse-phase image estimation unit 221 to the averaging unit 22, and the process proceeds to step S248.

In step S248, the averaging unit 22 generates the corrected luminance image based on the reverse-phase image from the reverse-phase image estimation unit 221 and the luminance image from the luminance calculation unit 271, and supplies the generated corrected luminance image to the smoothing unit 273 and the high-frequency estimation unit 274.

In step S249, the smoothing unit 273 smooths the corrected luminance image from the averaging unit 22 and supplies the smoothed corrected luminance image to the high-frequency estimation unit 274. According to this smoothing, a low-frequency component of the corrected luminance image is obtained.

In step S250, the smoothing unit 272 smooths the R, G, and B images as the supplied input images, and supplies the smoothed R, G, and B images to the high-frequency estimation unit 274. According to this smoothing, the low-frequency component of the input image is obtained.

In step S251, the high-frequency estimation unit 274 generates and outputs output images based on the corrected luminance image from the averaging unit 22, the smoothed corrected luminance image from the smoothing unit 273, and the input images from the smoothing unit 272.

For example, the high-frequency estimation unit 274 divides the corrected luminance image from the averaging unit 22 by a corrected luminance image from the smoothing unit 273 for every pixel, and multiplies the R, G, and B images as the input images from the smoothing unit 272 by values obtained as its results. Images including the color components of the R, G, and B images obtained as described above serve as the output images. The output images are images obtained by replacing the high-frequency components of the input images with the corrected luminance image from which the jaggies are reduced while maintaining colors of the inputs images. If the output images are generated, the process of reducing jaggies is ended.

As described above, the image processing apparatus 261 generates the luminance image from the input images and generates a reverse-phase image of the luminance image. The image processing apparatus 261 reduces the jaggies of the input image using the obtained reverse-phase image. As described above, it is possible to easily and reliably reduce the jaggies from the input images even when the reverse-phase image is generated from the luminance image if the input images include images of several color components.

Although an example in which the reverse-phase image of the luminance image is generated has been described in this embodiment, a reverse-phase image of each of the images of the colors of R, G, and B may be generated and the jaggies of the image of each color may be reduced.

In addition, the present technology described above can also be used to reduce jaggies occurring when an imaging result based on pixel thinning or pixel addition in an imaging device is output.

<Seventh Embodiment>

[Configuration Example of Image Processing Apparatus]

Figure 21:
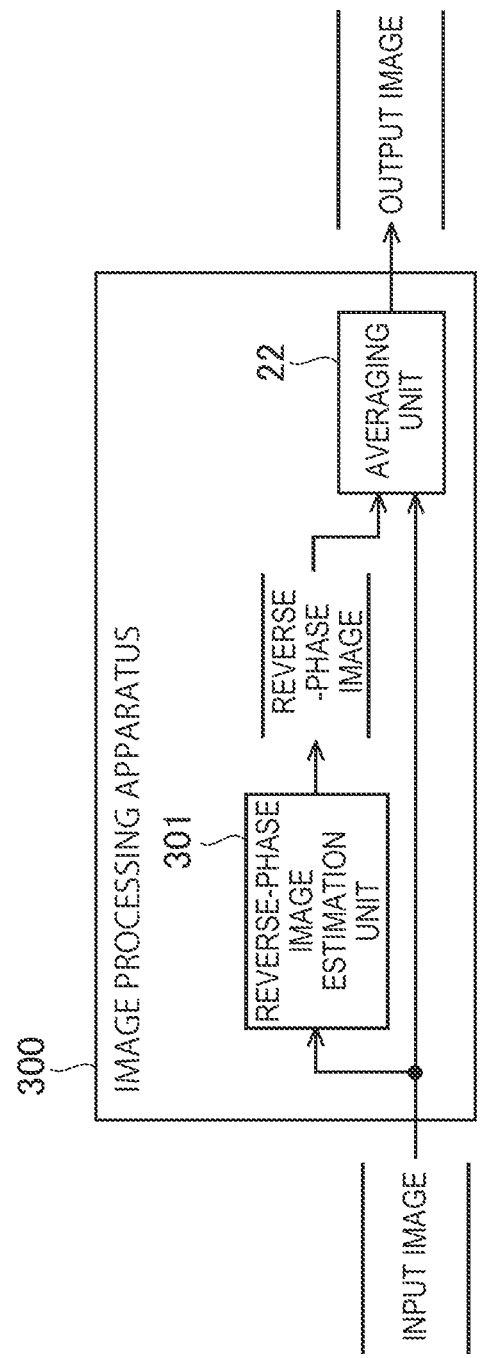
FIG. 21 is a block diagram illustrating a main configuration example of the image processing apparatus.

A degree of angular similarity may be used in place of a degree of similarity described above. FIG. 21 is a block diagram illustrating a main configuration example of the image processing apparatus in the above-described case.

The image processing apparatus 300 illustrated in FIG. 21 is the same as the image processing apparatus of each embodiment described above. The image processing apparatus 300 converts a supplied input image into an output image in which jaggies in the input image are reduced, and outputs the output image.

The image processing apparatus 300 has a reverse-phase image estimation unit 301 and an averaging unit 22. The reverse-phase image estimation unit 301 generates a reverse-phase image by reversing only a phase of a component of jaggies in the input image on the basis of the supplied input image and supplies the reverse-phase image to the averaging unit 22.

[Configuration Example of Reverse-Phase Image Estimation Unit]

Figure 22:
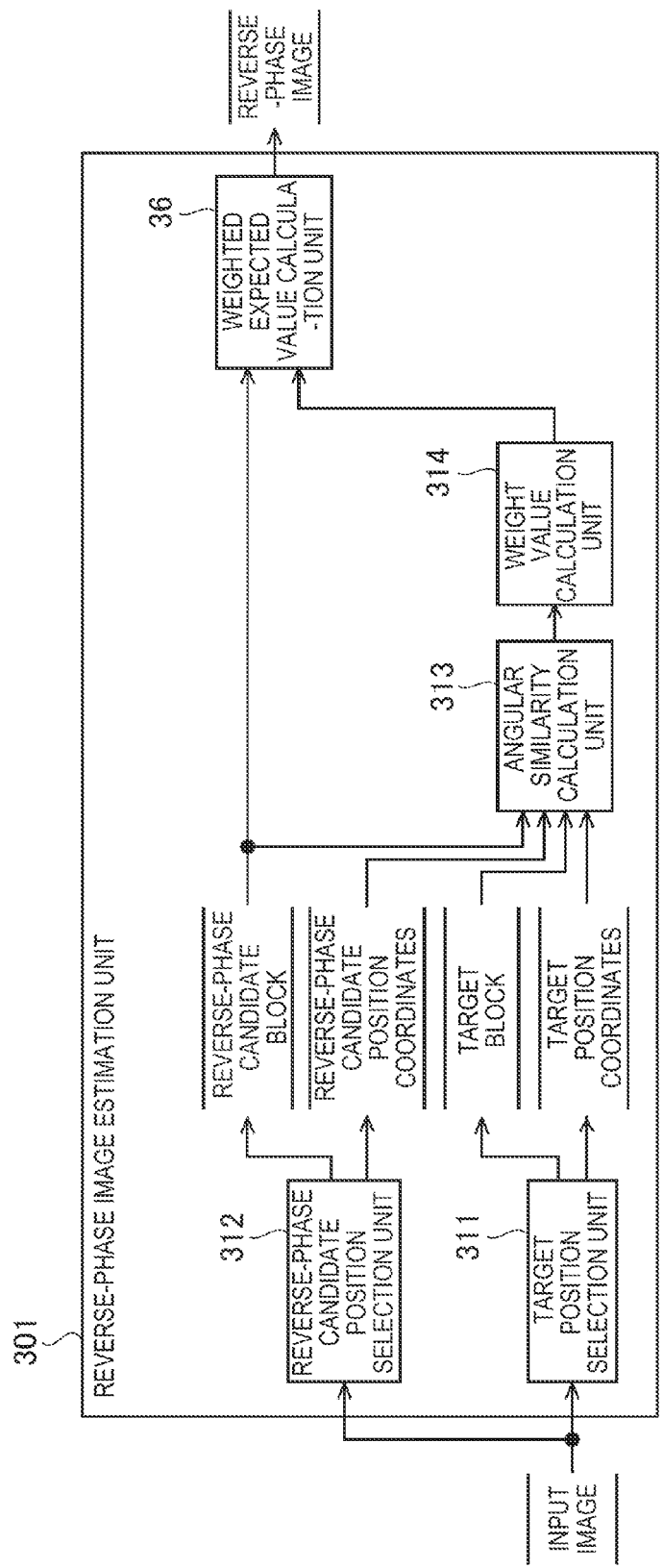
FIG. 22 is a block diagram illustrating a main configuration example of a reverse-phase image estimation unit.

FIG. 22 is a block diagram illustrating a main configuration example of the reverse-phase image estimation unit 301. As illustrated in FIG. 22, the reverse-phase image estimation unit 301 includes a target position selection unit 311, a reverse-phase candidate position selection unit 312, an angular similarity calculation unit 313, a weight value calculation unit 314, and a weighted expected value calculation unit 36.

Like the target position selection unit 31, the target position selection unit 311 sequentially selects a pixel position of the supplied input image as a target position. The target position selection unit 311 supplies the angular similarity calculation unit 313 with coordinates of the selected target pixel (hereinafter also referred to as target position coordinates) and a target block of which the center is the target pixel.

Like the reverse-phase candidate position selection unit 132, the reverse-phase candidate position selection unit 312 selects several positions having a predetermined positional relationship with the target position as reverse-phase candidate positions. However, the reverse-phase candidate position selection unit 312 selects the reverse-phase candidate positions in the supplied input image. The reverse-phase candidate position selection unit 312 supplies the angular similarity calculation unit 313 with coordinates of the selected reverse-phase candidate position (hereinafter also referred to as reverse-phase candidate position coordinates) and a predetermined region of which the center is the reverse-phase candidate position (hereinafter also referred to as a reverse-phase candidate block). Here, the reverse-phase candidate block is a block having the same size as a target block. The reverse-phase candidate position selection unit 312 also supplies the reverse-phase candidate block to the weighted expected value calculation unit 36.

The angular similarity calculation unit 313 calculates a degree of angular similarity using the target position coordinates and the target block supplied from the target position selection unit 311 and the reverse-phase candidate position coordinates and the reverse-phase candidate block supplied from the reverse-phase candidate position selection unit 312, and supplies the calculated angular similarity degree to the weight value calculation unit 314.

The angular similarity degree is a degree of similarity between a true edge direction in which the effect of jaggies is absent in the target block and a direction of the reverse-phase candidate position viewed from the target position.

The weight value calculation unit 314 calculates a weight value based on the angular similarity degree supplied from the angular similarity calculation unit 313, and supplies the calculated weight value to the weighted expected value calculation unit 36. The weighted expected value calculation unit 36 generates a reverse-phase image by calculating a weighted expected value for a target position on the basis of the reverse-phase candidate block from the reverse-phase candidate position selection unit 312 and the weight value from the weight value calculation unit 314, and supplies the generated reverse-phase image to the averaging unit 22.

[Configuration Example of Angular Similarity Calculation Unit]

Figure 23:
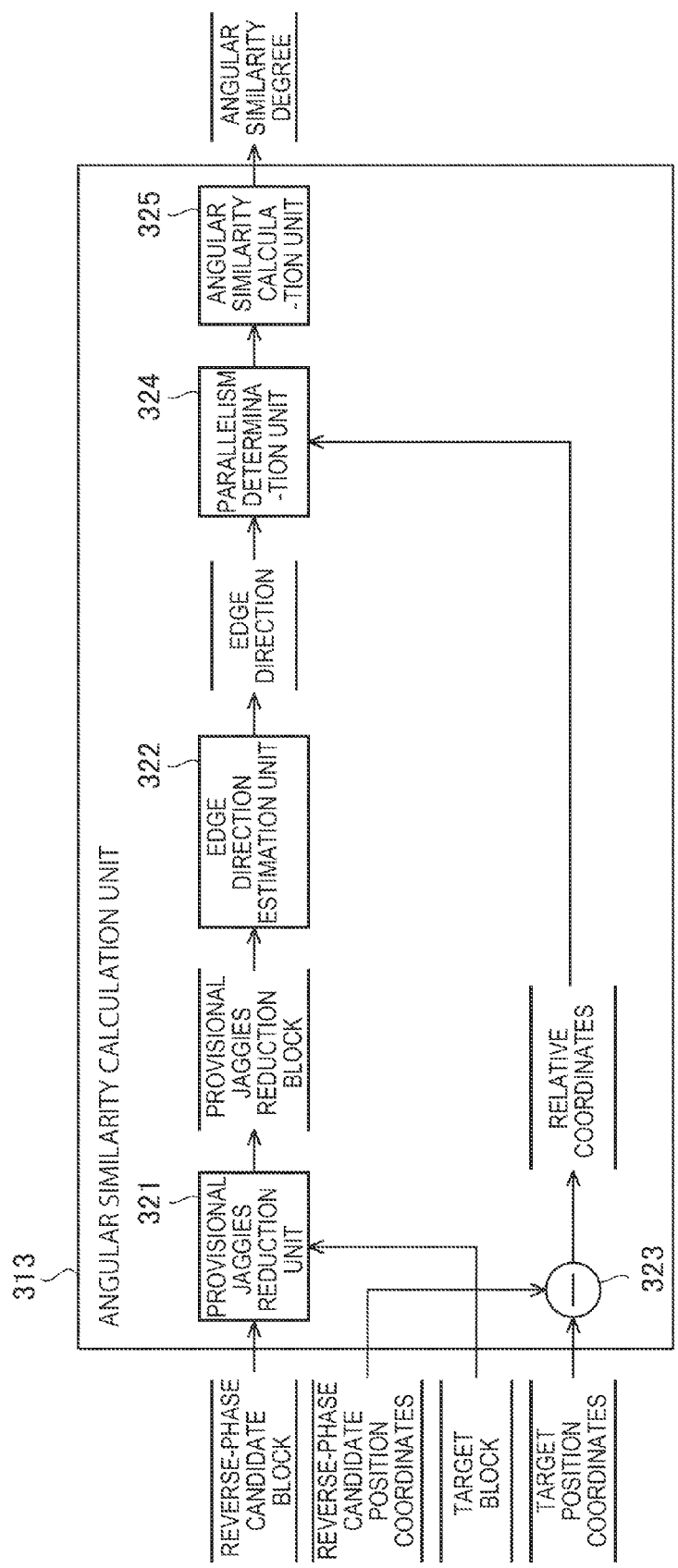
FIG. 23 is a block diagram illustrating a main configuration example of an angular similarity calculation unit.

FIG. 23 is a block diagram illustrating a main configuration example of the angular similarity calculation unit 313. As illustrated in FIG. 23, the angular similarity calculation unit 313 has a provisional jaggies reduction unit 321, an edge direction estimation unit 322, a calculation unit 323, a parallelism determination unit 324, and an angular similarity calculation unit 325.

The provisional jaggies reduction unit 321 performs a provisional process for easily reducing the jaggies using the target block supplied from the target position selection unit 311 and the reverse-phase candidate block supplied from the reverse-phase candidate position selection unit 312. According to the provisional process, the provisional jaggies reduction unit 321 supplies the edge direction estimation unit 322 with an image in which the jaggies are easily reduced (hereinafter also referred to as a provisional jaggies reduction block).

The edge direction estimation unit 322 estimates an edge direction in the provisional jaggies reduction block supplied from the provisional jaggies reduction unit 321, and supplies the parallelism determination unit 324 with information regarding the edge direction.

The calculation unit 323 subtracts target position coordinates from reverse-phase candidate position coordinates, calculates relative coordinates of a reverse-phase candidate position based on a target position, and supplies the relative coordinates to the parallelism determination unit 324.

The parallelism determination unit 324 determines a degree of parallelism between the edge direction in the provisional jaggies reduction block (target block) and the direction of the reverse-phase candidate position viewed from the target position using the edge direction supplied from the edge direction estimation unit 322 and the relative coordinates supplied from the calculation unit 323. More specifically, the parallelism determination unit 324 calculates a parameter DA indicating a magnitude of an angle formed by the edge direction and the relative direction of the reverse-phase candidate position. The parallelism determination unit 324 supplies the calculated parameter DA to the angular similarity calculation unit 325.

The angular similarity calculation unit 325 carries out a calculation for obtaining a degree of angular similarity using the parameter DA supplied from the parallelism determination unit 324. The angular similarity calculation unit 325 supplies the calculated angular similarity degree to the weight value calculation unit 314 (FIG. 22).

[Flow of Process of Reducing Jaggies]

An example of the flow of the process of reducing jaggies by the image processing apparatus 300 of FIG. 21 will be described with reference to the flowchart of FIG. 24.

If the process of reducing jaggies is started, the reverse-phase image estimation unit 301 estimates a reverse-phase image from the input image in step S301. In step S302, the averaging unit 22 generates an output image based on the reverse-phase image estimated in step S301 and the input image. For example, an average value between pixel values of pixels in the same position between the reverse-phase image and the input image becomes a pixel value of a pixel of the output image in the same position between the pixels. As described above, the output image in which the component of jaggies of the input image is removed is obtained by designating an average image between the reverse-phase image and the input image as the output image. If the output image is generated, the process of reducing jaggies is ended.

[Flow of Reverse-Phase Image Estimation Process]

An example of the flow of the reverse-phase image estimation process to be executed in step S301 of FIG. 24 will be described with reference to the flowchart of FIG. 25.

If the reverse-phase image estimation process is started, one pixel position on the input image is selected as a target position as in the target position selection unit 131 in step S321. For example, each pixel position on the input image is sequentially selected in raster order. The target position selection unit 311 obtains coordinates of the selected target position (target position coordinates) and further extracts a target block of which the center is the target position.

In step S322, the reverse-phase candidate position selection unit 312 selects a reverse-phase candidate position for the target position in the input image. For example, like the reverse-phase position selection unit 132 described with reference to FIG. 10, the reverse-phase candidate position selection unit 312 designates lines separated by one line (one pixel) on the top, bottom, left, and right from the target pixel GO21 in the drawing as reverse-phase pixel search lines. The reverse-phase candidate position selection unit 132 sequentially selects pixels in a predetermined range on these lines (reverse-phase pixel search lines LR21 to LR24) as reverse-phase candidate pixels.

The reverse-phase candidate position selection unit 312 obtains coordinates of the selected reverse-phase candidate position (reverse-phase candidate position coordinates), and further extracts a reverse-phase candidate block of which the center is the reverse-phase candidate position. Here, the reverse-phase candidate block is a block having the same size as the target block.

In step S323, the angular similarity calculation unit 313 calculates a degree of angular similarity, which is a degree of similarity between an edge direction in the target block and a direction of a reverse-phase candidate position based on the target position, using the target position coordinates and the target block obtained in the process of step S321 and the reverse-phase candidate position coordinates and the reverse-phase candidate block obtained in the process of step S322.

In step S324, the weight value calculation unit 314 calculates a weight value based on the angular similarity degree obtained in the process of step S323. For example, the weight value calculation unit 314 inputs the similarity degree to a monotonically increasing function within a predetermined range, and designates an obtained value as a weight value.

For example, the weight value calculation unit 314 calculates a weight value by carrying out the calculation of the following Equation (4).

$$[\text{Weight Value}] = \begin{cases} [\text{Angular Similarity Degree}] - [\text{Lower Angular Similarity Limit}] \\ \quad \text{if } [\text{Angular Similarity Degree}] > [\text{Lower Angular Similarity Limit}] \\ 0 \quad \text{otherwise} \end{cases} \quad (4)$$

The weight value may be defined so that the higher the angular similarity degree, the larger the weight value. For example, the angular similarity degree may be directly a weight value.

In step S325, the weighted expected value calculation unit 36 calculates a weighted expected value for the target position on the basis of the reverse-phase candidate block obtained in the process of step S322 and the weight value obtained in the process of step S324.

That is, the weighted expected value calculation unit 36 multiplies weight values of reverse-phase candidate pixels selected for one target pixel by pixel values of the reverse-phase candidate block and normalizes a sum of the pixel values multiplied by the weight values, thereby calculating a weighted expected value. The weighted expected value calculated as described above becomes a pixel value of a pixel of a reverse-phase image having the same position as the target pixel.

In step S326, the target position selection unit 311 determines whether or not all pixels on the input image have been selected as target pixels. If unprocessed pixels are determined to be present, the target position selection unit 311 returns the process to step S321, and iterates a process subsequent thereto. That is, the next pixel on the input image is selected as a target pixel in the target position, and a pixel value of a pixel of a reverse-phase image having the same position as the target pixel is obtained.

Figure 24:
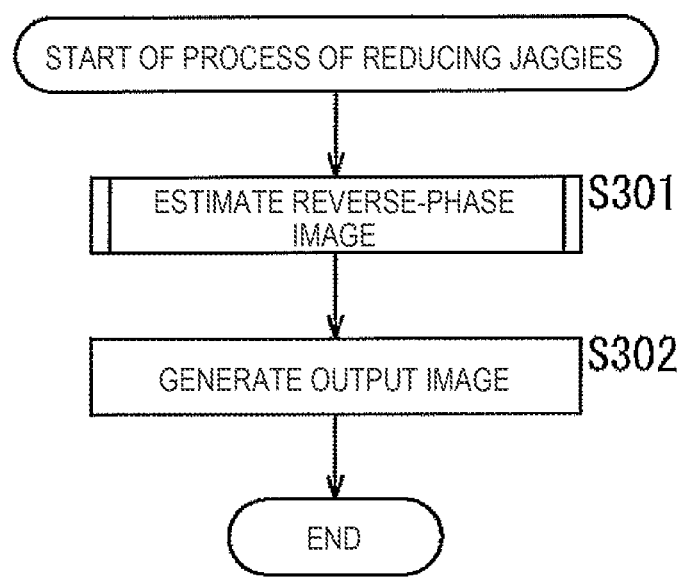
FIG. 24 is a flowchart illustrating an example of a flow of a process of reducing jaggies.

On the other hand, if all the pixels are determined to have been selected in step S326, the target position selection unit 311 ends the reverse-phase image estimation process and returns the process to FIG. 24.

[Flow of Angular Similarity Calculation Process]

Next, an example of the flow of the angular similarity calculation process to be executed in step S323 of FIG. 25 will be described with reference to the flowchart of FIG. 26.

If the angular similarity calculation process is started, the provisional jaggies reduction unit 321 performs a provisional process of reducing jaggies and obtains a provisional jaggies reduction block from a reverse-phase candidate block and a target block in step S341.

If only either one pixel value is valid in pixel positions corresponding to the reverse-phase candidate block and the target block, the provisional jaggies reduction unit 321 selects the valid pixel value and designates the selected valid pixel value as a pixel value of the provisional jaggies reduction block. In addition, if both pixel values are valid, the provisional jaggies reduction unit 321 obtains a weighted average between the two and designates the obtained weighted average as a pixel value of a provisional jaggies reduction block.

Figure 27:
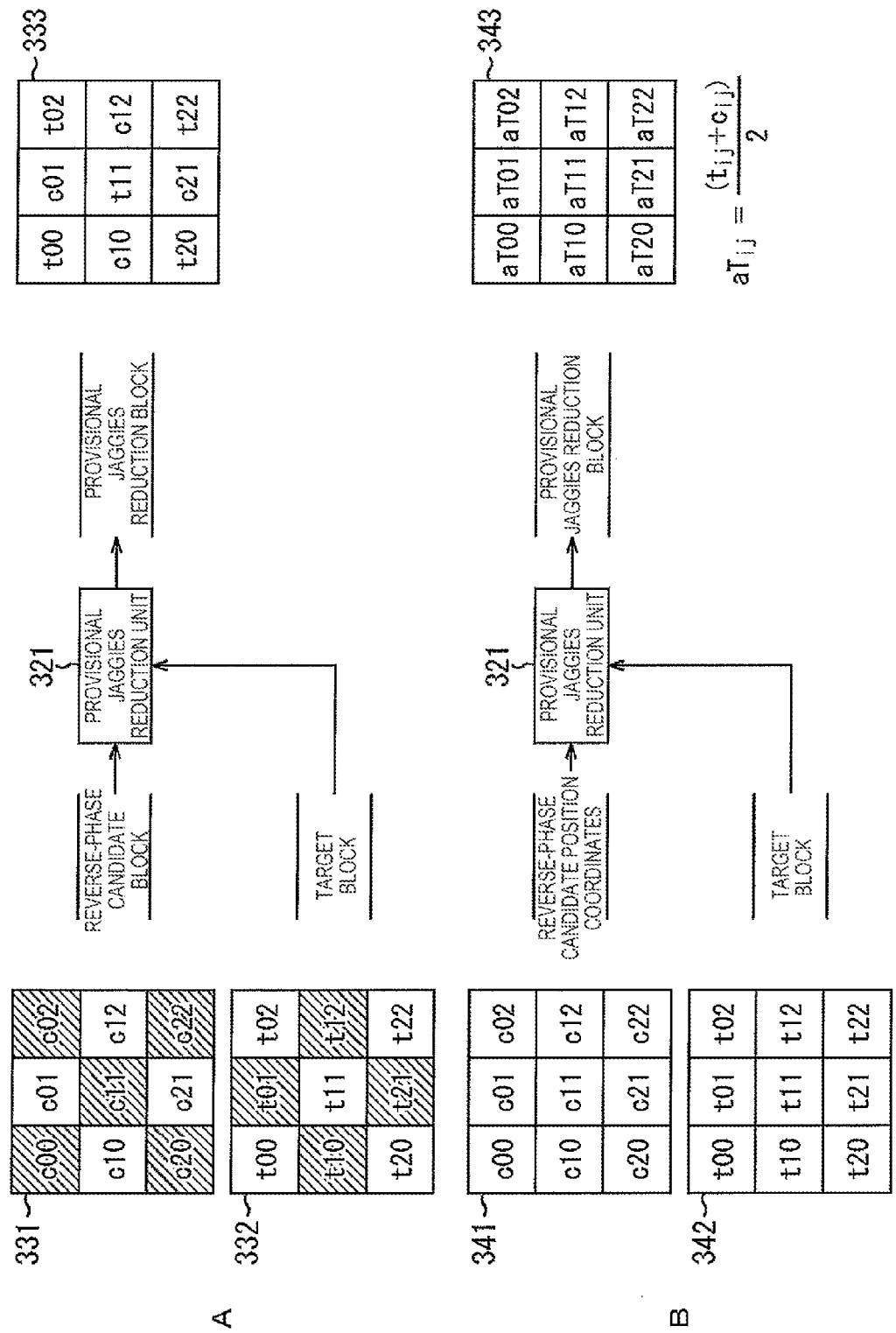
FIG. 27 is a diagram illustrating an example of the appearance of a provisional process of reducing jaggies.

An example of the appearance of the provisional process of reducing jaggies is illustrated in FIG. 27. For example, in FIG. 27A, background pixels c01, c10, c12, and c21 of a reverse-phase candidate block 331 are valid pixels and pixels c00, c02, c11, c20, and c22 of a diagonal pattern are invalid pixels. In addition, background pixels t00, t02, t11, t20, and t22 of a target block 332 are valid pixels and pixels t01, t10, t12, and t21 of a diagonal pattern are invalid pixels.

In this case, the provisional jaggies reduction unit 321 selects a pixel value, which is a valid pixel in each pixel position, and designates the selected pixel value as a pixel value of the provisional jaggies reduction block. Therefore, pixel values of a provisional jaggies reduction block 333 are constituted by t00, c01, t02, c10, t11, c12, t20, c21, and t22.

In addition, for example, as illustrated in FIG. 27B, all pixels (c00 to c22) of the reverse-phase candidate block 341 are valid pixels and all pixels (t00 to t22) of the target block 342 are also valid pixels.

In this case, the provisional jaggies reduction unit 321 calculates a weighted average $aT_{ij}$ between the two with respect to each pixel position as shown in the following Equation (5), and designates the calculated weighted average $aT_{ij}$ as the pixel value of the provisional jaggies reduction block.

$$aT_{ij} = \frac{(t_{ij} + c_{ij})}{2} \quad (5)$$

Therefore, pixel values of a provisional jaggies reduction block 343 are constituted by aT00, aT01, aT02, aT10, aT11, aT12, aT20, aT21, and aT22.

In a similarity calculation unit using a difference for each pixel position described above in another embodiment, it is not possible to calculate the difference if no valid pixel is provided in a corresponding pixel position of the reverse-phase candidate position image and the target position image. On the other hand, in this technique, it is preferable that pixels sufficient to determine a local direction be provided in a provisional jaggies reduction block as a result of a provisional process of reducing jaggies. Therefore, it is not necessary that all pixel positions of the provisional jaggies reduction block be valid.

Returning to FIG. 26, in step S342, the edge direction estimation unit 322 estimates an edge direction of the provisional jaggies reduction block obtained in the process of step S341.

The edge direction estimation unit 322 estimates a rough direction of an edge. Although an arbitrary estimation method may be used, for example, Sobel filter-based direction estimation, gradMin-based direction estimation, or the like is possible.

Figure 28:
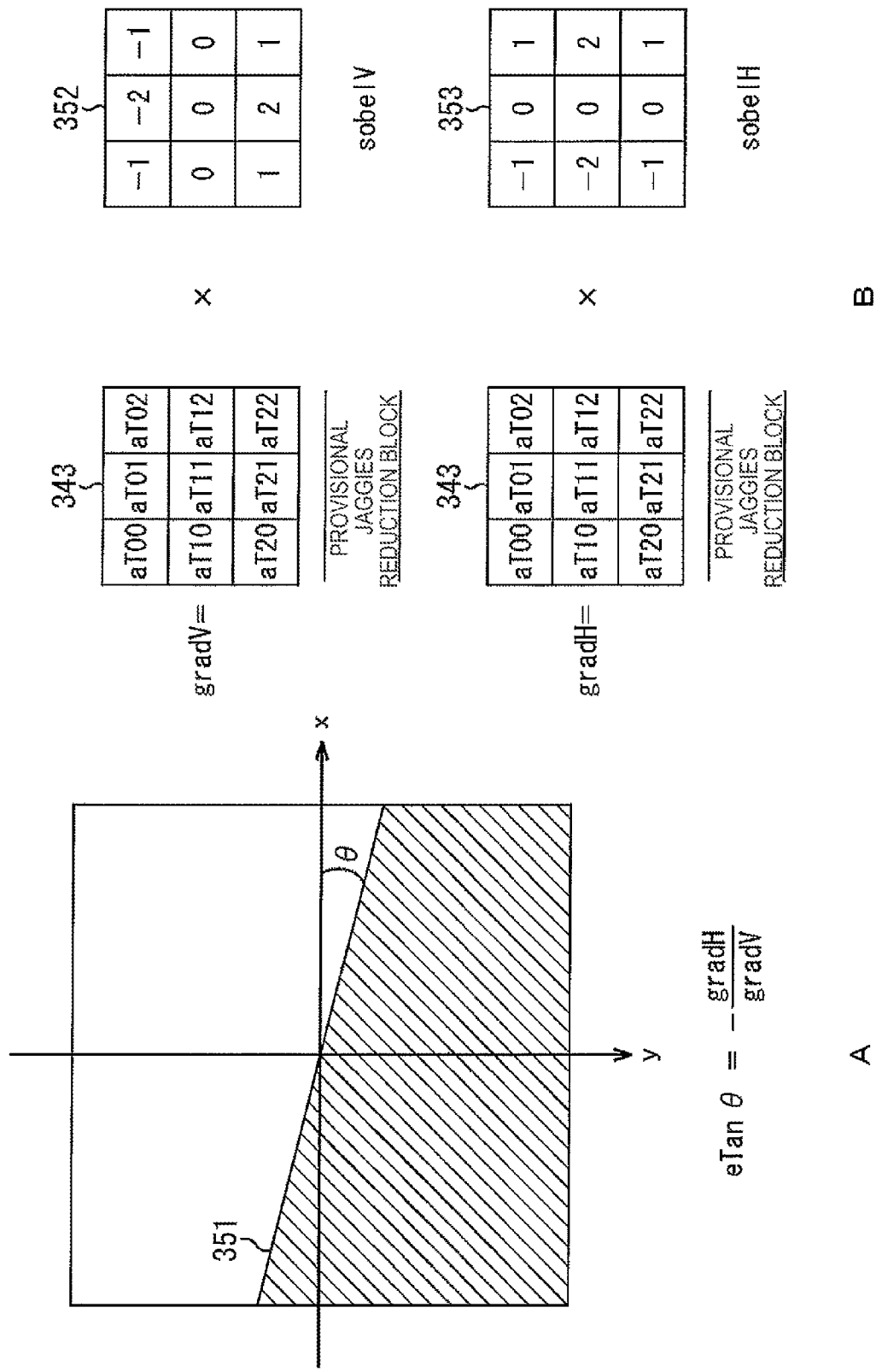
FIG. 28 is a diagram illustrating an example of the appearance of Sobel-filter-based direction estimation.

The Sobel filter-based direction estimation will be described. FIG. 28 is a diagram illustrating an example of the appearance of the Sobel filter-based direction estimation. As illustrated in FIG. 28A, an edge 351, which is a boundary between a background portion and a diagonal pattern portion, is present in a provisional jaggies reduction block of (3×3) pixels. If the edge 351 forms an angle θ with a positive direction of an x axis, a prediction value e Tan θ of tan θ can be expressed as illustrated in the following Equation (6).

$$e\,\text{Tan}\,\theta = \text{grad}H/\text{grad}V \quad (6)$$

As in an example illustrated in FIG. 28B, gradV is a result obtained by applying a Sobel filter 352 used for an edge determination of a horizontal direction to the provisional jaggies reduction block 343 (a sum of results obtained by multiplying pixel values of the provisional jaggies reduction block 343 by coefficients of the Sobel filter 352 in their pixel positions). In addition, as in the example illustrated in FIG. 28B, gradH is a result obtained by applying a Sobel filter 353 used for an edge determination of a vertical direction to the provisional jaggies reduction block 343 (a sum of results obtained by multiplying pixel values of the provisional jaggies reduction block 343 by coefficients of the Sobel filter 353 in their pixel positions).

As described above, the edge direction estimation unit 322 can easily estimate the edge direction using the Sobel filter.

Next, the gradMin-based direction estimation will be described. The gradMin-based direction estimation is a method of obtaining a weighted average of a sum of difference absolute values between a center pixel and its peripheral pixels for each direction in the provisional jaggies reduction block and estimating a direction in which the weighted average is minimized as an edge direction.

In the gradMin-based direction estimation, the edge direction estimation unit 322 performs a search of the edge direction separately in the horizontal direction and the vertical direction so that a further detailed search of the edge direction can be easily performed.

Figure 29:
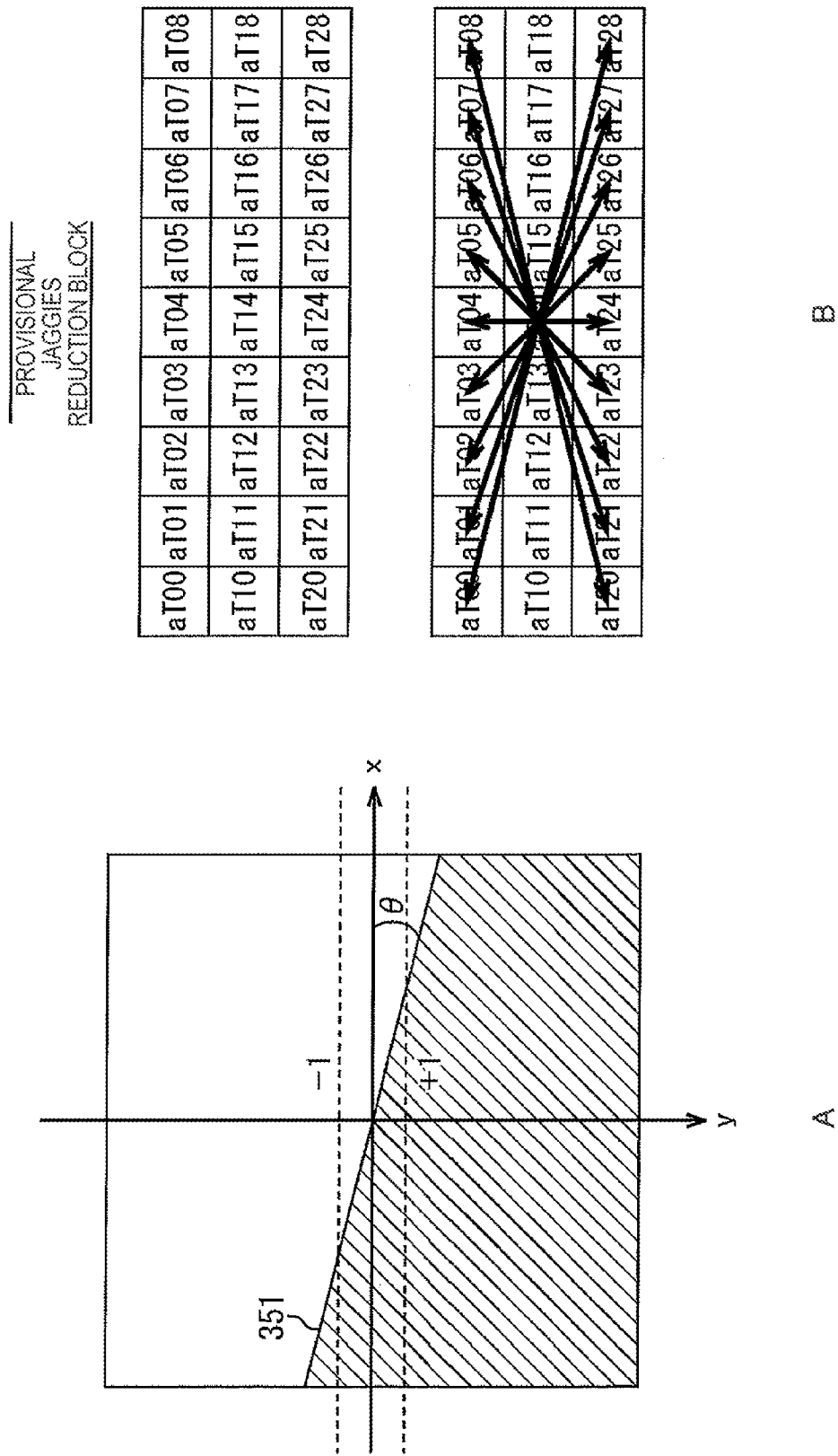
FIG. 29 is a diagram illustrating an example of the appearance of a horizontal-direction search of gradMin-based direction estimation.

FIG. 29 is a diagram illustrating an example of the appearance of a horizontal-direction search of the gradMin-based direction estimation. As illustrated in FIG. 29A, in the provisional jaggies reduction block, an edge 351, which is a boundary between a background portion and a diagonal pattern portion, is present in the provisional jaggies reduction block. If the edge 351 forms an angle θ with a positive direction of an x axis, the edge direction estimation unit 322 estimates a prediction value e Tan θ of tan θ as follows.

As illustrated in FIG. 29A, in the search on the horizontal line according to ±1 in a y direction, the edge direction estimation unit 322 considers $-\pi/4 \leq \theta \leq \pi/4$ or $3\pi/4 \leq \theta \leq 5\pi/4$. It is desirable to provide a horizontally long provisional jaggies reduction block so that the edge direction estimation unit 322 can sense an edge of a shallow angle as illustrated in FIG. 29B.

If the provisional jaggies reduction block is an example illustrated in FIG. 29B, the edge direction estimation unit 322 designates a target position to be processed as a pixel aT14, and designates a gradient (grad.) of each direction as a weighted average of a sum of difference absolute values along double-headed arrows via the pixel aT14. In addition, gradMin is a minimum value of grad0 to grad8.

Assuming that a high frequency is absent in a direction parallel to an edge in the provisional jaggies reduction block, the edge direction estimation unit 322 can estimate an edge direction in the pixel aT14 as a direction of a double-headed arrow having a value of gradMin. Consequently, an estimation value e Tan θ of tan θ can be obtained as follows.

In the example of FIG. 29B, the edge direction estimation unit 322 calculates gradients (grad0 to grad8) of double-headed arrow directions as shown in the following Equations (7) to (15).

$$\text{grad0} = (|aT00 - aT14|_+ |aT14 \cdot aT28|)/2\sqrt{(17)} \quad (7)$$

$$\text{grad1} = (|aT01 - aT14|_+ |aT14 - aT27|)/2\sqrt{(10)} \quad (8)$$

$$\text{grad2} = (|aT02 - aT14|_+ |aT14 - aT26|)/2\sqrt{(5)} \quad (9)$$

$$\text{grad3} = (|aT03 - aT14|_+ |aT14 - aT25|)/2\sqrt{(2)} \quad (10)$$

$$\text{grad4} = (|aT04 - aT14|_+ |aT14 - aT24|)/2 \quad (11)$$

$$\text{grad5} = (|aT05 - aT14|_+ |aT14 - aT23|)/2\sqrt{(2)} \quad (12)$$

$$\text{grad}6=(|aT06-aT14|+|aT14-aT22|)/2\sqrt{(5)} \quad (13)$$

$$\text{grad}7=(|aT07-aT14|+|aT14-aT21|)/2\sqrt{(10)} \quad (14)$$

$$\text{grad}8=(|aT08-aT14|+|aT14-aT20|)/2\sqrt{(17)} \quad (15)$$

The edge direction estimation unit 322 obtains a minimum value gradMin from gradients calculated as described above, specifies a direction θ corresponding to the gradient, and obtains e Tan θ.

For example, if gradMin=grad0, the edge direction estimation unit 322 estimates e Tan θ=¼. In addition, if gradMin=grad1, the edge direction estimation unit 322 estimates e Tan θ=⅓. Further, if gradMin=grad2, the edge direction estimation unit 322 estimates e Tan θ=½. In addition, if gradMin=grad3, the edge direction estimation unit 322 estimates e Tan θ=1. Further, if gradMin=grad4, the edge direction estimation unit 322 estimates e Tan θ=∞. In addition, if gradMin=grad5, the edge direction estimation unit 322 estimates e Tan θ=−1. Further, if gradMin=grad6, the edge direction estimation unit 322 estimates e Tan θ=−½. In addition, if gradMin=grad7, the edge direction estimation unit 322 estimates e Tan θ=−⅓. Further, if gradMin=grad8, the edge direction estimation unit 322 estimates e Tan θ=−¼.

Figure 30:
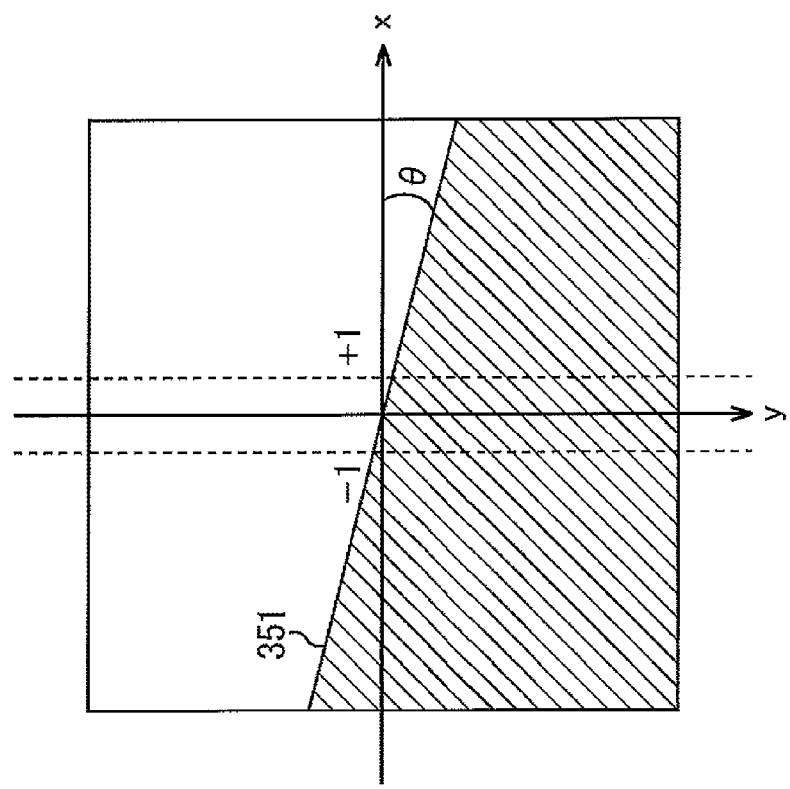
FIG. 30 is a diagram illustrating an example of the appearance of a vertical-direction search of gradMin-based direction estimation.

FIG. 30 is a diagram illustrating an example of the appearance of a vertical-direction search of gradMin-based direction estimation. FIG. 30A is a diagram illustrating an example of an edge direction of the provisional jaggies reduction block, which is the same example as FIG. 29A.

As illustrated in FIG. 30A, in the search on the vertical line according to ±1 in an x direction, the edge direction estimation unit 322 considers π/4≤θ≤3π/4 or 5π/4≤θ≤7π/4. It is desirable to provide the provisional jaggies reduction block in the vertical direction so that the edge direction estimation unit 322 can sense an edge of a deep angle as illustrated in FIG. 30B.

If the provisional jaggies reduction block is an example illustrated in FIG. 30B, the edge direction estimation unit 322 designates a target position to be processed as a pixel aT41, and designates a gradient of each direction as a weighted average of a sum of difference absolute values along double-headed arrows via the pixel aT41.

Assuming that a high frequency is absent in a direction parallel to an edge as in the case of the horizontal-direction search, the edge direction estimation unit 322 can estimate an edge direction in the pixel aT41 as a direction of a double-headed arrow having a value of gradMin.

In the example of FIG. 30B, the edge direction estimation unit 322 calculates gradients (grad0 to grad8) of double-headed arrow directions as shown in the following Equations (16) to (24).

$$\text{grad}0=(|aT00-aT41|+|aT41-aT82|)/2\sqrt{(17)} \quad (16)$$

$$\text{grad}1=(|aT10-aT41|+|aT41-aT72|)/2\sqrt{(10)} \quad (17)$$

$$\text{grad}2=(|aT20-aT41|+|aT41-aT62|)/2\sqrt{(5)} \quad (18)$$

$$\text{grad}3=(|aT30-aT41|+|aT41-aT52|)/2\sqrt{(2)} \quad (19)$$

$$\text{grad}4=(|aT40-aT41|+|aT41-aT42|)/2 \quad (20)$$

$$\text{grad}5=(|aT50-aT41|+|aT41-aT32|)/2\sqrt{(2)} \quad (21)$$

$$\text{grad}6=(|aT60-aT41|+|aT41-aT22|)/2\sqrt{(5)} \quad (22)$$

$$\text{grad}7=(|aT70-aT41|+|aT41-aT12|)/2\sqrt{(10)} \quad (23)$$

$$\text{grad}8=(|aT80-aT41|+|aT41-aT02|)/2\sqrt{(17)} \quad (24)$$

The edge direction estimation unit 322 obtains a minimum value gradMin from gradients calculated as described above, specifies a direction θ corresponding to the gradient, and obtains e Tan θ.

For example, if gradMin=grad0, the edge direction estimation unit 322 estimates e Tan θ=4. In addition, if gradMin=grad1, the edge direction estimation unit 322 estimates e Tan θ=/3. Further, if gradMin=grad2, the edge direction estimation unit 322 estimates e Tan θ=2. In addition, if gradMin=grad3, the edge direction estimation unit 322 estimates e Tan θ=1. Further, if gradMin=grad4, the edge direction estimation unit 322 estimates e Tan θ=0. In addition, if gradMin=grad5, the edge direction estimation unit 322 estimates e Tan θ=−1. Further, if gradMin=grad6, the edge direction estimation unit 322 estimates e Tan θ=−2. In addition, if gradMin=grad7, the edge direction estimation unit 322 estimates e Tan θ=−3. Further, if gradMin=grad8, the edge direction estimation unit 322 estimates e Tan θ=−4.

Figure 31:
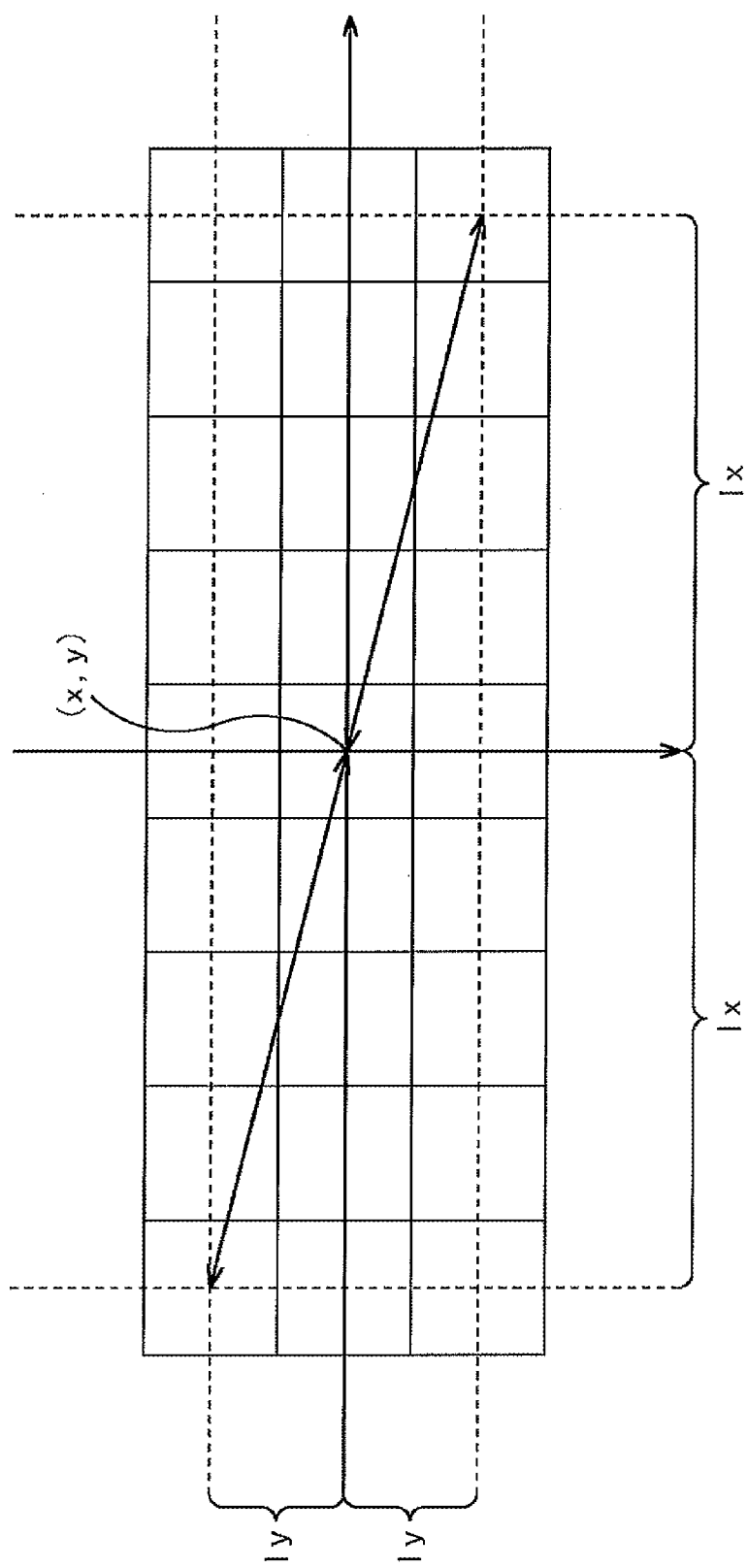
FIG. 31 is a diagram illustrating an example of a provisional jaggies reduction block.

The gradMin-based direction estimation method as described above will be described in more general ways. FIG. 31 is a diagram illustrating an example of the provisional jaggies reduction block. As illustrated in FIG. 31, if symmetrical position coordinates are designated as (x, y) and a pixel value of the provisional jaggies reduction block in the position (x, y) is designated as preAnti I(x, y), grad(lx, ly) of the direction toward coordinates (lx, ly) is calculated as shown in the following Equation (25).

$$\text{grad}(lx, ly) = \left( \frac{|preAnti|(x+lx, y+ly) - preAnti|(x, y)| + |preAnti|(x-lx, y-ly) - preAnti|(x, y)|}{2\sqrt{(lx^2 + ly^2)}} \right) \quad (25)$$

In the search on the horizontal line according to ±1 in the y direction as described above, the edge direction estimation unit 322 calculates gradMin as shown in the following Equation (26).

$$\text{gradMin} = \min_{lx \in \text{horizontal search range}} (\text{grad}(lx, 1)) \quad (26)$$

In addition, in the search on the vertical line according to ±1 in the x direction as described above, the edge direction estimation unit 322 calculates gradMin as shown in the following Equation (27).

$$\text{gradMin} = \min_{ly \in \text{vertical search range}} (\text{grad}(1, ly)) \quad (27)$$

The edge direction estimation unit 322 can obtain a prediction value e Tan θ of tan θ with respect to (lx, ly) for providing gradMIN as in the following Equation (28).

$$e \text{ Tan } \theta = ly/lx \quad (28)$$

As described above, the edge direction estimation unit 322 can estimate an edge direction in further detail by estimating gradMin.

The edge direction estimation unit 322 can more easily estimate a further detailed edge direction by varying an aspect ratio of the provisional jaggies reduction block according to whether to search for a reverse-phase candidate position either horizontally or vertically with respect to a target pixel.

In this case, the provisional jaggies reduction unit 321 may generate both a horizontally long provisional jaggies reduction block for a horizontal-direction search and a vertically long provisional jaggies reduction block for a vertical-direction search, and supply the two to the edge direction estimation unit 322. In addition, the provisional jaggies reduction unit 321 may generate a large provisional jaggies reduction block (of a number of pixels), and the edge direction estimation unit 322 may extract and use part of the large provisional jaggies reduction block at an aspect ratio for the horizontal-direction search and an aspect ratio for the vertical direction search.

Returning to FIG. 26, in step S343, the calculation unit 323 calculates relative coordinates of a reverse-phase candidate pixel based on a target pixel from target position coordinates and reverse-phase candidate position coordinates.

Figure 32:
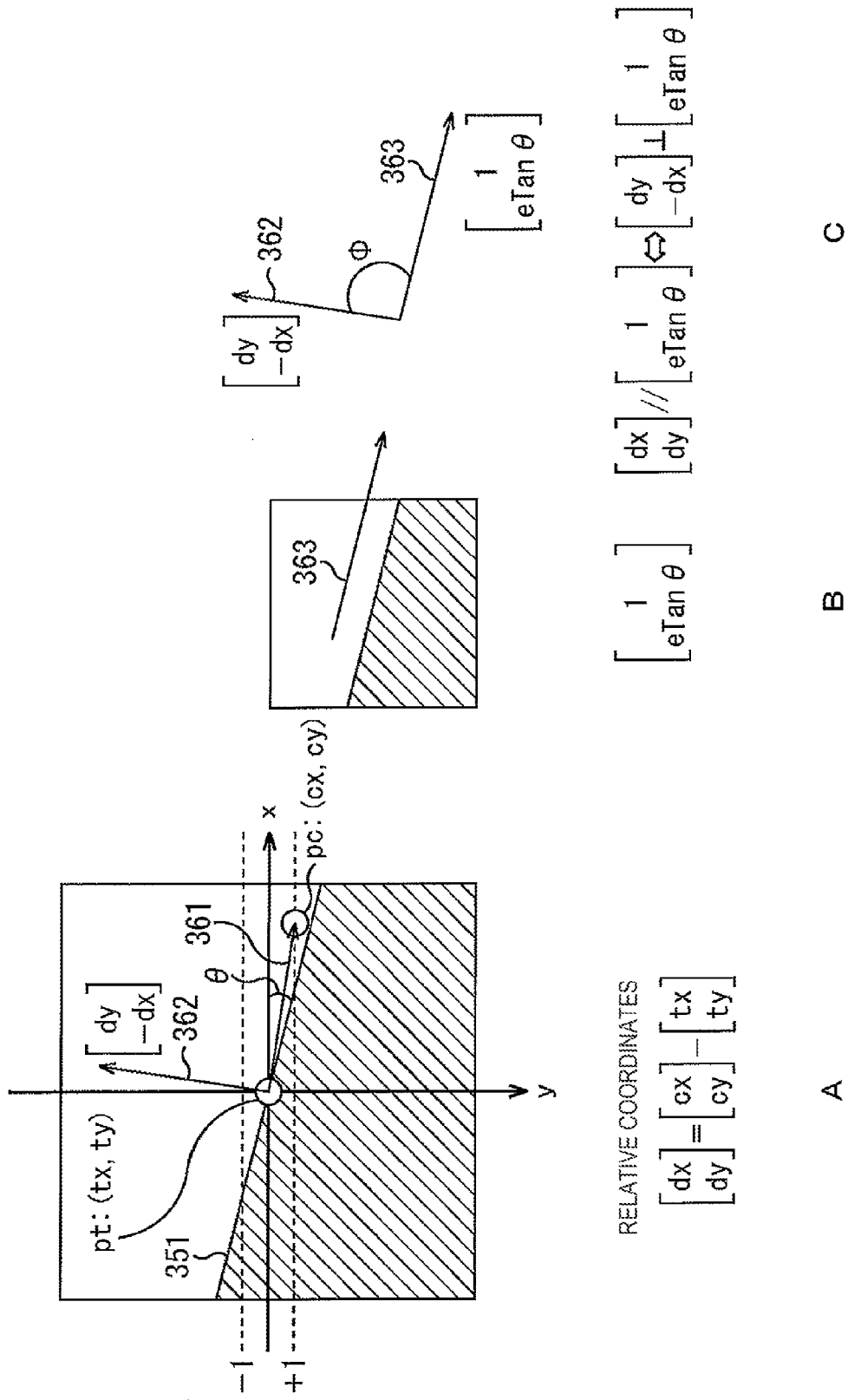
FIG. 32 is a diagram illustrating an example of the appearance of a relative-coordinate calculation and a parallelism determination.

FIG. 32 is a diagram illustrating an example of the appearance of a relative-coordinate calculation and a parallelism determination.

In the example illustrated in FIG. 32A, a pixel pt(tx, ty) is a target pixel and a pixel pc(cx, cy) is a reverse-phase candidate pixel. In this case, the calculation unit 323 calculates relative coordinates (dx, dy) of a reverse-phase candidate pixel based on the target pixel as shown in the following Equation (29).

$$\text{Relative Coordinates}\begin{bmatrix} dx \\ dy \end{bmatrix} = \begin{bmatrix} cx \\ cy \end{bmatrix} - \begin{bmatrix} tx \\ ty \end{bmatrix} \tag{29}$$

Returning to FIG. 26, in step S344, the parallelism determination unit 324 determines a degree of parallelism between the edge direction estimated in the process of step S342 and a direction of a reverse-phase candidate pixel based on the target pixel as indicated by the relative coordinates calculated in the process of step S343.

Because a provisional jaggies reduction block by a correct reverse-phase pixel position block becomes a clean edge image with no jaggies, the edge direction of the provisional jaggies reduction block becomes an edge direction in which the influence of the jaggies of the target image position is absent. Thus, the direction of the relative coordinates is parallel to the edge direction of the provisional jaggies reduction image. The similarity determination is made with an angle φ formed by a position vector of the relative coordinates and a direction perpendicular to the edge direction of the provisional jaggies reduction image.

In FIG. 32A, a vector 361 (dx, dy) is a position vector indicating relative coordinates calculated in the process of step S343. In addition, the edge direction estimated in the process of step S342 is indicated by a vector 363 (1, e Tan θ) parallel to the edge direction as illustrated in FIG. 32B.

The parallelism determination unit 324 obtains a relationship between directions of the vector 361 and the vector 363 (an angle formed by the two vectors). However, the parallelism determination unit 324 actually obtains a cosine (cos) without calculating the angle so as to reduce a calculation amount. In addition, in order to improve sensitivity in the determination of the angle around the parallelism, the parallelism determination unit 324 obtains the cosine of the angle φ formed by the vector 362 (dy, −dx) perpendicular to the vector 361 and the vector 363 in place of the angle formed by the vector 361 and the vector 363 as illustrated in FIG. 32C.

As illustrated in the following Equation (30), the vector 362 is perpendicular to the vector 363 if the vector 361 is parallel to the vector 363.

$$\begin{bmatrix} dx \\ dy \end{bmatrix} // \begin{bmatrix} 1 \\ e\text{Tan}\theta \end{bmatrix} \Leftrightarrow \begin{bmatrix} dy \\ -dx \end{bmatrix} \perp \begin{bmatrix} 1 \\ e\text{Tan}\theta \end{bmatrix} \tag{30}$$

It is possible to improve the sensitivity by making a perpendicularity determination (a determination around an inflection point of a trigonometric function) rather than a parallelism determination (a determination around an extreme value of a trigonometric function). The parallelism determination unit 324 calculates cos φ as shown in the following Equation (31).

$$\cos\phi = \frac{|-dx \cdot e\text{Tan}\theta + dy \cdot 1|}{\sqrt{dx^2 + dy^2} \cdot \sqrt{e\text{Tan}\theta^2 + 1^2}} \tag{31}$$

Of course, the parallelism determination unit 324 may obtain the cosine of an angle formed by the vector 361 and the vector 363 (make the parallelism determination in a direction parallel to an edge).

Further, the parallelism determination unit 324 corrects cos φ using a gain and an offset according to a distance between the target pixel and the reverse-phase candidate pixel, and calculates a parameter DA.

First, the parallelism determination unit 324 calculates a variable d Tan as shown in the following Equation (32).

$$d\text{Tan} = \begin{cases} |dy|/|dx| & \text{if } |dy| < |dx| \\ |dx|/|dy| & \text{otherwise} \end{cases} \tag{32}$$

As illustrated in the following Equation (33), the parallelism determination unit 324 calculates the parameter DA by determining gain and offset values according to the variable d Tan and correcting cos φ using the gain and the offset.

$$DA = \max((\cos\phi - \text{offset}(d\text{ Tan})), 0) * \text{gain}(d\text{ Tan}) \tag{33}$$

Figure 33:
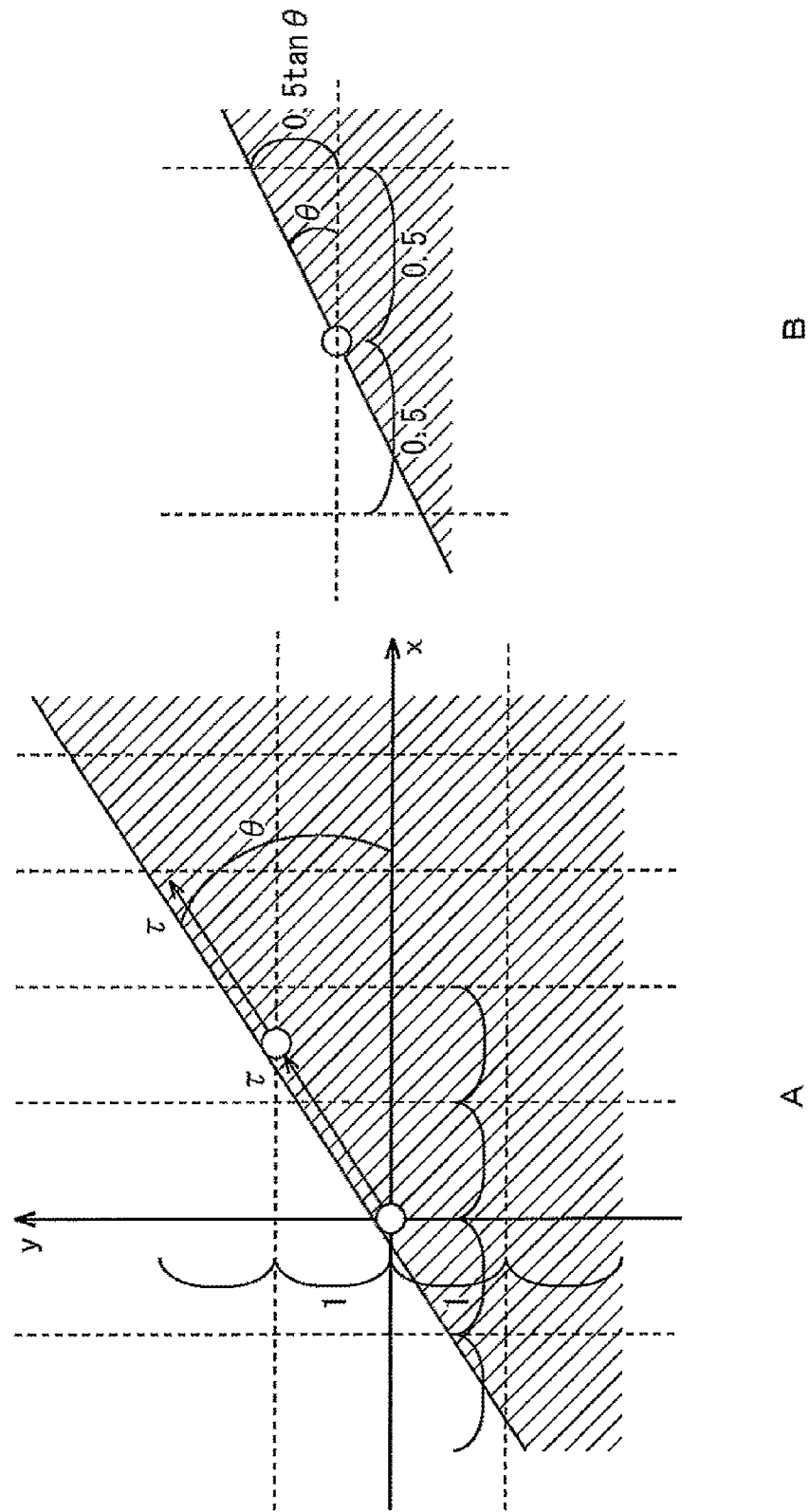
FIG. 33 is a diagram illustrating a gain and an offset.

FIG. 33 is a diagram illustrating the gain and the offset. In FIGS. 33A and 33B, each dotted line indicates a discrete position in which block matching is performed. In addition, it is assumed that 0≤θ≤π/4 for simplicity of description hereinafter.

If the reverse-phase candidate position is searched for in a grid point, an error in the x direction becomes maximal when the edge passes through the center of an adjacent reverse-phase candidate position as in the example of FIG. 33A or 33B. In this regard, because an error in the y direction is 0.5 tan θ as illustrated in FIG. 33B, the error is monotonically increased with respect to θ.

Consequently, when d Tan is large (when an angle of an edge is close to π/4), the parallelism determination unit 324 increases the offset and decreases the gain so that an angular similarity determination becomes soft. On the other hand, when d Tan is small (when an angle of an edge is close to 0), the parallelism determination unit 324 sets the offset to be decreased and sets the gain to be increased so that the angular similarity determination becomes strict. Thereby, the angular similarity determination can be effectively made.

In addition to the above-described method, an arbitrary correction method may be used. In addition, this correction may be omitted.

Returning to FIG. 26, in step S345, the angular similarity calculation unit 325 calculates a degree of angular similarity between the target block and the reverse-phase candidate block using the parameter DA calculated by the process of step S344.

The angular similarity calculation unit 325 calculates the degree of angular similarity from the parameter DA, for example, as shown in the following Equation (34).

$$\text{Degree of Angular Similarity} = \max\left(0, 1, 0 - \frac{DA}{THs}\right) \quad (34)$$

Figure 34:
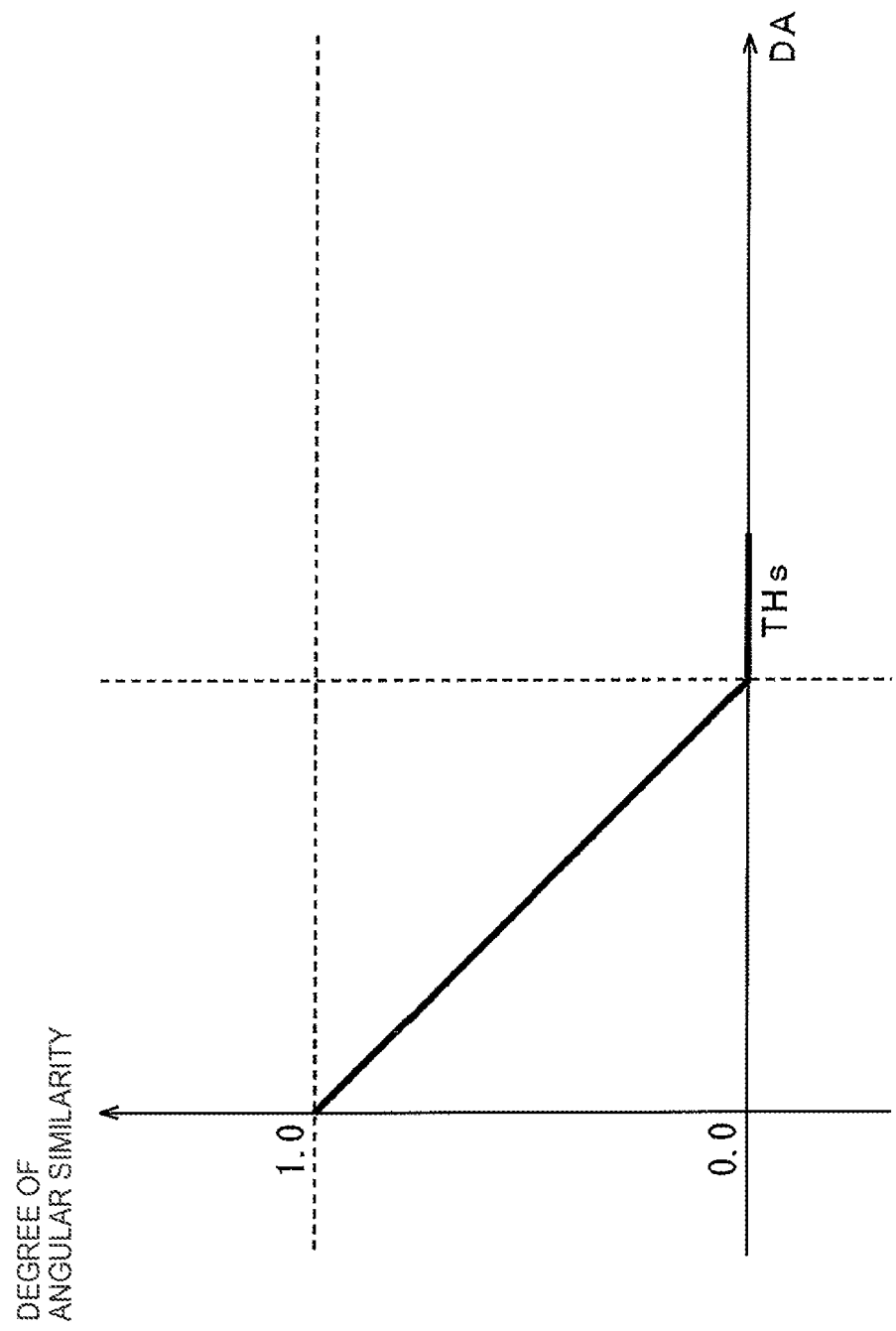
FIG. 34 is a diagram illustrating the appearance of correction.

THs is an arbitrary constant. A graph generated from Equation (34) is illustrated in FIG. 34. As illustrated in the graph of FIG. 34, the smaller the value of the parameter DA, the larger the value of the degree of angular similarity.

Thereby, a technique using a lower limit in a degree of angular similarity can also be easily applied in the same technique as in the other embodiment described above.

It is preferable that the degree of angular similarity be decreased with respect to an increase in DA. Its function may be other than the above-described Equation (34). For example, although an angular similarity fluctuation part (0≤DA≤THs) is a straight line in the graph illustrated in FIG. 34, the present technology is not limited thereto and a curve may be used.

Figure 25:
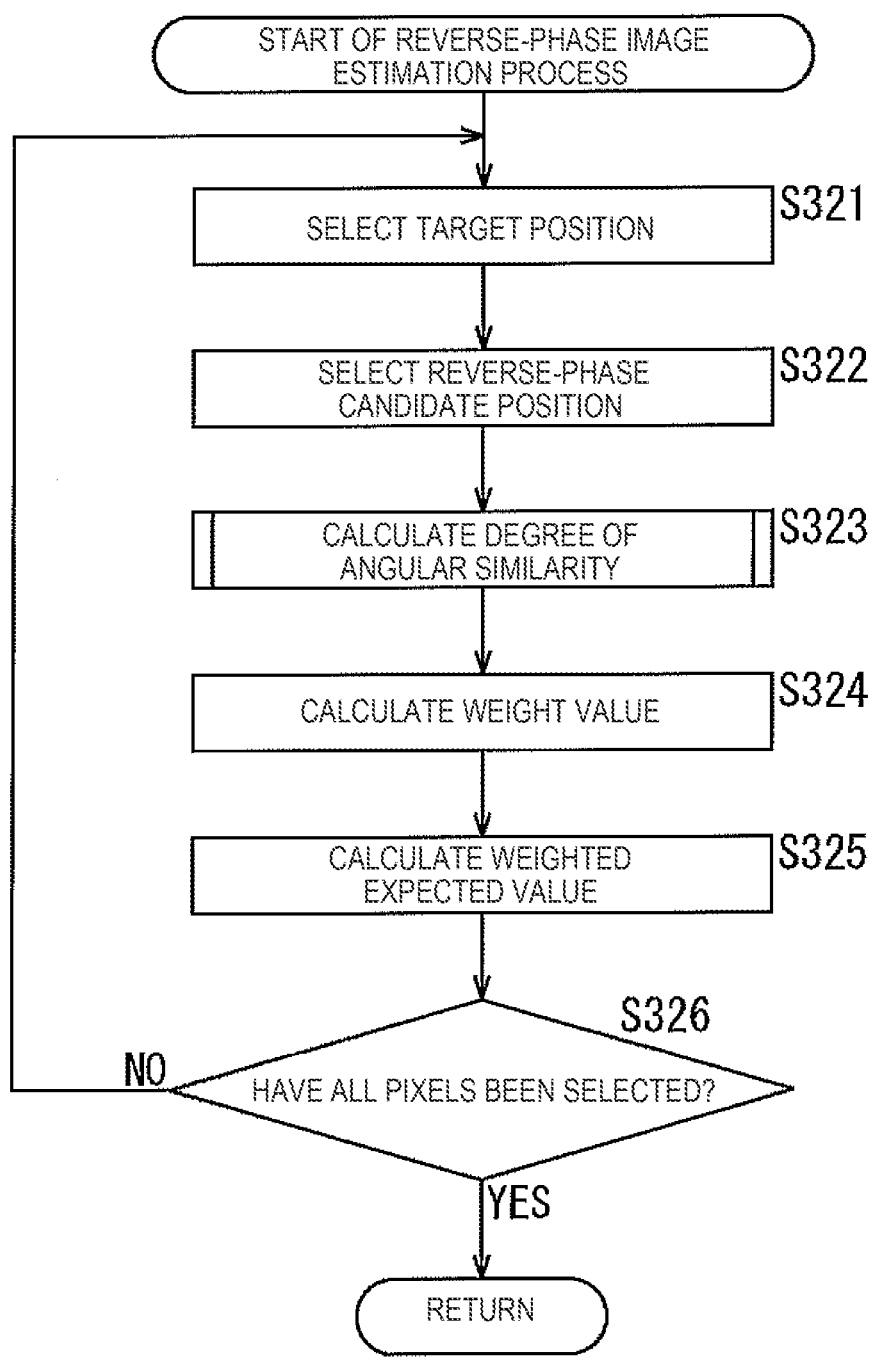
FIG. 25 is a flowchart illustrating an example of a flow of a reverse-phase image estimation process.
Figure 26:
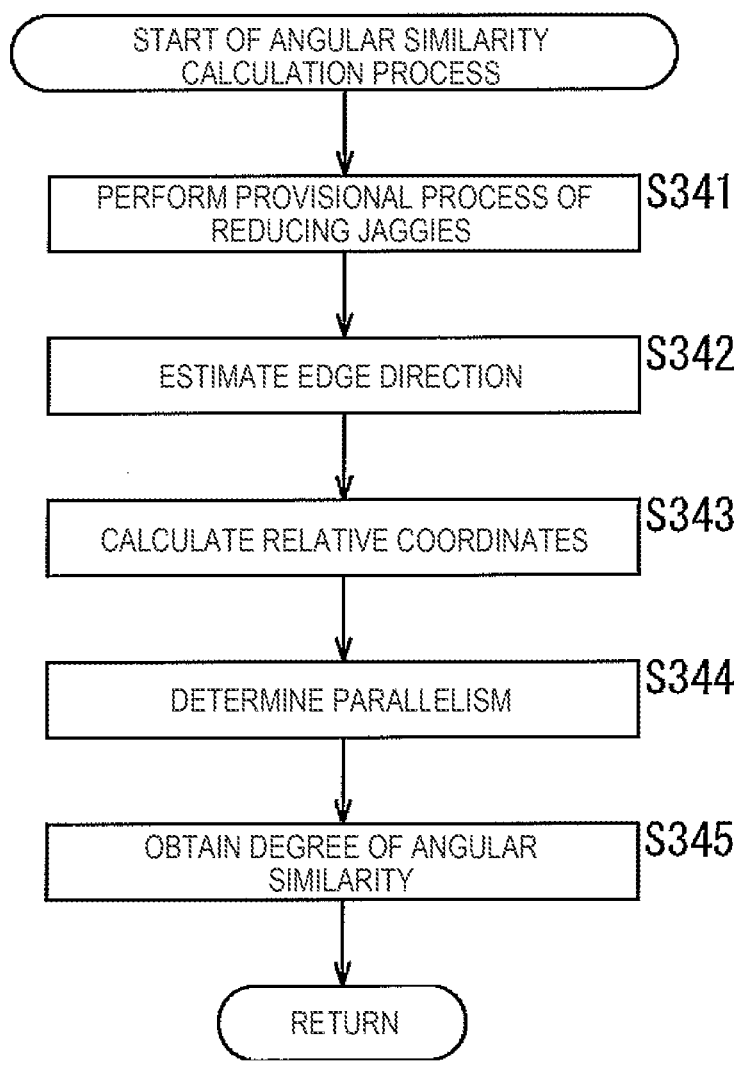
FIG. 26 is a flowchart illustrating an example of a flow of an angular similarity calculation process.

Returning to FIG. 26, if the process of step S345 is ended, the angular similarity calculation unit 325 ends the angular similarity calculation process and returns the process to FIG. 25.

According to each process as described above, the reverse-phase image estimation unit 301 can determine whether images have the same pattern from a degree of angular similarity between an image adjacent to the target position and an image adjacent to the reverse-phase candidate position, and obtain an appropriate reverse-phase image. In addition, in this case, the reverse-phase image estimation unit 301 easily reduces jaggies using the target block and the reverse-phase candidate block, generates a provisional jaggies reduction block, and calculates a degree of angular similarity using the provisional jaggies reduction block. Therefore, the reverse-phase image estimation unit 301 can calculate the degree of angular similarity without having to generate a smoothed image, and more reliably specify whether the image adjacent to the reverse-phase candidate position on the input image is an image in which jaggies have a reverse phase to the image adjacent to the target position of the input image from the calculated angular similarity degree.

<Eighth Embodiment>

[Configuration Example of Image Processing Apparatus]

Although an example in which a weight value is calculated from a degree of angular similarity has been described above, a reverse-phase candidate pixel completely different from a target pixel may be excluded from a calculation of a weighted expected value by obtaining a lower limit of the angular similarity degree and performing threshold processing according to the lower limit when the weight value is calculated as in the second embodiment for the first embodiment.

Figure 35:
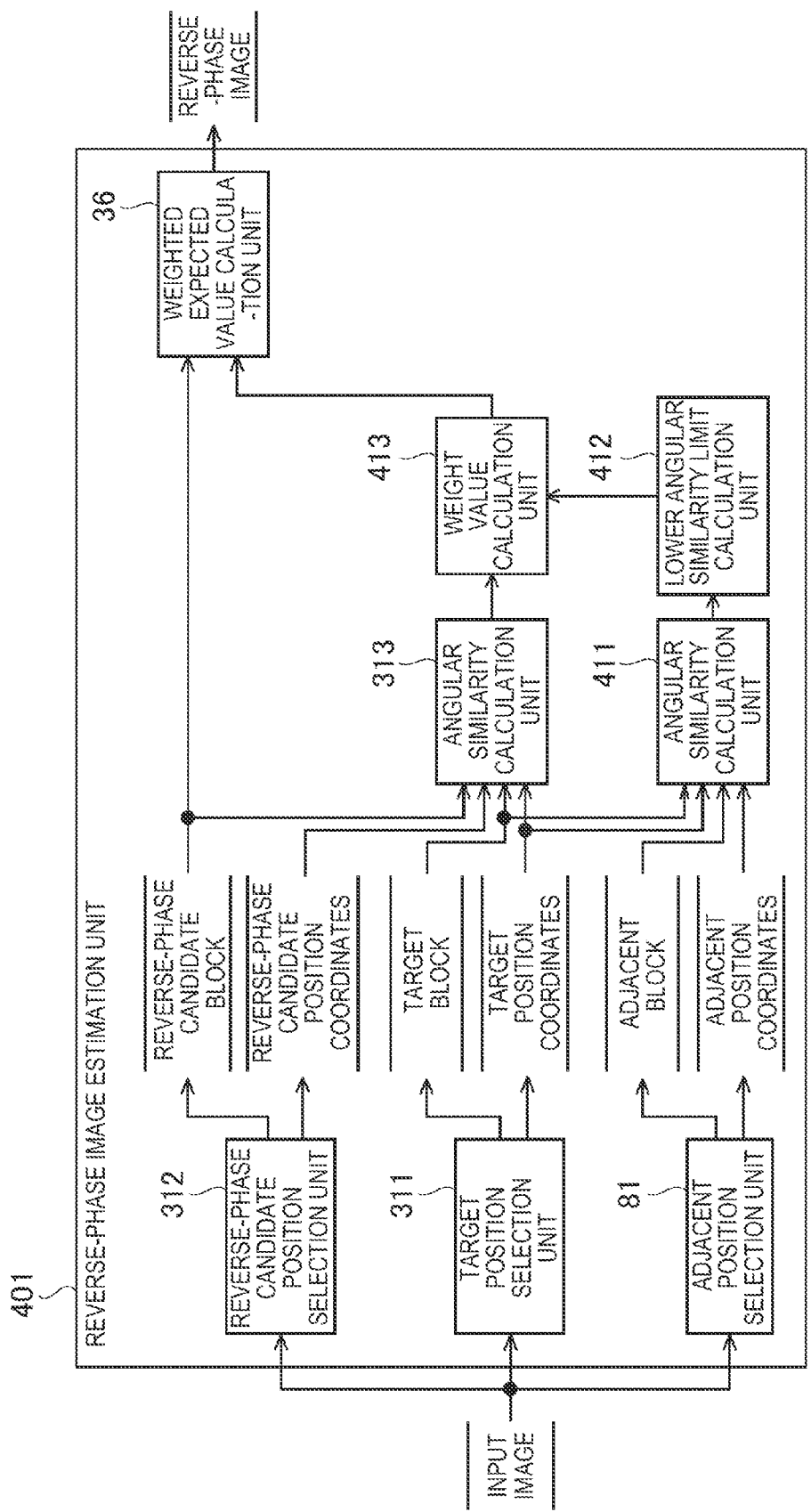
FIG. 35 is a block diagram illustrating a main configuration example of a reverse-phase image estimation unit.

In this case, the image processing apparatus 300 of FIG. 21 has a reverse-phase image estimation unit 401, for example, as illustrated in FIG. 35, in place of the reverse-phase image estimation unit 301. FIG. 35 is a block diagram illustrating a main configuration example of the reverse-phase image estimation unit in the above-described case.

As illustrated in FIG. 35, the reverse-phase image estimation unit 401 includes a target position selection unit 311, a reverse-phase candidate position selection unit 312, an adjacent position selection unit 81, angular similarity calculation units 313 and 411, a lower angular similarity limit calculation unit 412, a weight value calculation unit 413, and a weighted expected value calculation unit 36.

The adjacent position selection unit 81 selects four pixel positions adjacent to the top, bottom, left, and right of a target position serving as an object to be processed as adjacent positions on an input image. The adjacent position selection unit 81 supplies the angular similarity calculation unit 411 with coordinates (adjacent position coordinates) of a pixel in each selected adjacent position and a region having the same size as a target block of which the center is a pixel in each adjacent position as an adjacent block. Hereinafter, the pixel in the adjacent position on the input image is also referred to as an adjacent pixel.

The angular similarity calculation unit 411 has the same configuration as the angular similarity calculation unit 313, and is a processing unit that performs the same process as in the angular similarity calculation unit 313. However, the angular similarity calculation unit 411 calculates a degree of angular similarity using adjacent position coordinates and an adjacent block supplied from the adjacent position selection unit 81 in place of reverse-phase candidate position coordinates and a reverse-phase candidate block supplied from the reverse-phase candidate position selection unit 312. That is, the angular similarity calculation unit 411 calculates a degree of angular similarity between the target block and the adjacent block with respect to each adjacent block. In addition, the angular similarity calculation unit 411 supplies each calculated angular similarity degree to the lower angular similarity limit calculation unit 412, not the weight value calculation unit 314.

The lower angular similarity limit calculation unit 412 calculates one lower limit of the angular similarity degree based on four angular similarity degrees supplied from the angular similarity calculation unit 411, and supplies the calculated lower limit to the weight value calculation unit 413. The weight value calculation unit 413 calculates a weight value based on the angular similarity degree from the angular similarity calculation unit 313 and the lower limit from the lower angular similarity limit calculation unit 412, and supplies the calculated weight value to the weighted expected value calculation unit 36.

The weight value calculation unit 413 calculates a weight value based on the angular similarity degree supplied from the angular similarity calculation unit 311 and the lower limit supplied from the lower angular similarity limit calculation unit 412, and supplies the calculated weight value to the weighted expected value calculation unit 36.

[Flow of Reverse-Phase Image Estimation Process]

In this case, the process of reducing jaggies is also executed as in the seventh embodiment described with reference to the flowchart of FIG. 24. However, the reverse-phase image estimation unit 401 (FIG. 35) executes the reverse-phase image estimation of step S301.

Figure 36:
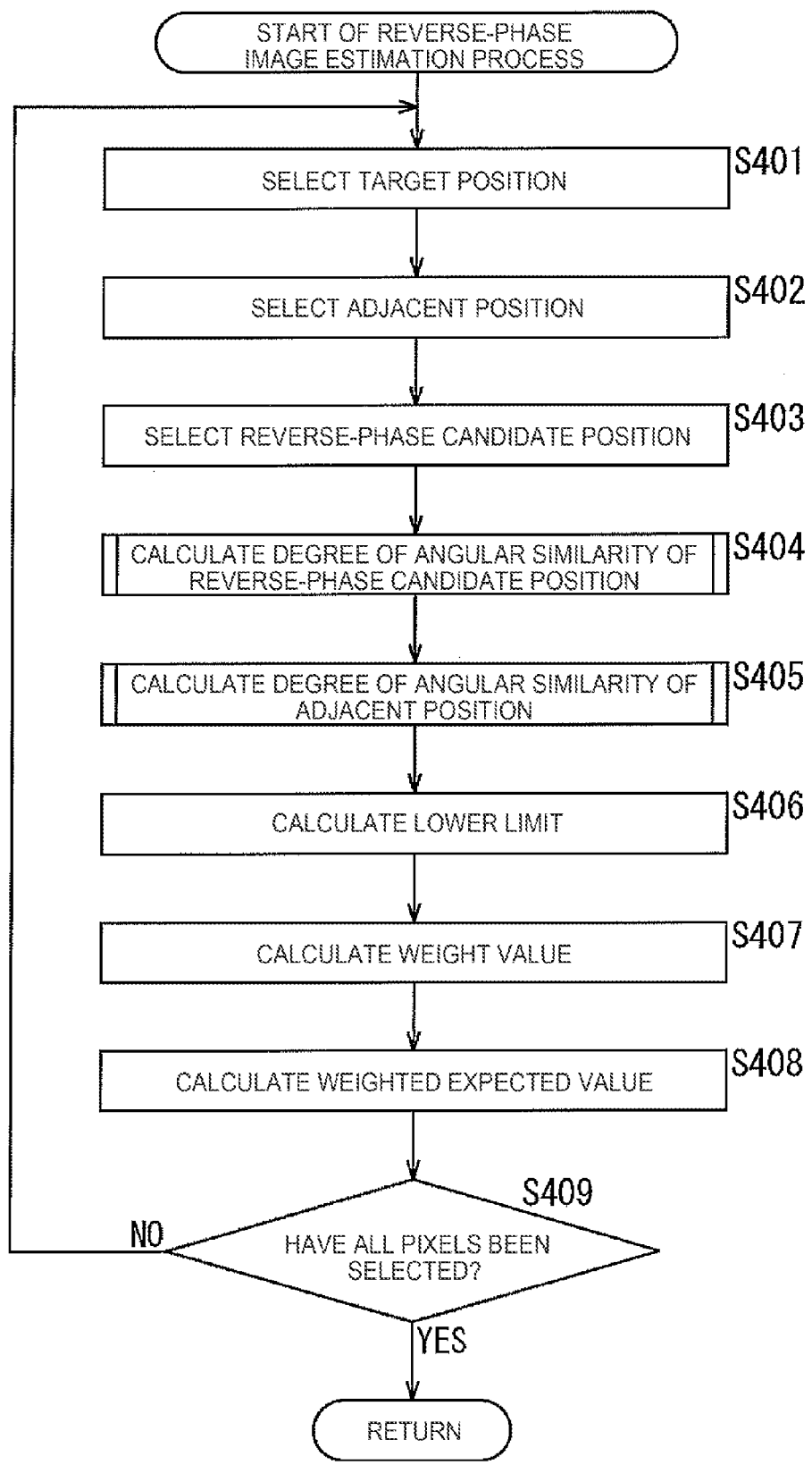
FIG. 36 is a flowchart illustrating a reverse-phase image estimation process to be executed by a reverse-phase image estimation unit 401.

The reverse-phase image estimation process to be executed by the reverse-phase image estimation unit 401 in step S301 of FIG. 24 will be described with reference to the flowchart of FIG. 36.

If the reverse-phase image estimation process is started, the target position selection unit 311 selects one pixel position on the input image as a target position in step S401 as in step S321.

In step S402, the adjacent position selection unit 81 selects positions of four adjacent pixels adjacent to the top, bottom, left, and right of the target position of the input image as adjacent positions as in the second embodiment (step S43).

Although each adjacent block selected as described above is similar to an image of a region of a target block, the adjacent block is an image different from the target block and is an inappropriate region for selection as a reverse-phase candidate block for the target position. Thus, if a weighted expected value is calculated by designating this inappropriate region as the reverse-phase candidate block, an accurate reverse-phase image is not obtained and the quality of an output image is rather degraded.

The reverse-phase image estimation unit 401 obtains a lower limit of the angular similarity degree by calculating the angular similarity degree of each adjacent block. The reverse-phase image estimation unit 401 designates a reverse-phase candidate block of which a degree of angular similarity is less than or equal to the obtained lower limit as an inappropriate block, and the reverse-phase candidate pixel corresponding to the reverse-phase candidate block is substantially excluded from the calculation of a weighted expected value.

In step S403, the reverse-phase candidate position selection unit 312 selects a reverse-phase candidate position for a target position in the input image as in step S322.

In step S404, the angular similarity calculation unit 313 calculates an angular similarity degree of a reverse-phase candidate position, that is, an angular similarity degree between the target block and the reverse-phase candidate block. This process is the same as described with reference to the flowchart of FIG. 26.

In step S405, the angular similarity calculation unit 411 calculates an angular similarity degree of an adjacent position, that is, an angular similarity degree between the target block and the adjacent block. Also, this process is the same as described with reference to the flowchart of FIG. 26, except that an adjacent block and adjacent position coordinates are used in place of a reverse-phase candidate block and reverse-phase candidate position coordinates.

In step S406, the lower angular similarity limit calculation unit 412 calculates a lower angular similarity limit based on the angular similarity degree of each adjacent block supplied from the angular similarity calculation unit 411, and supplies the lower limit to the weight value calculation unit 413. For example, the lower limit is a largest value, a smallest value, or an expected value of four angular similarity degrees, or the like. If the calculation of the lower limit is basically intended to reflect angular similarity degrees of four adjacent blocks and is a calculation capable of obtaining a representative value from the angular similarity degrees, the lower limit may be calculated in any method.

In step S407, the weight value calculation unit 413 calculates a weight value for every angular similarity degree on the basis of the angular similarity degree of each reverse-phase candidate block supplied from the angular similarity calculation unit 313 and the lower limit from the lower angular similarity limit calculation unit 412, for example, as shown in Equation (4), and supplies the calculated weight value to the weighted expected value calculation unit 36.

That is, if the angular similarity degree is greater than the lower limit, a difference between the angular similarity degree and the lower limit becomes a weight value. If the angular similarity degree is less than or equal to the lower limit, a weight value becomes 0. In other words, the angular similarity degree is subjected to threshold processing according to the lower limit and the weight value is calculated.

If the weight value is calculated, then the process of steps S408 and S409 is executed as in the process of steps S325 and S326 of FIG. 25.

As described above, the reverse-phase image estimation unit 401 obtains angular similarity degrees of adjacent blocks of which the centers are adjacent pixels adjacent to the top, bottom, left, and right (horizontal and vertical directions) of the target position when a reverse-phase image is generated, and calculates a lower limit from the angular similarity degrees. The reverse-phase image estimation unit 401 designates a weight value of an inappropriate reverse-phase candidate pixel as 0 on the basis of the calculated lower limit, and does not substantially use the weight value of 0 in the calculation of a weighted expected value.

The image processing apparatus 300 can avoid a primarily completely different image from being selected as a correction signal by determining the lower limit of the angular similarity degree as described above. Thereby, the image processing apparatus 300 can prevent a negative effect such as the collapse of a fine-amplitude pattern of an input image in a process of reducing jaggies for the input image and obtain a higher-quality output image.

<Ninth Embodiment>
[Configuration Example of Image Processing Apparatus]

Both a method using an angular similarity degree described in the seventh embodiment and a method using a similarity degree described in the third embodiment may be used.

Figure 37:
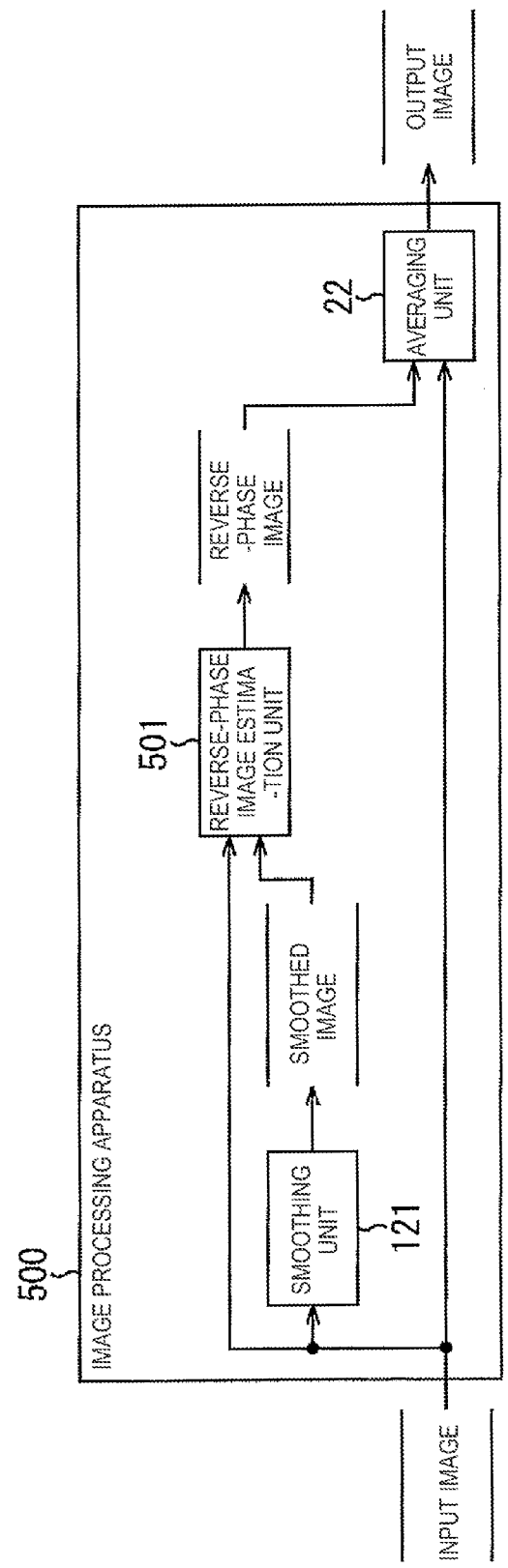
FIG. 37 is a block diagram illustrating another configuration example of the image processing apparatus.

FIG. 37 is a block diagram illustrating another configuration example of the image processing apparatus. The image processing apparatus 500 illustrated in FIG. 37 is basically the same as the image processing apparatus 300 described with reference to FIG. 21. The image processing apparatus 500 converts a supplied input image into an output image in which jaggies in the input image are reduced, and outputs the output image.

As illustrated in FIG. 37, the image processing apparatus 500 has a smoothing unit 121, a reverse-phase image estimation unit 501, and an averaging unit 22.

The smoothing unit 121 smooths the input image and supplies the smoothed image obtained as its result to the reverse-phase image estimation unit 501.

The reverse-phase image estimation unit 501 generates a reverse-phase image based on the smoothed image from the smoothing unit 121 and the input image, and supplies the reverse-phase image to the averaging unit 22.

[Reverse-Phase Image Estimation Unit]

Figure 38:
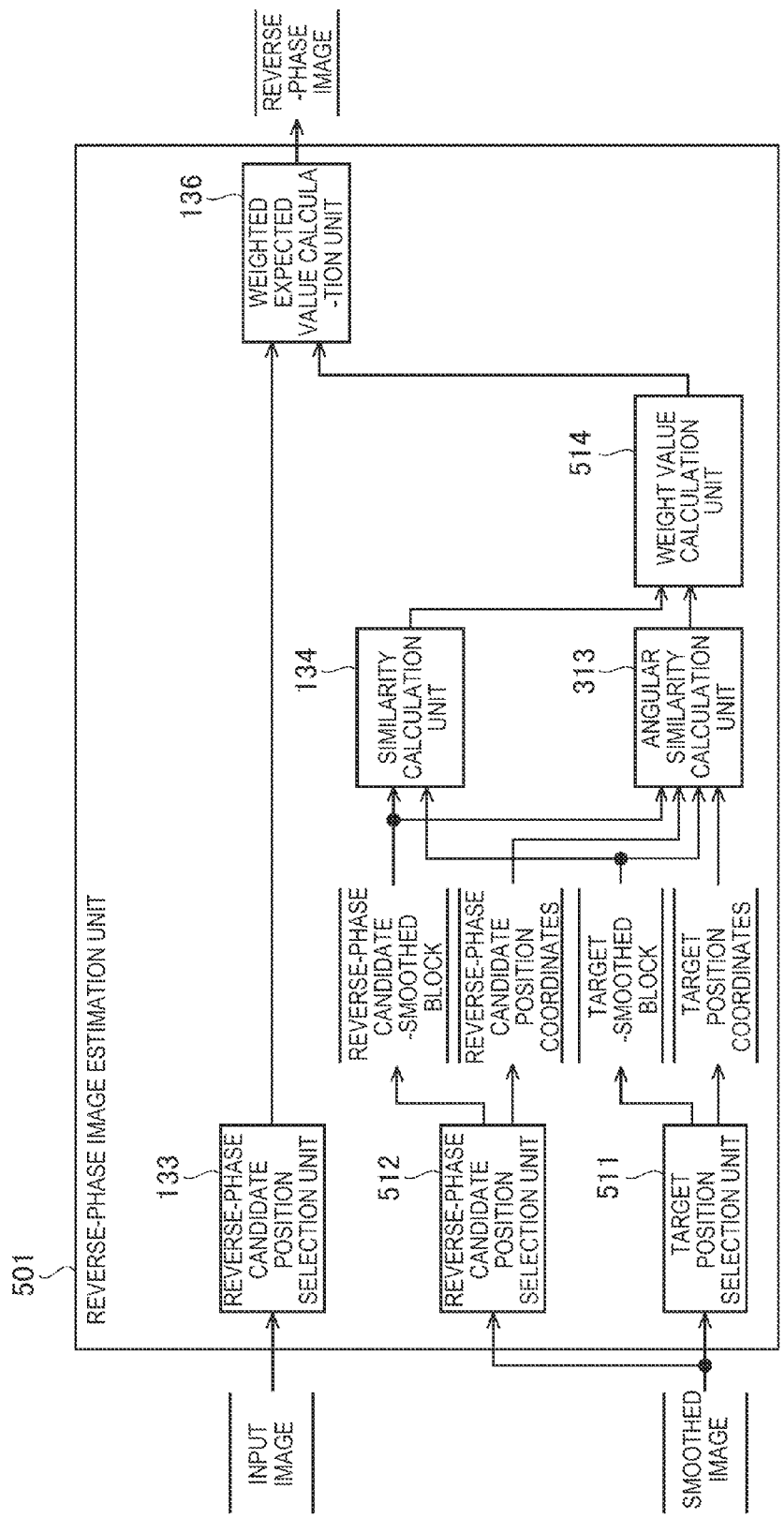
FIG. 38 is a block diagram illustrating a main configuration example of a reverse-phase image estimation unit 501.

FIG. 38 is a block diagram illustrating a main configuration example of the reverse-phase image estimation unit 501. As illustrated in FIG. 38, the reverse-phase image estimation unit 501 includes a target position selection unit 511, a reverse-phase candidate position selection unit 512, a reverse-phase candidate position selection unit 133, a similarity calculation unit 134, an angular similarity calculation unit 313, a weight value calculation unit 514, and a weighted expected value calculation unit 136.

The target position selection unit 511 sequentially selects pixel positions on the smoothed image supplied from the smoothing unit 121 as target positions. The target position selection unit 511 supplies the angular similarity calculation unit 313 with target position coordinates, which are coordinates of a selected target position, and a target-smoothed block, which is a predetermined region of which the center is the selected target position on the smoothed image. In addition, the target position selection unit 511 also supplies the target-smoothed block to the similarity calculation unit 134.

The reverse-phase candidate position selection unit 512 selects several positions having a predetermined positional relationship with a target position as reverse-phase candidate positions on the smoothed image supplied from the smoothing unit 121. The reverse-phase candidate position selection unit 512 supplies the angular similarity calculation unit 313 with reverse-phase candidate position coordinates, which are coordinates of a selected reverse-phase candidate position, and a reverse-phase candidate-smoothed block, which is a predetermined region of which the center is the selected reverse-phase candidate position on the smoothed image. In addition, the reverse-phase candidate position selection unit 512 also supplies the reverse-phase candidate-smoothed block to the similarity calculation unit 134. Here, the reverse-phase candidate-smoothed block has the same size as the target-smoothed block.

The reverse-phase candidate position selection unit 133 supplies the weighted expected value calculation unit 136 with a pixel in a reverse-phase candidate position selected by the reverse-phase candidate position selection unit 512 as a reverse-phase candidate pixel in the input image. Hereinafter, the reverse-phase candidate pixel on the smoothed image selected by the reverse-phase candidate position selection unit 512 is also appropriately referred to as a smoothed reverse-phase candidate pixel, and a reverse-phase candidate pixel on the input image selected by the reverse-phase candidate position selection unit 133 is also appropriately referred to as an input reverse-phase candidate pixel.

The similarity calculation unit 134 calculates a degree of similarity between the target-smoothed block supplied from the target position selection unit 511 and the reverse-phase candidate-smoothed block supplied from the reverse-phase candidate position selection unit 512 as described in the third embodiment, and supplies the calculated similarity degree to the weight value calculation unit 514.

The angular similarity calculation unit 313 calculates a degree of angular similarity between the target-smoothed block and the reverse-phase candidate-smoothed block using the target position coordinates and the target-smoothed block supplied from the target position selection unit 511 and the reverse-phase candidate position coordinates and the reverse-phase candidate-smoothed block supplied from the reverse-phase candidate position selection unit 512 as described in the seventh embodiment, and supplies the calculated angular similarity degree to the weight value calculation unit 514.

The weight value calculation unit 514 calculates a weight value based on the similarity degree supplied from the similarity calculation unit 134 and the angular similarity degree supplied from the angular similarity calculation unit 313, and supplies the calculated weight value to the weighted expected value calculation unit 136. An arbitrary weight value calculation method may be used. For example, the weight value calculation unit 514 may obtain one weight value using both the similarity degree and the angular similarity degree. In addition, for example, the weight value calculation unit 514 may obtain a weight value from the similarity degree in the same method as described in the third embodiment, further obtain a weight value from the angular similarity degree in the same method as described in the seventh embodiment, and obtain a product of these weight values or the like as a final weight value. Of course, a method other than these methods may be applied.

The weighted expected value calculation unit 136 generates a reverse-phase image by calculating a weighted expected value of a target position based on the reverse-phase candidate pixel supplied from the reverse-phase candidate position selection unit 133 and the weight value supplied from the weight value calculation unit 514.

[Flow of Process of Reducing Jaggies]

Next, the process of reducing jaggies by an image processing apparatus 500 will be described with reference to the flowchart of FIG. 39.

If the process of reducing jaggies is started, the smoothing unit 121 smooths the input image by performing a filtering operation or the like using a low frequency filter for a supplied input image, and obtains the smoothed image in step S501. Because smoothing the input image involves extracting a low-frequency component from the input image, the smoothed image can be an image of the low-frequency component of the input image.

In step S502, the reverse-phase image estimation unit 501 estimates a reverse-phase image using the input image and the smoothed image obtained in the process of step S501.

In step S503, the averaging unit 22 generates an output image using the reverse-phase image obtained in the process of step S502 as in the process (FIG. 24) of step S302.

If the output image is generated, the process of reducing jaggies is ended.

[Flow of Reverse-Phase Image Estimation Process]

Next, an example of the flow of the reverse-phase image estimation process to be executed in step S502 of FIG. 39 will be described with reference to the flowchart of FIG. 40.

If the reverse-phase image estimation process is started, the target position selection unit 511 selects one pixel position on the smoothed image as a target position in step S521 as in the target position selection unit 311. For example, each pixel position on the smoothed image is sequentially selected in raster order. The target position selection unit 511 obtains coordinates (target position coordinates) of the selected target position, and further extracts a target-smoothed block of which the center is the target position.

In step S522, the reverse-phase candidate position selection unit 133 selects a reverse-phase candidate position for the target position in the input image.

In step S523, the reverse-phase candidate position selection unit 512 selects a reverse-phase candidate position for the target position selected in step S521 on the smoothed image as in the reverse-phase candidate position selection unit 312. The reverse-phase candidate position selection unit 512 obtains coordinates (reverse-phase candidate position coordinates) of the selected reverse-phase candidate position, and further extracts a reverse-phase candidate-smoothed block of which the center is the reverse-phase candidate position.

In step S524, the angular similarity calculation unit 313 calculates a degree of angular similarity between the target-smoothed block obtained in the process of step S521 and the reverse-phase candidate-smoothed block obtained in the process of step S523 as in step S323 (FIG. 25). This process is the same as described with reference to the flowchart of FIG. 26, except that the target-smoothed block is used in place of the target block and the reverse-phase candidate-smoothed block is used in place of the reverse-phase candidate block.

In step S525, the similarity calculation unit 134 calculates a degree of similarity between the target-smoothed block obtained in the process of step S521 and the reverse-phase candidate-smoothed block obtained in the process of step S523.

In step S526, the weight value calculation unit 514 calculates a weight value using the angular similarity degree obtained in the process of step S524 and the similarity degree obtained in the process of step S525.

In step S527, the weighted expected value calculation unit 136 calculates a weighted expected value for the target position on the basis of the reverse-phase candidate block obtained in the process of step S522 and the weight value obtained in the process of step S526.

That is, the weighted expected value calculation unit 136 calculates a weighted expected value by multiplying weight values of reverse-phase candidate pixels selected for one target pixel by pixel values of the reverse-phase candidate block and normalizing a sum of the pixel values multiplied by the weight values. The weighted expected value calculated as described above becomes a pixel value of a pixel of a reverse-phase image having the same position as the target pixel.

In step S528, the target position selection unit 511 determines whether or not all pixels on the input image have been selected as target pixels. If unprocessed pixels are determined to be present, the target position selection unit 511 returns the process to step S521 and iterates a process subsequent thereto. That is, the next pixel on the smoothed image is selected as a target pixel in a target position, and a pixel value of a pixel of a reverse-phase image having the same position as the target pixel is obtained.

Figure 39:
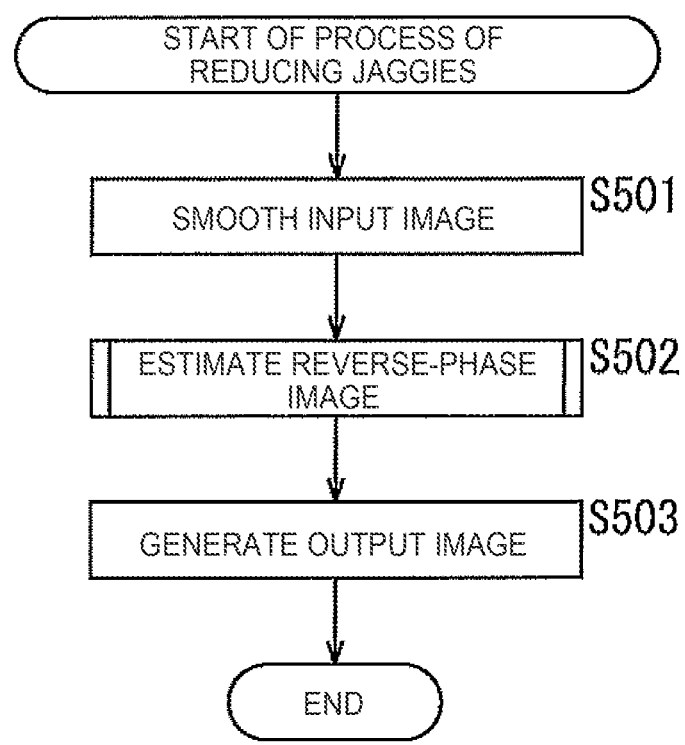
FIG. 39 is a flowchart illustrating an example of a flow of a process of reducing jaggies.
Figure 40:
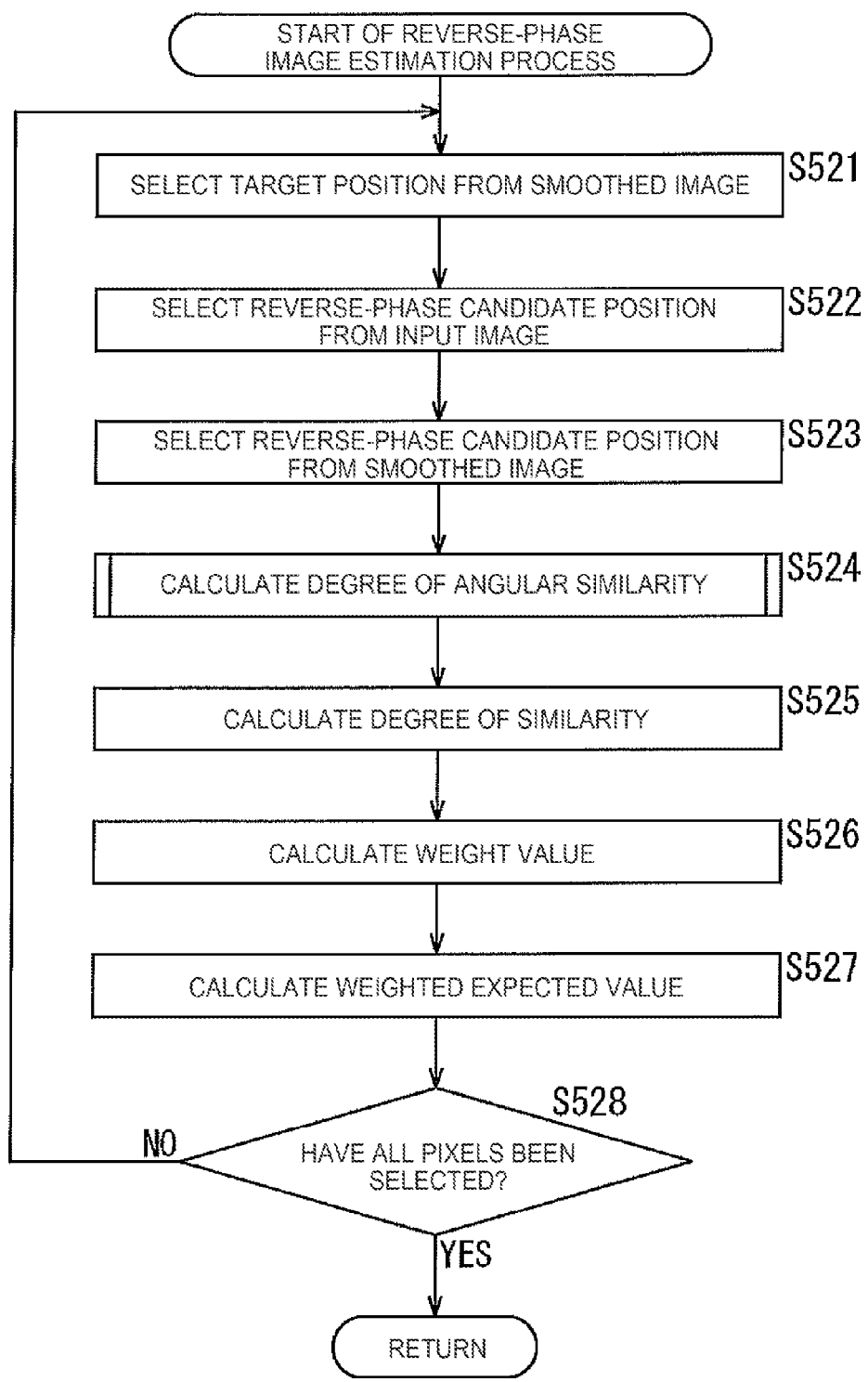
FIG. 40 is a flowchart illustrating an example of a flow of a reverse-phase image estimation process.

On the other hand, if all the pixels are determined to have been selected in step S528, the target position selection unit 511 ends the reverse-phase image estimation process, and returns the process to FIG. 39.

As described above, the image processing apparatus 500 obtains a degree of similarity and a degree of angular similarity between a target-smoothed block and a reverse-phase candidate-smoothed block on a smoothed image, and calculates a weighted expected value using a weight value obtained from the similarity degree and the angular similarity degree.

For example, because a provisional jaggies image becomes an edge image of the same direction as that of an edge having high contrast in the method described in the seventh embodiment in a combination of a dark flat target block and a reverse-phase candidate block of an edge having very high contrast, the image processing apparatus 300 is likely to erroneously make a determination of the angular similarity degree. As described above, it is possible to solve this problem by a combination with a similarity degree (to be compared in a low-frequency signal because it is a difference after smoothing).

In other words, a wrong reverse-phase candidate is erroneously determined to be similar in a similarity determination by a reverse-phase candidate-smoothed block of which smoothing is strong. On the other hand, if the smoothing is weak, there is a problem in that jaggies remain and a correct candidate is also determined not to be similar. It is possible to solve this problem by a combination with a degree of angular similarity.

In addition, the image processing apparatus 500 can robustly operate even in a large-noise image by combining an angular similarity calculation with smoothing.

That is, the image processing apparatus 500 can more reliably obtain an appropriate reverse-phase image. Therefore, the image processing apparatus 500 can more reliably convert a supplied input image into an output image in which jaggies in the input image are reduced, and output the output image.

<Tenth Embodiment>
[Reverse-Phase Image Estimation Unit]

In addition, a reverse-phase image may be generated using a degree of similarity calculated between reverse-phase candidate positions.

In this case, a configuration of the image processing apparatus is the same as described with reference to FIG. 21. However, the image processing apparatus 300 has a reverse-phase image estimation unit 601 of FIG. 41 in place of the reverse-phase image estimation unit 301.

Figure 41:
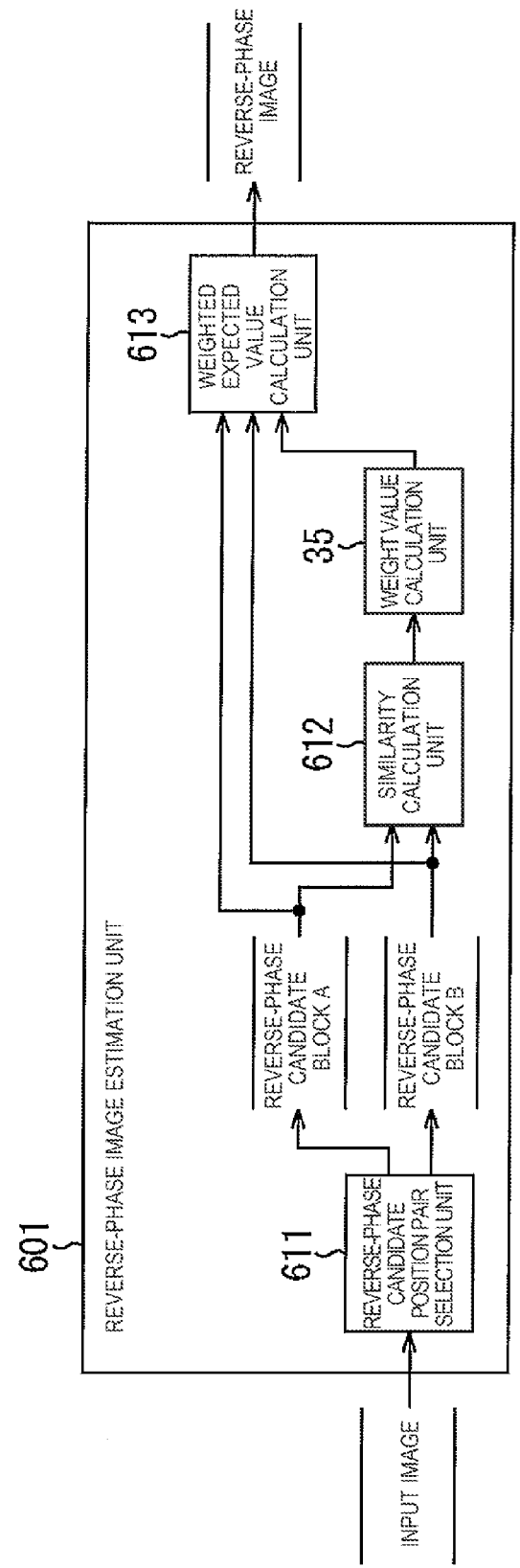
FIG. 41 is a block diagram illustrating still another configuration example of the reverse-phase image estimation unit.

FIG. 41 is a block diagram illustrating still another configuration example of the reverse-phase image estimation unit. The reverse-phase image estimation unit 601 illustrated in FIG. 41 is the same processing unit as the reverse-phase image estimation unit 301. The reverse-phase image estimation unit 601 generates a reverse-phase image by reversing only a phase of a component of jaggies in an input image based on a supplied input image and supplies the reverse-phase image to the averaging unit 22.

As illustrated in FIG. 41, the reverse-phase image estimation unit 601 has a reverse-phase candidate position pair selection unit 611, a similarity calculation unit 612, a weight value calculation unit 35, and a weighted expected value calculation unit 613.

The reverse-phase candidate position pair selection unit 611 sequentially selects a pixel position on the input image as a target position and selects a reverse-phase candidate position on a horizontal or vertical line separated by one line from a horizontal or vertical line to which the selected target position belongs. In this case, the reverse-phase candidate position pair selection unit 611 selects two reverse-phase candidate positions present in positions point-symmetrical with each other on the basis of the target position as a pair or set of reverse-phase candidate positions. Hereinafter, for convenience of description, one reverse-phase candidate position of the reverse-phase candidate position pair is referred to as a reverse-phase candidate position a and the other is referred to as a reverse-phase candidate position b.

The reverse-phase candidate position pair selection unit 611 extracts a reverse-phase candidate block, which is a predetermined region of which the center is a reverse-phase candidate position with respect to each of the selected reverse-phase candidate position pair. That is, the reverse-phase candidate position pair selection unit 611 extracts a reverse-phase candidate block a of which the center is the reverse-phase candidate position a and a reverse-phase candidate block b of which the center is the reverse-phase candidate position b. The reverse-phase candidate position pair selection unit 611 supplies the extracted reverse-phase candidate blocks a and b to the similarity calculation unit 612 and the weighted expected value calculation unit 613.

The similarity calculation unit 612 calculates a degree of similarity between the reverse-phase candidate blocks a and b in the same method in which the similarity calculation unit 34 (FIG. 1) calculates a degree of similarity between a target block and a normal-phase candidate block. The similarity calculation unit 612 supplies the calculated similarity degree to the weight value calculation unit 35.

The weight value calculation unit 35 calculates a weight value based on the similarity degree supplied from the similarity calculation unit 612, and supplies the calculated weight value to the weighted expected value calculation unit 613.

The weighted expected value calculation unit 613 generates a reverse-phase image by calculating a weighted expected value for a target position on the basis of the reverse-phase candidate blocks a and b supplied from the reverse-phase candidate position pair selection unit 611 and the weight value supplied from the weight value calculation unit 35, and supplies the generated reverse-phase image to the averaging unit 22.

[Flow of Reverse-Phase Image Estimation Process]

In this case, the process of reducing jaggies is also executed as in the seventh embodiment described with reference to the flowchart of FIG. 24. However, the reverse-phase image estimation unit 601 (FIG. 41) executes the reverse-phase image estimation of step S301.

Figure 42:
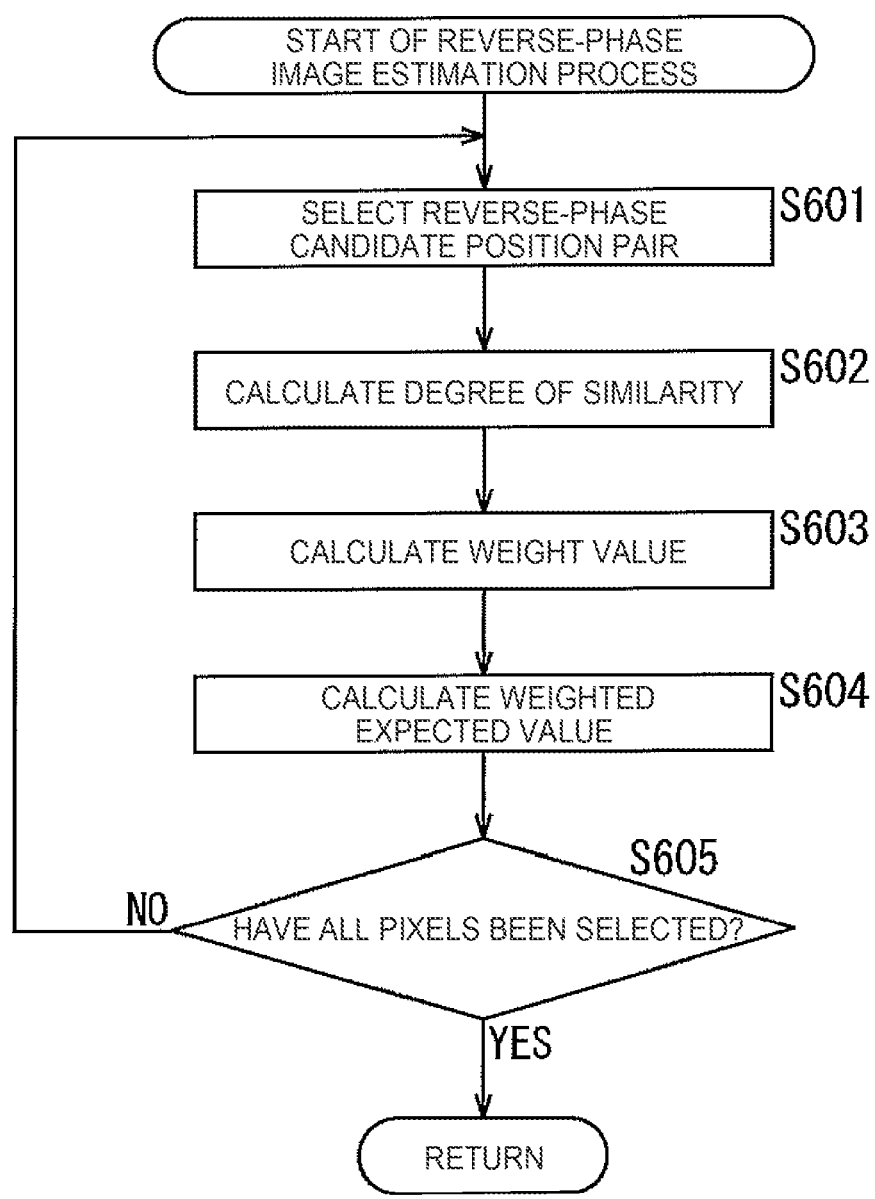
FIG. 42 is a flowchart illustrating the reverse-phase image estimation process.

The reverse-phase image estimation process to be executed by the reverse-phase image estimation unit 601 in step S301 of FIG. 24 will be described with reference to the flowchart of FIG. 42.

If the reverse-phase image estimation process is started, the reverse-phase candidate position pair selection unit 611 selects one pixel position on the input image as a target position, and further selects two reverse-phase candidate positions, which are positioned on horizontal or vertical lines separated by one line from a horizontal or vertical line to which the selected target position belongs and present in positions point-symmetrical with each other on the basis of the target position, as a pair or set of reverse-phase candidate positions in step S601 as in step S321.

Figure 43:
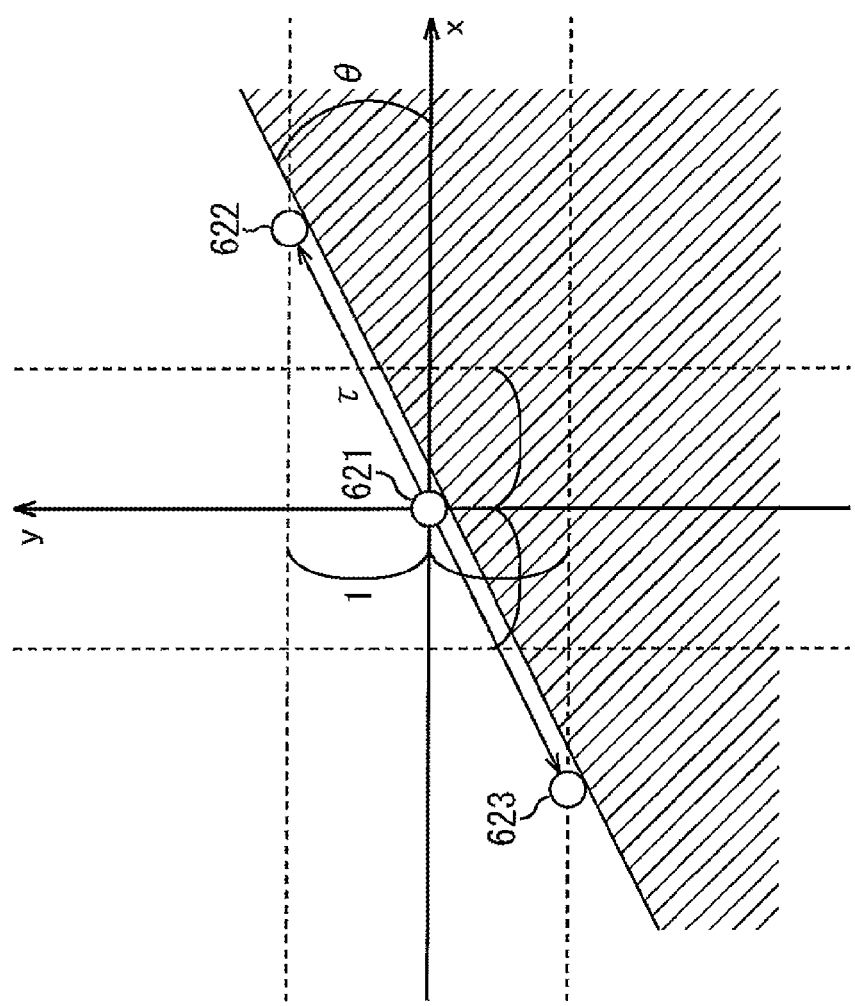
FIG. 43 is a diagram illustrating an example of the appearance of selection of a reverse-phase candidate position pair.

FIG. 43 is a diagram illustrating an example of the appearance of selection of the reverse-phase candidate position pair. If the reverse-phase candidate position pair selection unit 611 selects a pixel 621 as a target position in FIG. 43, for example, a pixel 622 positioned on a horizontal line separated by one line from a horizontal line to which the target position belongs is selected as a reverse-phase candidate position a. Further, the reverse-phase candidate position pair selection unit 611 selects a pixel 623 present in a position point-symmetrical with the pixel 622 on the basis of the pixel 621 as the reverse-phase candidate position b. That is, in this case, the pixels 622 and 623 are the reverse-phase candidate position pair.

The reverse-phase candidate position pair selection unit 611 extracts the reverse-phase candidate blocks a and b of the reverse-phase candidate position pair selected as described above.

In step S602, the similarity calculation unit 612 calculates a degree of similarity between the reverse-phase candidate blocks a and b obtained in the process of step S601.

In step S603, the weight value calculation unit 35 calculates a weight value using the similarity degree calculated in step S602.

In step S604, the weighted expected value calculation unit 613 calculates a weighted expected value for a target position on the basis of the reverse-phase candidate blocks a and b obtained in the process of step S601 and the weight value obtained in the process of step S603. That is, the weighted expected value calculation unit 613 multiplies weight values of reverse-phase candidate pixels selected for one target pixel by pixel values of the reverse-phase candidate block and normalizes a sum of the pixel values multiplied by the weight values, thereby calculating the weighted expected value. The weighted expected value calculated as described above becomes a pixel value of a pixel of a reverse-phase image having the same position as the target pixel.

In step S605, the reverse-phase candidate position pair selection unit 611 determines whether or not reverse-phase candidate position pairs have been selected by designating all pixels on the input image as target pixels. If unprocessed pixels are determined to be present, the reverse-phase candidate position pair selection unit 611 returns the process to step S601, and iterates a process subsequent thereto. That is, the reverse-phase candidate position pair is selected using the next pixel on the input image as the target pixel in the target position, and a weighted expected value is calculated using the reverse-phase candidate position pair.

On the other hand, if all the pixels are determined to have been processed in step S605, the reverse-phase candidate position pair selection unit 611 ends the reverse-phase image estimation process and returns the process to FIG. 24.

Thereby, the reverse-phase image estimation unit 601 can obtain a degree of similarity between reverse-phase candidate blocks of the reverse-phase image position pair present in positions point-symmetrical with each other on the basis of the target position. Therefore, like the reverse-phase image estimation unit 122 described in the second embodiment, the reverse-phase image estimation unit 601 can calculate a weight value from the similarity degree, further calculate a weighted expected value, and generate a reverse-phase image.

However, because the reverse-phase image estimation unit 601 compares reverse-phase candidate blocks having a phase of jaggies and calculates a degree of similarity between the reverse-phase candidate blocks, it is not necessary to prevent the influence of jaggies by smoothing. Accordingly, because it is not necessary to design a smoothing unit, the image processing apparatus 300 to which the reverse-phase image estimation unit 602 is applied can more easily obtain an output image.

<Eleventh Embodiment>
[Reverse-Phase Image Estimation Unit]

The method described in the tenth embodiment may be used along with a method of obtaining a lower limit of a degree of similarity and performing threshold processing according to the lower limit when a weight value is calculated as described in the second embodiment.

Figure 44:
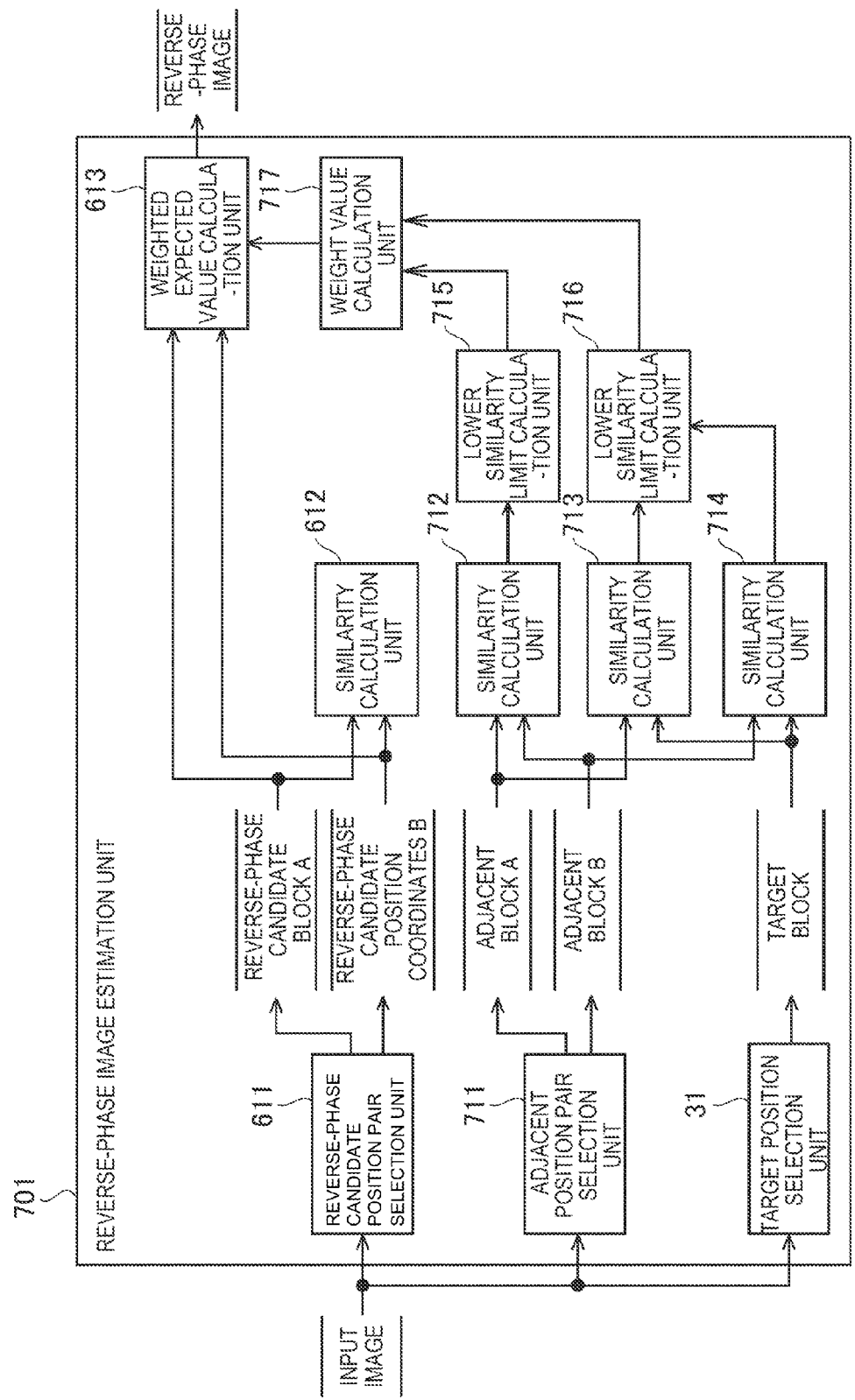
FIG. 44 is a block diagram illustrating a main configuration example of a reverse-phase image estimation unit.

In this case, the image processing apparatus 300 of FIG. 21 has a reverse-phase image estimation unit 701, for example as illustrated in FIG. 44, in place of the reverse-phase image estimation unit 301. FIG. 44 is a block diagram illustrating a main configuration example of the reverse-phase image estimation unit in the above-described case.

As illustrated in FIG. 44, the reverse-phase image estimation unit 701 has a target position selection unit 31, a reverse-phase candidate position pair selection unit 611, a similarity calculation unit 612, an adjacent position pair selection unit 711, similarity calculation units 712, 713, and 714, lower similarity limit calculation units 715 and 716, and a weight value calculation unit 717.

The target position selection unit 31 sequentially selects a pixel position on the input image as a target position. The target position selection unit 31 extracts a target block of which the center is the selected target position, and supplies the extracted target block to the similarity calculation units 713 and 714.

The reverse-phase candidate position pair selection unit 611 selects a pair of reverse-phase candidate positions, which have a predetermined positional relationship with the target position and are present in positions point-symmetrical with each other on the basis of the target position, in the input image. The reverse-phase candidate position pair selection unit 611 extracts reverse-phase candidate blocks a and b of which the centers are the selected reverse-phase candidate position pair from the input image, and supplies the extracted reverse-phase candidate blocks a and b to the similarity calculation unit 612 and the weighted expected value calculation unit 613.

The similarity calculation unit 612 calculates a degree of similarity between the reverse-phase candidate blocks a and b supplied from the reverse-phase candidate position pair selection unit 611, and supplies the similarity degree to the weight value calculation unit 717.

The weighted expected value calculation unit 613 generates a reverse-phase image by calculating a weighted expected value for the target position on the basis of the reverse-phase candidate blocks a and b supplied from the reverse-phase candidate position pair selection unit 611 and the weight value supplied from the weight value calculation unit 35, and supplies the generated reverse-phase image to the averaging unit 22.

The adjacent position pair selection unit 711 selects a pair of pixel positions adjacent to the top and bottom of the target position or a pair of pixel positions adjacent to the left and right of the target position as a pair of adjacent positions from among four pixel positions adjacent to the top, bottom, left, and right of the target position serving as a target to be processed in the input image. The adjacent position pair selection unit 711 extracts adjacent blocks a and b of which the centers are the selected adjacent position pair from the input image. The adjacent blocks a and b have the same size as the target block extracted by the target position selection unit 31.

The adjacent position pair selection unit 711 supplies the adjacent block a to the similarity calculation units 712 and 713, and the adjacent position pair selection unit 711 supplies the adjacent block b to the similarity calculation units 712 and 714.

The similarity calculation unit 712 calculates a degree of similarity between the adjacent blocks a and b supplied from the adjacent position pair selection unit 711, and supplies the calculated similarity degree to the lower similarity limit calculation unit 715.

The similarity calculation unit 713 calculates a degree of similarity between the adjacent block a supplied from the adjacent position pair selection unit 711 and the target block supplied from the target position selection unit 31 and supplies the calculated similarity degree to the lower similarity limit calculation unit 716.

The similarity calculation unit 714 calculates a degree of similarity between the adjacent block b supplied from the adjacent position pair selection unit 711 and the target block supplied from the target position selection unit 31 and supplies the calculated similarity degree to the lower similarity limit calculation unit 716.

The lower similarity limit calculation unit 715 calculates one lower limit of the similarity degree based on the two similarity degrees supplied from the similarity calculation unit 712 (the similarity degree of the adjacent position pair adjacent to the top and bottom of the target pixel and the similarity degree of the adjacent position pair adjacent to the left and right of the target pixel), and supplies the calculated lower limit to the weight value calculation unit 717.

The lower similarity limit calculation unit 716 calculates one lower limit of the similarity degree based on the two similarity degrees supplied from the similarity calculation unit 713 (the similarity degree between the adjacent block a of the pair of adjacent positions adjacent to the top and bottom of the target pixel and the target block and the similarity degree between the adjacent block a of the pair of adjacent positions adjacent to the left and right of the target pixel and the target block) and the two similarity degrees supplied from the similarity calculation unit 714 (the similarity degree between the adjacent block b of the pair of adjacent positions adjacent to the top and bottom of the target pixel and the target block and the similarity degree between the adjacent block b of the pair of adjacent positions adjacent to the left and right of the target pixel and the target block), and supplies the calculated lower limit to the weight value calculation unit 717.

The weight value calculation unit 717 calculates a weight value based on the similarity degree supplied from the similarity calculation unit 612, the lower limit supplied from the lower similarity limit calculation unit 715, and the lower limit supplied from the lower similarity limit calculation unit 716, and supplies the calculated weight value to the weighted expected value calculation unit 613.

[Flow of Reverse-Phase Image Estimation Process]

In this case, the process of reducing jaggies is executed as in the seventh embodiment described with reference to the flowchart of FIG. 24. However, the reverse-phase image estimation unit 701 (FIG. 44) executes the reverse-phase image estimation of step S301.

Figure 45:
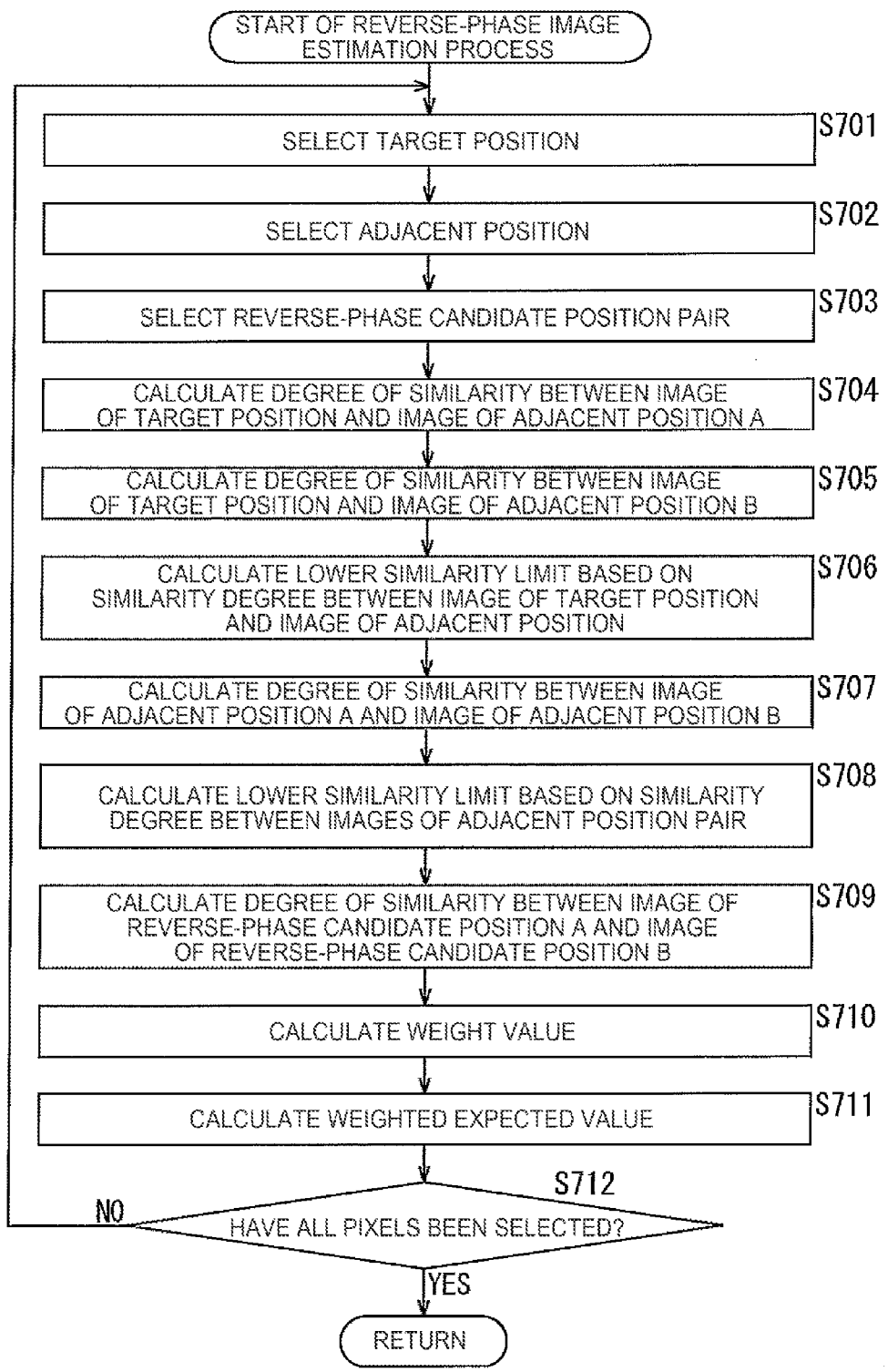
FIG. 45 is a flowchart illustrating the reverse-phase image estimation process.

The reverse-phase image estimation process to be executed by the reverse-phase image estimation unit 701 in step S301 of FIG. 24 will be described with reference to the flowchart of FIG. 45.

If the reverse-phase image estimation unit is started, the target position selection unit 31 selects one pixel position on an input image as a target position in step S701 as in step S321.

In step S702, the adjacent position pair selection unit 711 selects a pair of pixel positions adjacent to the top and bottom or a pair of pixel positions adjacent to the left and right of the target position on the input image as a pair of adjacent positions from among positions of four adjacent pixels adjacent to the top, bottom, left, and right.

Figure 46:
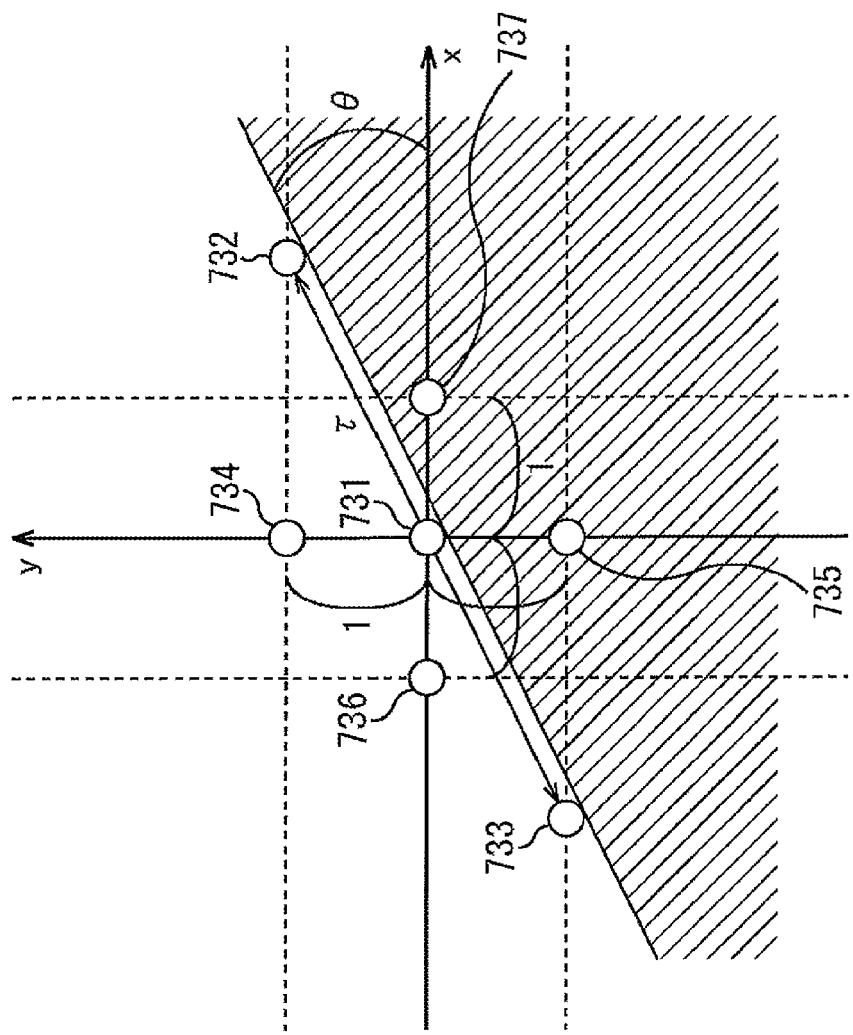
FIG. 46 is a diagram illustrating an example of the appearance of selection of an adjacent position pair.

FIG. 46 is a diagram illustrating an example of the appearance of selection of a pair of adjacent positions. In the example of FIG. 46, a pixel 731 is selected as a target position, and pixels 732 and 733 are selected as a pair of reverse-phase candidate positions. The adjacent position pair selection unit 711 selects pixels 734 and 735 adjacent to the top and bottom of the target position as a pair of adjacent positions. In addition, the adjacent position pair selection unit 711 selects pixels 736 and 737 adjacent to the left and right of the target position as a pair of adjacent positions.

In step S703, the reverse-phase candidate position pair selection unit 611 selects a pair of reverse-phase candidate positions. In the example of FIG. 46, the pixels 732 and 733 present in positions point-symmetrical with each other on the basis of the target position are selected as a pair of reverse-phase candidate positions.

In step S704, the similarity calculation unit 713 calculates a degree of similarity between an image (a target block) of a target position and an image (an adjacent block a) of an adjacent position a.

In step S705, the similarity calculation unit 714 calculates a degree of similarity between an image (a target block) of a target position and an image (an adjacent block b) of an adjacent position b.

In step S706, the lower similarity limit calculation unit 716 calculates a lower similarity limit based on the similarity degree between the target block and the adjacent block a calculated in step S704 and the similarity degree between the target block and the adjacent block b calculated in step S705.

In step S707, the similarity calculation unit 712 calculates a degree of similarity between the adjacent blocks a and b calculated in step S702.

In step S708, the lower similarity limit calculation unit 715 calculates a lower similarity limit based on the similarity degree between the images of the pair of adjacent positions (the similarity degree between the adjacent blocks a and b).

In step S709, the similarity calculation unit 612 calculates a degree of similarity between an image of a reverse-phase candidate position a and an image of a reverse-phase candidate position b (a degree of similarity between the reverse-phase candidate blocks a and b).

In step S710, the weight value calculation unit 717 calculates a weight value using the lower similarity limit calculated in step S706, the lower similarity limit calculated in step S708, and the similarity degree calculated in step S709.

In step S711, the weighted expected value calculation unit 613 generates a reverse-phase image by calculating a weighted expected value of the target position based on the reverse-phase candidate blocks a and b and the weight value.

In step S712, the target position selection unit 31 determines whether or not all pixels on the input image have been selected as target pixels. If unprocessed pixels are determined to be present, the target position selection unit 31 returns the process to step S701 and iterates a process subsequent thereto.

On the other hand, if all the pixels are determined to have been selected in step S712, the target position selection unit 31 ends the reverse-phase image estimation process and returns the process to FIG. 39.

As described above, the image processing apparatus 300 can use the method described in the tenth embodiment along with a method of obtaining a lower limit of a degree of similarity and performing threshold processing according to the lower limit when a weight value is calculated as described in the second embodiment. Thereby, the image processing apparatus 300 can more reliably obtain an appropriate reverse-phase image for more various images. Therefore, the image processing apparatus 300 can more reliably convert a supplied input image into an output image in which jaggies in an input image are reduced, and output the output image.

<Twelfth Embodiment>

[Configuration Example of Image Processing Apparatus]

Both the method described in the tenth embodiment and the method described in the third embodiment may be used. That is, a smoothed image may be used. In this case, the image processing apparatus 500 described with reference to FIG. 37 has a reverse-phase image estimation unit 801 in place of the reverse-phase image estimation unit 501.

[Reverse-Phase Image Estimation Unit]

Figure 47:
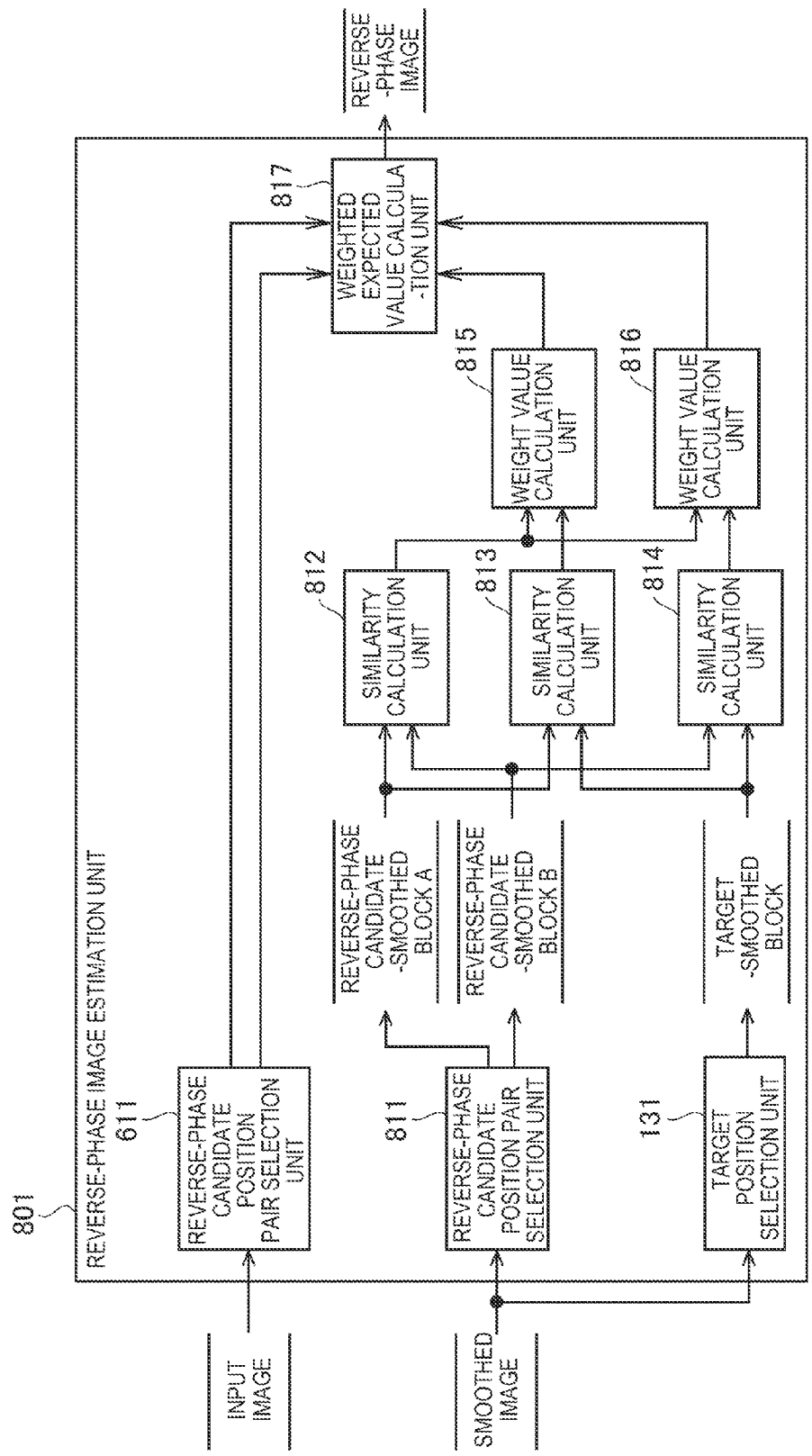
FIG. 47 is a block diagram illustrating a main configuration example of a reverse-phase image estimation unit 801.

FIG. 47 is a block diagram illustrating a main configuration example of the reverse-phase image estimation unit 801. As illustrated in FIG. 47, the reverse-phase image estimation unit 801 has a target position selection unit 131, reverse-phase candidate position pair selection units 611 and 811, similarity calculation units 812, 813, and 814, weight value calculation units 815 and 816, and a weighted expected value calculation unit 817.

The target position selection unit 131 selects a target position from a smoothed image, and extracts a target-smoothed block of which the center is the selected target position. The target position selection unit 131 supplies the extracted target-smoothed block to the similarity calculation units 813 and 814.

As in the tenth or eleventh embodiment, the reverse-phase candidate position pair selection unit 611 selects a pair of reverse-phase candidate positions corresponding to a target position from the input image. The reverse-phase candidate position pair selection unit 611 extracts the reverse-phase candidate blocks a and b of which the centers are the selected reverse-phase candidate position pair, and supplies the extracted reverse-phase candidate blocks a and b to the weighted expected value calculation unit 817.

In the same method as in the reverse-phase candidate position pair selection unit 611, the reverse-phase candidate position pair selection unit 811 selects a reverse-phase candidate position pair corresponding to the target position from the smoothed image. The reverse-phase candidate position pair selection unit 811 extracts the reverse-phase candidate-smoothed blocks a and b of which the centers are the selected reverse-phase candidate position pair from the smoothed image. The reverse-phase candidate position pair selection unit 811 supplies the reverse-phase candidate-smoothed block a to the similarity calculation units 812 and 813. In addition, the reverse-phase candidate position pair selection unit 811 supplies the reverse-phase candidate-smoothed block b to the similarity calculation units 812 and 814.

The similarity calculation unit 812 calculates a degree of similarity between the reverse-phase candidate-smoothed blocks a and b supplied from the reverse-phase candidate position pair selection unit 811. The similarity calculation unit 812 supplies the calculated similarity degree to the weight value calculation units 815 and 816.

The similarity calculation unit 813 calculates a degree of similarity between the reverse-phase candidate-smoothed block a supplied from the reverse-phase candidate position pair selection unit 811 and the target-smoothed block supplied from the target position selection unit 131. The similarity calculation unit 813 supplies the calculated similarity degree to the weight value calculation unit 815.

The similarity calculation unit 814 calculates a degree of similarity between the reverse-phase candidate-smoothed block b supplied from the reverse-phase candidate position pair selection unit 811 and the target-smoothed block supplied from the target position selection unit 131. The similarity calculation unit 814 supplies the calculated similarity degree to the weight value calculation unit 816.

The weight value calculation unit 815 calculates a weight value based on the similarity degree supplied from the similarity calculation unit 812 and the similarity degree supplied from the similarity calculation unit 813, and supplies the calculated weight value to the weighted expected value calculation unit 817. An arbitrary weight value calculation method may be used.

The weight value calculation unit 816 calculates a weight value based on the similarity degree supplied from the similarity calculation unit 812 and the similarity degree supplied from the similarity calculation unit 814, and supplies the calculated weight value to the weighted expected value calculation unit 817. An arbitrary weight value calculation method may be used.

The weighted expected value calculation unit 817 generates a reverse-phase image by calculating a weighted expected value of the target position based on the reverse-phase candidate blocks of the reverse-phase candidate position pair supplied from the reverse-phase candidate position pair selection unit 611 and the weight values supplied from the weight value calculation units 815 and 816.

[Flow of Reverse-Phase Image Estimation Process]

In this case, the process of reducing jaggies is also executed as in the ninth embodiment described with reference to the flowchart of FIG. 39. However, the reverse-phase image estimation unit 801 (FIG. 47) executes the reverse-phase image estimation of step S502.

Figure 48:
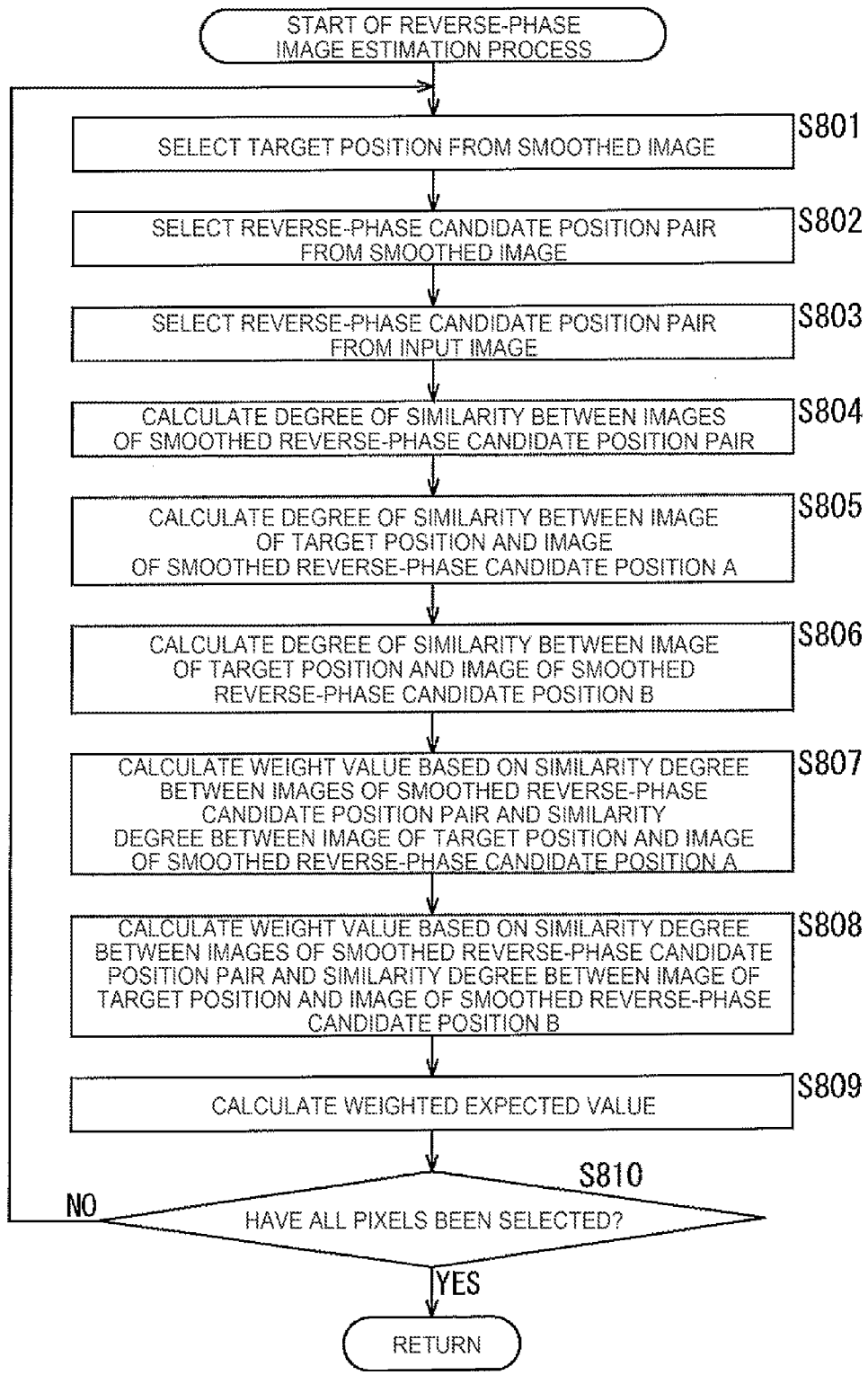
FIG. 48 is a flowchart illustrating the reverse-phase image estimation process.

The reverse-phase image estimation process to be executed by the reverse-phase image estimation unit 801 in step S502 of FIG. 39 will be described with reference to the flowchart of FIG. 48.

If the reverse-phase image estimation process is started, the target position selection unit 131 selects one pixel position on a smoothed image as a target position in step S801 as in the target position selection unit 311. For example, each pixel position on the smoothed image is sequentially selected in raster order. The target position selection unit 131 extracts a target-smoothed block of which the center is the selected target position.

In step S802, the reverse-phase candidate position pair selection unit 811 selects a reverse-phase candidate position pair for the target position selected in step S801 from the smoothed image as in the reverse-phase candidate position pair selection unit 611. The reverse-phase candidate position selection unit 802 extracts the reverse-phase candidate-smoothed blocks a and b of which the centers are the selected reverse-phase candidate position pair.

In step S803, the reverse-phase candidate position pair selection unit 611 extracts the reverse-phase candidate blocks a and b from the input image.

In step S804, the similarity calculation unit 812 calculates a degree of similarity between images of the smoothed reverse-phase candidate position pair (the reverse-phase candidate-smoothed blocks a and b).

In step S805, the similarity calculation unit 813 calculates a degree of similarity between the image of the target position (the target-smoothed block) and the image of the smoothed reverse-phase candidate position a (the reverse-phase candidate-smoothed block a).

In step S806, the similarity calculation unit 814 calculates a degree of similarity between the image of the target position (the target-smoothed block) and the image of the smoothed reverse-phase candidate position b (the reverse-phase candidate-smoothed block b).

In step S807, the weight value calculation unit 815 calculates a weight value based on the similarity degree between the images of the smoothed reverse-phase candidate position pair (the reverse-phase candidate-smoothed blocks a and b) calculated in step S804 and the similarity degree between the image of the target position (the target-smoothed block) and the image of the smoothed reverse-phase candidate position a (the reverse-phase candidate-smoothed block a) calculated in step S805.

In step S808, the weight value calculation unit 816 calculates a weight value based on the similarity degree between the images of the smoothed reverse-phase candidate position pair (the reverse-phase candidate-smoothed blocks a and b) calculated in step S804 and the similarity degree between the image of the target position (the target-smoothed block) and the image of the smoothed reverse-phase candidate position b (the reverse-phase candidate-smoothed block b) calculated in step S806.

In step S809, the weighted expected value calculation unit 817 calculates a weighted expected value using the images of the reverse-phase candidate position pair (the reverse-phase candidate blocks a and b) from the input image in step S803, the weight value obtained in step S807, and the weight value obtained in step S808. The weighted expected value calculated as described above becomes a pixel value of a pixel of a reverse-phase image having the same position as the target pixel.

In step S810, the target position selection unit 131 determines whether or not all pixels on the input image have been selected as target pixels. If unprocessed pixels are determined to be present, the target position selection unit 131 returns the process to step S801, and iterates a process subsequent thereto.

On the other hand, if all the pixels are determined to have been selected in step S810, the target position selection unit 810 ends the reverse-phase image estimation process and returns the process to FIG. 39.

For example, because a degree of similarity between reverse-phase candidates becomes large in graphics point-symmetrical with respect to a target position in the method described in the tenth embodiment, the image processing apparatus 300 is likely to erroneously make a determination of the similarity degree. As described above, it is possible to solve this problem by a combination with a degree of similarity between the target position and the reverse-phase candidate position in an image after smoothing (to be compared in a low-frequency signal because it is a difference after smoothing).

In other words, a wrong reverse-phase candidate is erroneously determined to be similar in a similarity determination by a reverse-phase candidate-smoothed block of which smoothing is strong. On the other hand, if the smoothing is weak, there is a problem in that jaggies remain and a correct candidate is also determined not to be similar. It is possible to solve this problem by a combination with a degree of similarity according to reverse-phase candidate position pairs.

The image processing apparatus 500 can robustly operate even in a large-noise image by combining a similarity calculation according to the reverse-phase candidate position pairs with smoothing.

That is, the image processing apparatus 500 can more reliably obtain an appropriate reverse-phase image. Therefore, the image processing apparatus 500 can more reliably convert a supplied input image into an output image in which jaggies in an input image are reduced, and output the output image.

The above-described series of processes can be executed by hardware or software. When the series of processes is executed by the software, a program constituting the software is installed from a program recording medium to a computer built in dedicated hardware, a general-purpose personal computer, for example, which can execute various functions by installing various programs, or the like.

Figure 49:
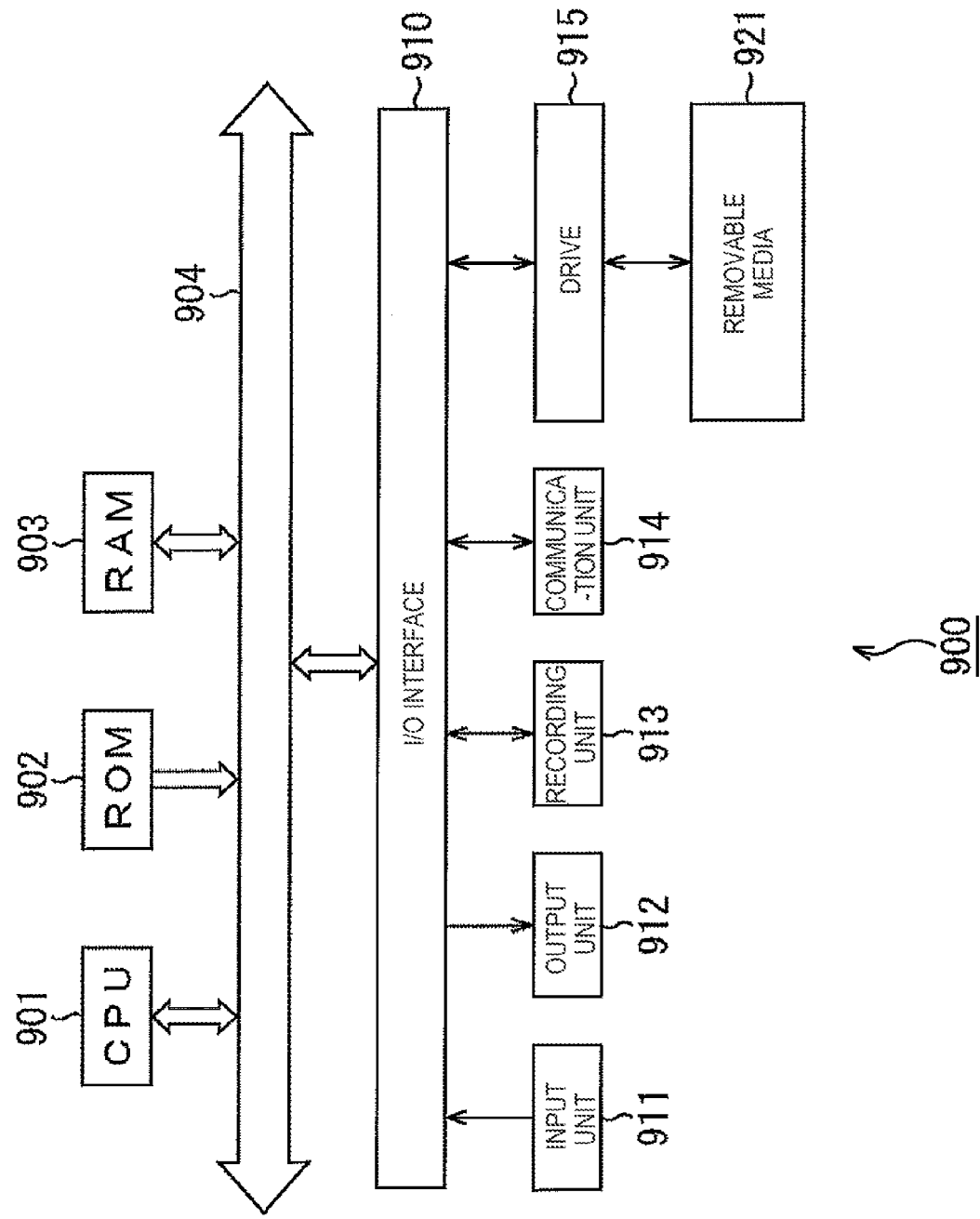
FIG. 49 is a diagram illustrating a configuration example of a computer.

FIG. 49 is a block diagram illustrating a configuration example of hardware of a computer that executes the above-described series of processes according to a program.

In the computer, a central processing unit (CPU) 901, a read only memory (ROM) 902, and a random access memory (RAM) 903 are connected to each other via a bus 904.

Further, an input/output (I/O) interface 910 is connected to the bus 904. An input unit 911 including a keyboard, a mouse, a microphone, or the like, an output unit 912 including a display, a speaker, or the like, a recording unit 913 including a hard disk, a nonvolatile memory, or the like, a communication unit 914 including a network interface or the like, and a drive 915, which drives removable media 921 such as a magnetic disk, an optical disc, a magneto-optical disc, and a semiconductor memory, are connected to the I/O interface 910.

In the computer constituted as described above, the CPU 901 loads, for example, a program recorded on the recording unit 913, to the RAM 903 via the I/O interface 910 and the bus 904 and executes the loaded program, so that the above-described series of processes is performed.

The program to be executed by the computer (CPU 901) is recorded on the removable media 921, which are package media including a magnetic disk (including a flexible disk), an optical disc (including a compact disc-read only memory (CD-ROM), a digital versatile disc (DVD), or the like), a magneto-optical disc, and a semiconductor memory. Alternatively, the program may be provided through a wired or wireless transmission medium such as a local area network, the Internet, or digital satellite broadcasting.

A program can be installed in the recording unit 913 via the I/O interface 910 by mounting the removable media 921 on the drive 915. In addition, the program can be received by the communication unit 914 via a wired or wireless transmission medium and installed in the recording unit 913. In addition, the program can be installed in advance on the ROM 902 or the recording unit 913.

The program to be executed by the computer may be a program of which processes are performed in time series in accordance with the order described in this specification, or a program of which processes are performed in parallel or at necessary timings such as when the processes are called or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a normal-phase candidate position selection unit configured to select a position different from a target position on an input image as a normal-phase candidate position, which is a candidate for a position at which jaggies are in the same phase as the target position;
   a reverse-phase candidate position selection unit configured to select a position different from the target position on the input image as a reverse-phase candidate position, which is a candidate for a position at which jaggies are in a reverse phase to the target position;
   a weight value calculation unit configured to calculate a weight value based on a first degree of similarity between an image of the target position and an image of the normal-phase candidate position; and
   a weighted expected value calculation unit configured to calculate a weighted expected value based on the weight value and a pixel of the reverse-phase candidate position.

2. The image processing apparatus according to claim 1, wherein the reverse-phase candidate position selection unit selects a center position of a line segment connecting the target position and the normal-phase candidate position as the reverse-phase candidate position.

3. The image processing apparatus according to claim 2, wherein the normal-phase candidate position selection unit selects a position on a horizontal line separated by two lines from a horizontal line including the target position or a position on a vertical line separated by two lines from a vertical line including the target position as the normal-phase candidate position.

4. The image processing apparatus according to claim 3, further comprising:
   an adjacent position selection unit for selecting positions adjacent to the top, bottom, left, and right of the target position as adjacent positions; and
   a lower limit calculation unit for calculating a lower limit of the first similarity degree based on second degrees of similarity between an image of the target position and images of the adjacent positions,
   wherein the weight value calculation unit calculates the weight value by performing threshold processing of the first similarity degree using the lower limit.

5. An image processing method for use in an image processing apparatus including a normal-phase candidate position selection unit configured to select a position different from a target position on an input image as a normal-phase candidate position, which is a candidate for a position at which jaggies are in the same phase as the target position, a reverse-phase candidate position selection unit configured to select a position different from the target position on the input image as a reverse-phase candidate position, which is a candidate for a position at which jaggies are in a reverse phase to the target position, a weight value calculation unit configured to calculate a weight value based on a degree of similarity between an image of the target position and an image of the normal-phase candidate position, and a weighted expected value calculation unit configured to calculate a weighted expected value based on the weight value and a pixel of the reverse-phase candidate position, the method comprising:
   selecting, by the normal-phase candidate position selection unit, the normal-phase candidate position;
   selecting, by the reverse-phase candidate position selection unit, the reverse-phase candidate position;
   calculating, by the weight value calculation unit, the weight value; and
   calculating, by the weighted expected value calculation unit, the weighted expected value.

6. A computer-readable storage device encoded with computer-readable instructions that, when executed by a processing device, perform a process comprising:
   selecting a position different from a target position on an input image as a normal-phase candidate position, which is a candidate for a position at which jaggies are in the same phase as the target position;
   selecting a position different from the target position on the input image as a reverse-phase candidate position, which is a candidate for a position at which jaggies are in a reverse phase to the target position;
   calculating a weight value based on a degree of similarity between an image of the target position and an image of the normal-phase candidate position; and
   calculating a weighted expected value based on the weight value and a pixel of the reverse-phase candidate position.

7. An image processing apparatus comprising:
   a reverse-phase candidate position selection unit configured to select a position different from a target position on an input image as a reverse-phase candidate position, which is a candidate for a position at which jaggies are in a reverse phase to the target position;
   a smoothing unit configured to generate a smoothed image by smoothing the input image;
   a weight value calculation unit configured to calculate a weight value based on a first degree of similarity between an image of the target position on the smoothed image and an image of the reverse-phase candidate position on the smoothed image; and
   a weighted expected value calculation unit configured to calculate a weighted expected value based on a pixel of the reverse-phase candidate position on the input image and the weight value.

8. The image processing apparatus according to claim 7, wherein the reverse-phase candidate position selection unit selects a position on a horizontal line separated by one line from a horizontal line including the target position on the input image or a position on a vertical line separated by one line from a vertical line including the target position on the input image as the reverse-phase candidate position.

9. The image processing apparatus according to claim 8, further comprising:
   an adjacent position selection unit for selecting positions adjacent to the top, bottom, left, and right of the target position on the smoothed image as adjacent positions; and
   a lower limit calculation unit for calculating a lower limit of the first similarity degree based on second degrees of similarity between an image of the target position on the smoothed image and images of the adjacent positions on the smoothed image,
   wherein the weight value calculation unit calculates the weight value by performing threshold processing of the first similarity degree using the lower limit.

10. An image processing method for use in an image processing apparatus including a reverse-phase candidate position selection unit configured to select a position different from a target position on an input image as a reverse-phase candidate position, which is a candidate for a position at which jaggies are in a reverse phase to the target position, a smoothing unit configured to generate a smoothed image by smoothing the input image, a weight value calculation unit configured to calculate a weight value based on a degree of similarity between an image of the target position on the smoothed image and an image of the reverse-phase candidate position on the smoothed image, and a weighted expected value calculation unit configured to calculate a weighted expected value based on a pixel of the reverse-phase candidate position on the input image and the weight value, the method comprising:

selecting, by the reverse-phase candidate position selection unit, the reverse-phase candidate position;

generating, by the smoothing unit, the smoothed image;

calculating, by the weight value calculation unit, the weight value; and calculating, by the weighted expected value calculation unit, the weighted expected value.

11. A computer-readable storage device encoded with computer-readable instructions that, when executed by a processing device, perform a process comprising:

selecting a position different from a target position on an input image as a reverse-phase candidate position, which is a candidate for a position at which jaggies are in a reverse phase to the target position;

generating a smoothed image by smoothing the input image;

calculating a weight value based on a degree of similarity between an image of the target position on the smoothed image and an image of the reverse-phase candidate position on the smoothed image; and calculating a weighted expected value based on a pixel of the reverse-phase candidate position on the input image and the weight value.

12. An image processing apparatus comprising:

a reverse-phase candidate position selection unit configured to select a position different from a target position on an input image as a reverse-phase candidate position, which is a candidate for a position at which jaggies are in a reverse phase to the target position;

a weight value calculation unit for configured to calculate a weight value based on a degree of angular similarity between an image of the target position and an image of the reverse-phase candidate position; and a weighted expected value calculation unit configured to calculate a weighted expected value based on a pixel of the reverse-phase candidate position and the weight value.

13. The image processing apparatus according to claim 12, wherein the reverse-phase candidate position selection unit selects a position on a horizontal line separated by one line from a horizontal line including the target position on the input image or a position on a vertical line separated by one line from a vertical line including the target position on the input image as the reverse-phase candidate position.

14. The image processing apparatus according to claim 12, further comprising:

a provisional jaggies reduction unit for performing a provisional process of generating a image in which jaggies are reduced using the image of the target position and the image of the reverse-phase candidate position;

an edge direction estimation unit for estimating an edge direction of the image in which jaggies are reduced using the image in which jaggies are reduced generated by the provisional jaggies reduction unit;

a parallelism determination unit for determining a degree of parallelism between the edge direction and relative coordinates of the reverse-phase candidate position based on the target position; and an angular similarity calculation unit for calculating a degree of angular similarity between the image of the target position and the image of the reverse-phase candidate position on the basis of the parallelism degree between the edge direction and the relative coordinates determined by the parallelism determination unit, wherein the weight value calculation unit calculates the weight value using the angular similarity degree calculated by the angular similarity calculation unit.

15. The image processing apparatus according to claim 12, further comprising:

an adjacent position selection unit for selecting positions adjacent to the top, bottom, left, and right of the target position as adjacent positions; and a lower limit calculation unit for calculating a lower limit of the angular similarity degree based on degrees of angular similarity between an image of the target position and images of the adjacent positions, wherein the weight value calculation unit performs threshold processing of the angular similarity degree according to the lower limit of the angular similarity degree calculated by the lower limit calculation unit.

16. An image processing method for use in an image processing apparatus including a reverse-phase candidate position selection unit configured to select a position different from a target position on an input image as a reverse-phase candidate position, which is a candidate for a position at which jaggies are in a reverse phase to the target position, a weight value calculation unit configured to calculate a weight value based on a degree of angular similarity between an image of the target position and an image of the reverse-phase candidate position, and a weighted expected value calculation unit configured to calculate a weighted expected value based on a pixel of the reverse-phase candidate position and the weight value, the method comprising:

selecting, by the reverse-phase candidate position selection unit, the reverse-phase candidate position;

calculating, by the weight value calculation unit, the weight value; and calculating, by the weighted expected value calculation unit, the weighted expected value.

17. A computer-readable storage device encoded with computer-readable instructions that, when executed by a processing device, perform a process comprising:

selecting a position different from a target position on an input image as a reverse-phase candidate position, which is a candidate for a position at which jaggies are in a reverse phase to the target position;

calculating a weight value based on a degree of angular similarity between an image of the target position and an image of the reverse-phase candidate position; and calculating a weighted expected value based on a pixel of the reverse-phase candidate position and the weight value.

18. An image processing apparatus comprising:

a reverse-phase candidate position pair selection unit configured to select two points different from a target position on an input image as a pair of reverse-phase candidate positions, which are candidates for a position at which jaggies are in a reverse phase to the target position, point-symmetrically with respect to the target position;

a weight value calculation unit configured to calculate a weight value based on a degree of similarity of images between the two points serving as the reverse-phase candidate positions; and a weighted expected value calculation unit configured to calculate a weighted expected value based on pixels of the reverse-phase candidate positions on the input image and the weight value.

19. The image processing apparatus according to claim 18, comprising:
an adjacent position pair selection unit for selecting a set of positions adjacent to the top and bottom of the target position or a set of positions adjacent to the left and right of the target position as a pair of adjacent positions;
a lower similarity limit calculation unit for calculating lower similarity limits based on similarity of an image of the target position and each image of the adjacent position pair,
wherein the weight value calculation unit performs threshold processing of the similarity degree of the images between the two points serving as the reverse-phase candidate position pair according to the lower similarity limits calculated by the lower similarity limit calculation unit.

20. An image processing method for use in an image processing apparatus including a reverse-phase candidate position pair selection unit configured to select two points different from a target position on an input image as a pair of reverse-phase candidate positions, which are candidates for a position at which jaggies are in a reverse phase to the target position, point-symmetrically with respect to the target position, a weight value calculation unit configured to calculate a weight value based on a degree of similarity of images between the two points serving as the reverse-phase candidate positions, and a weighted expected value calculation unit configured to calculate a weighted expected value based on pixels of the reverse-phase candidate positions on the input image and the weight value, the method comprising:
selecting, by the reverse-phase candidate position pair selection unit, the reverse-phase candidate position pair;
calculating, by the weight value calculation unit, the weight value; and
calculating, by the weighted expected value calculation unit, the weighted expected value.

* * * * *